United States Patent [19]

Komatsu et al.

[11] 4,268,330
[45] May 19, 1981

[54] GREEN TIRE BUILDING PROCESS AND APPARATUS

[75] Inventors: Tadaaki Komatsu, Kodaira; Yuusuke Araki, Higashimurayama; Kanji Inoue, Higashiyamato, all of Japan

[73] Assignee: Bridgestone Tire Company Limited, Tokyo, Japan

[21] Appl. No.: 106,727

[22] Filed: Dec. 26, 1979

[30] Foreign Application Priority Data

Dec. 29, 1978 [JP] Japan .............................. 53-165170
Dec. 29, 1978 [JP] Japan .............................. 53-165171
Dec. 29, 1978 [JP] Japan .............................. 53-165172
Dec. 29, 1978 [JP] Japan .............................. 53-165173

[51] Int. Cl.³ .......................................... B29H 17/20
[52] U.S. Cl. .................................. 156/111; 156/126; 156/157; 156/396; 156/502
[58] Field of Search ............... 156/111, 126, 127, 133, 156/157, 304, 394, 396, 405, 414-420, 502

[56] References Cited

U.S. PATENT DOCUMENTS

| | | | |
|---|---|---|---|
| 1,458,732 | 6/1923 | Sloper | 156/126 |
| 1,785,659 | 12/1930 | State | 156/126 |
| 2,974,714 | 3/1961 | Kraft | 156/127 |
| 3,143,450 | 8/1964 | Barber et al. | 156/126 |
| 3,881,983 | 5/1975 | Smith | 156/404 |
| 4,053,342 | 10/1977 | Appleby et al. | 156/123 R |
| 4,108,707 | 8/1978 | Appleby et al. | 156/397 |

FOREIGN PATENT DOCUMENTS 4844969 9/1971 Japan .

Primary Examiner—John E. Kittle
Attorney, Agent, or Firm—Cushman, Darby & Cushman

[57] ABSTRACT

A green tire building process comprises: the steps of: jointing both longitudinal ends of a belt-like tread rubber for producing an endless tread band, and applying the endless tread band on an inner periphery of an annular face: jointing both longitudinal ends of a belt-like breaker ply for producing an endless breaker band, and disposing the endless breaker band within said endless tread band with its mid-circumferential plane being aligned with that of said endless tread band; expanding the endless breaker band radially and applying the endless breaker band on the inner periphery of the endless tread band for building a tread breaker assembly; disposing a cylindrical green case within and in coaxial relation with the tread breaker assembly; deforming the cylindrical green case toroidally to be applied on the inner periphery of the endless breaker band for integrally building the cylindrical green case and the tread breaker assembly.

6 Claims, 30 Drawing Figures

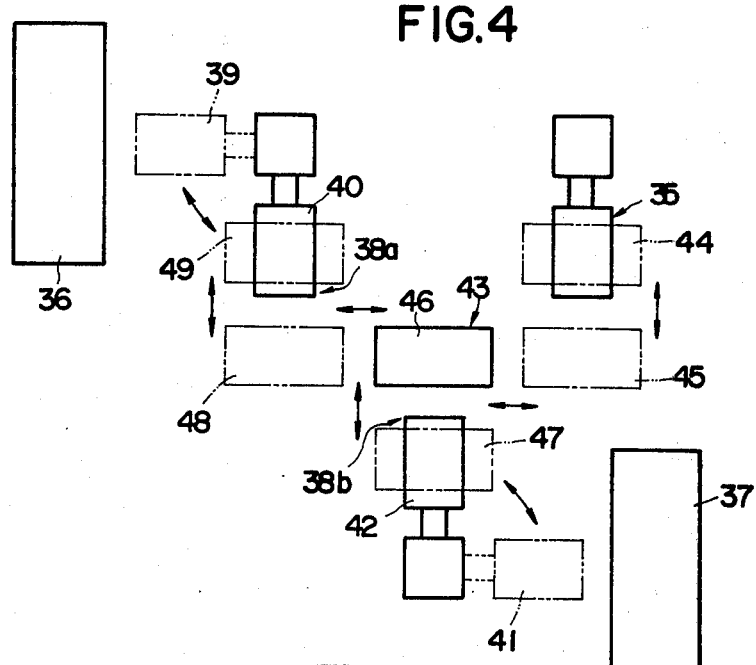
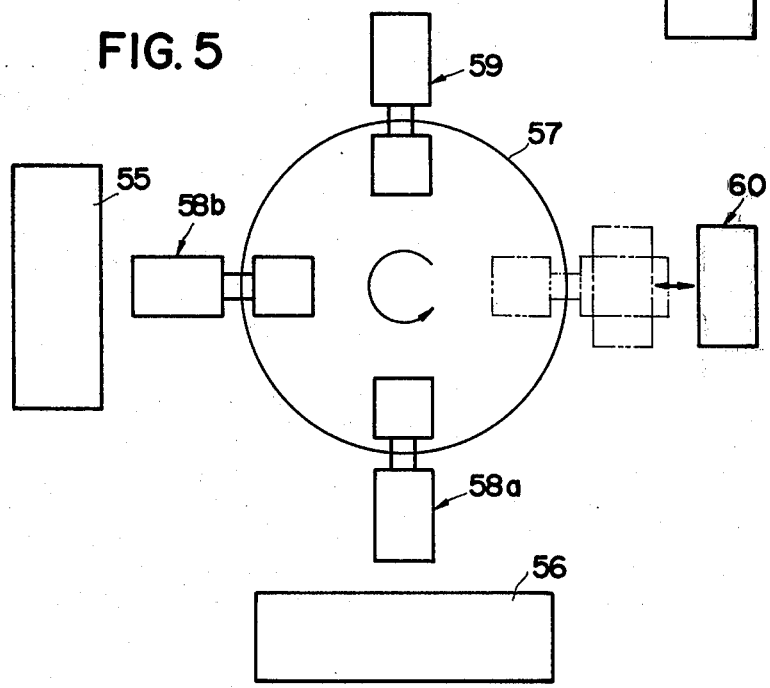

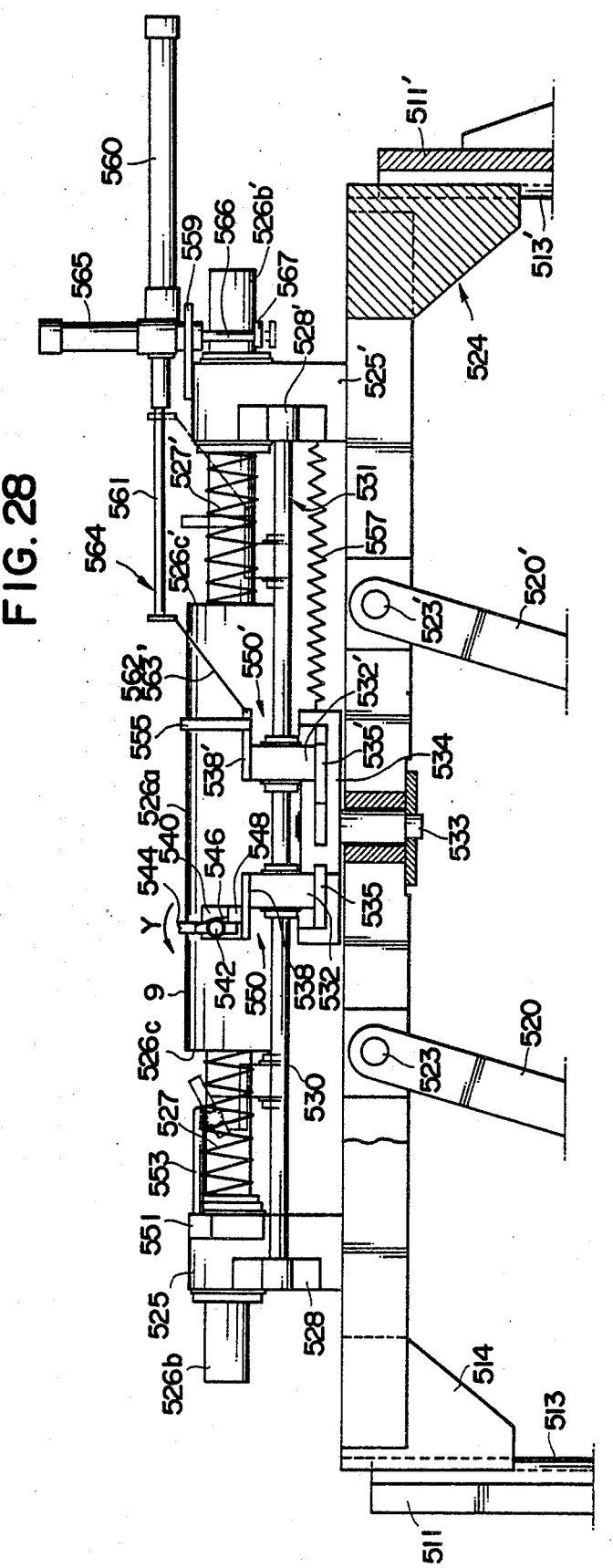

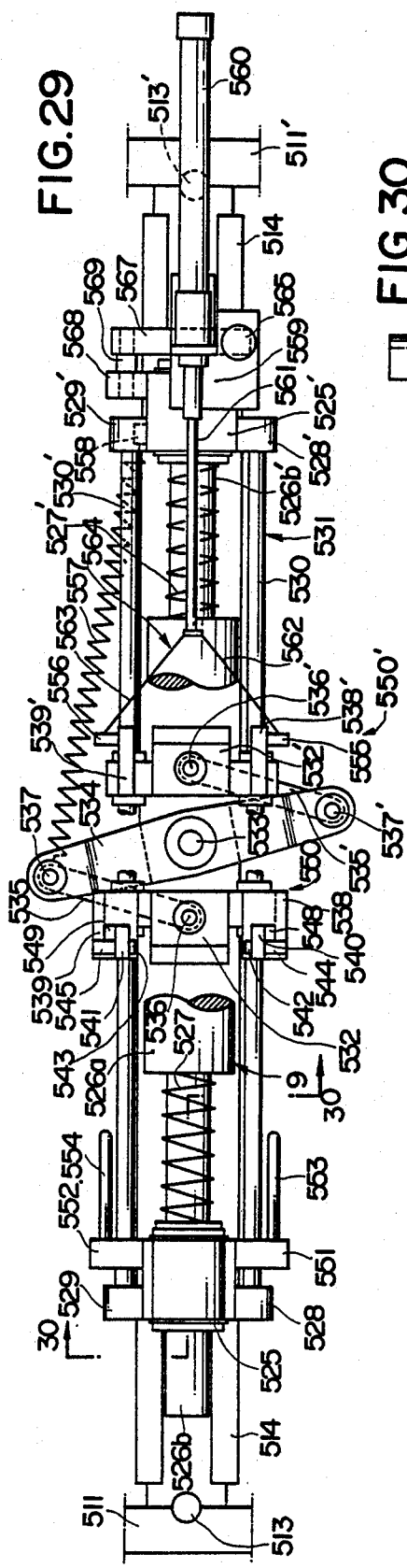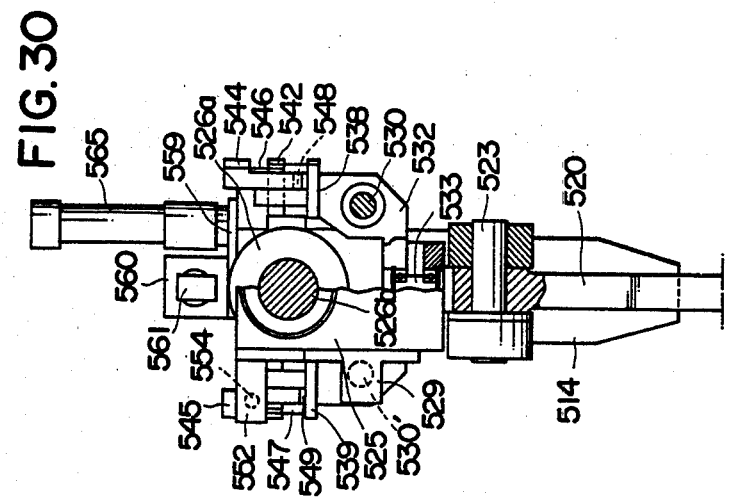

GREEN TIRE BUILDING PROCESS AND APPARATUS

This invention relates to a green tire building process and apparatus for production of radial tires.

There have been proposed a wide variety of green tire building processes for production of radial tires one of which comprises the steps of applying carcass plies on the periphery of a tire building drum, assembling such as bead cores, apex rubbers, flippers, chafers and the like with both axial ends of the carcass plies to build a cylindrical green case, applying breaker plies and a tread rubber on the periphery of a belt building drum to build an annular tread breaker assembly in concurrence with the step of building the cylindrical green case, and deforming the cylindrical green case into a toroidal shape to be assembled with the annular tread breaker assembly. For such a green tire building process, the labour saving and automation have been accomplished to a relatively high level, however, it is entirely impossible to completely automate the tire building operation to a currently employable level. This is due to the fact that each of the breaker plies is made of a textile or steel cord belt covered by an uncured rubber and the tread rubber is produced by extruding an uncured rubber into a belt-like form with a substantially trapezoidal cross-section so that the breaker plies and the tread rubber are necessarily expanded or contracted in both longitudinal and width directions while time lapses since they are made of such an uncured rubber. Conventionally, it was required for an operator to manually amend in the tire building process such expansion and contraction caused by the property of the uncured rubber material. More specifically, the operator manually pull the breaker plies and tread rubber expanded and contracted to amend the length and width thereof while they are applied on the belt building drum. It was considered to place the manual amending operation for an mechanical operation by servicers which supply the breaker plies and tread rubber. However, a mechanical apparatus for effecting the automatic operation was extremely complicated and expensive. The necessity of amendment of the breaker plies and tread rubber in the vicinity of the tire building drum is a major factor for hindering cost-down of finished tires.

It is therefore an object of the present invention to provide tire building process and apparatus which enable a green tire to be built in a completely automatic operation without manual and mechanical amendings of the uncured rubber of the breaker plies and tread rubber on the periphery of the tire building drum or before the uncured rubber is transferred to the tire building process.

In order to accomplish the foregoing objects, a green tire building process according to the present invention is provided to comprise the steps of: jointing both longitudinal ends of a belt-like tread rubber for producing an endless tread band which has a circumferential length substantially equal to a final circumferential length at a time when the endless tread band is to be assembled with a cylindrical green case having at least a carcass ply and a pair of beads embedded in both axial end portions of said carcass ply, and applying the endless tread band on an inner periphery of an annular face; jointing both longitudinal ends of a belt-like breaker ply for producing an endless breaker band which has a circumferential length shorter than a final building circumferential length at a time when the endless breaker ply is to be applied on an inner periphery of the endless tread band, and disposing the endless breaker band within said endless tread band with its mid-circumferential plane being aligned with that of said endless tread band; expanding the endless breaker band radially outwardly to its final building circumferential length and applying the endless breaker band on the inner periphery of the endless tread band for building a tread breaker assembly; disposing the cylindrical green case within and in coaxial relation with the tread breaker assembly; deforming the cylindrical green case toroidally to be applied on the inner periphery of the endless breaker band for integrally building the cylindrical green case and said tread breaker assembly.

The above other objects, features and advantages of the present invention will become clear from the following particular description of the invention and the appended claims, taken in conjunction with the accompanying drawings which show by way of example a plurality of preferred embodiments of the present invention.

In the accompanying drawings:

FIG. 4 is a schematic layout of a third embodiment of the green tire building apparatus for production of radial tires embodying the present invention;

FIG. 5 is a schematic layout of a fourth embodiment of the green tire building apparatus for production of radial tires embodying the present invention;

FIG. 28 is an enlarged elevational view, partially in cross-section, of the applying drum illustrated in FIG. 27;

FIG. 29 is an enlarged elevational view, partially in cross-section, of the applying drum illustrated in FIG. 27; and FIG. 30 is a cross-sectional view taken on the lines 30—30 of FIG. 29.

A first embodiment of apparatus practising a tire building process according to the present invention will now be described hereinlater.

Figure 1:
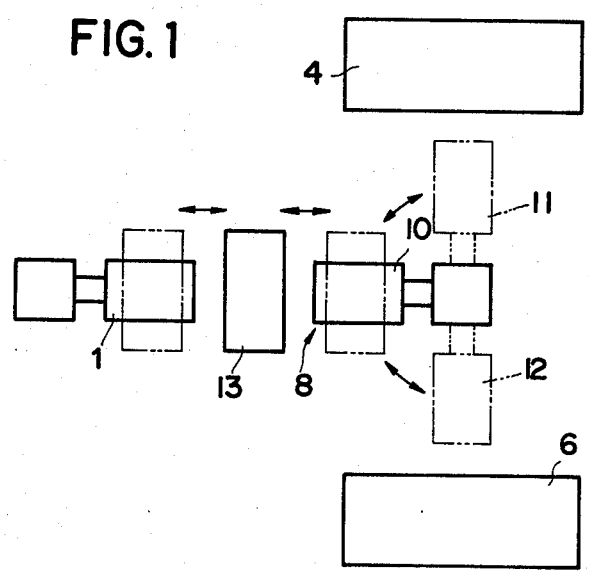
FIG. 1 is a schematic layout of a first embodiment of a green tire building apparatus for production of radial tires embodying the present invention.
Figure 2:
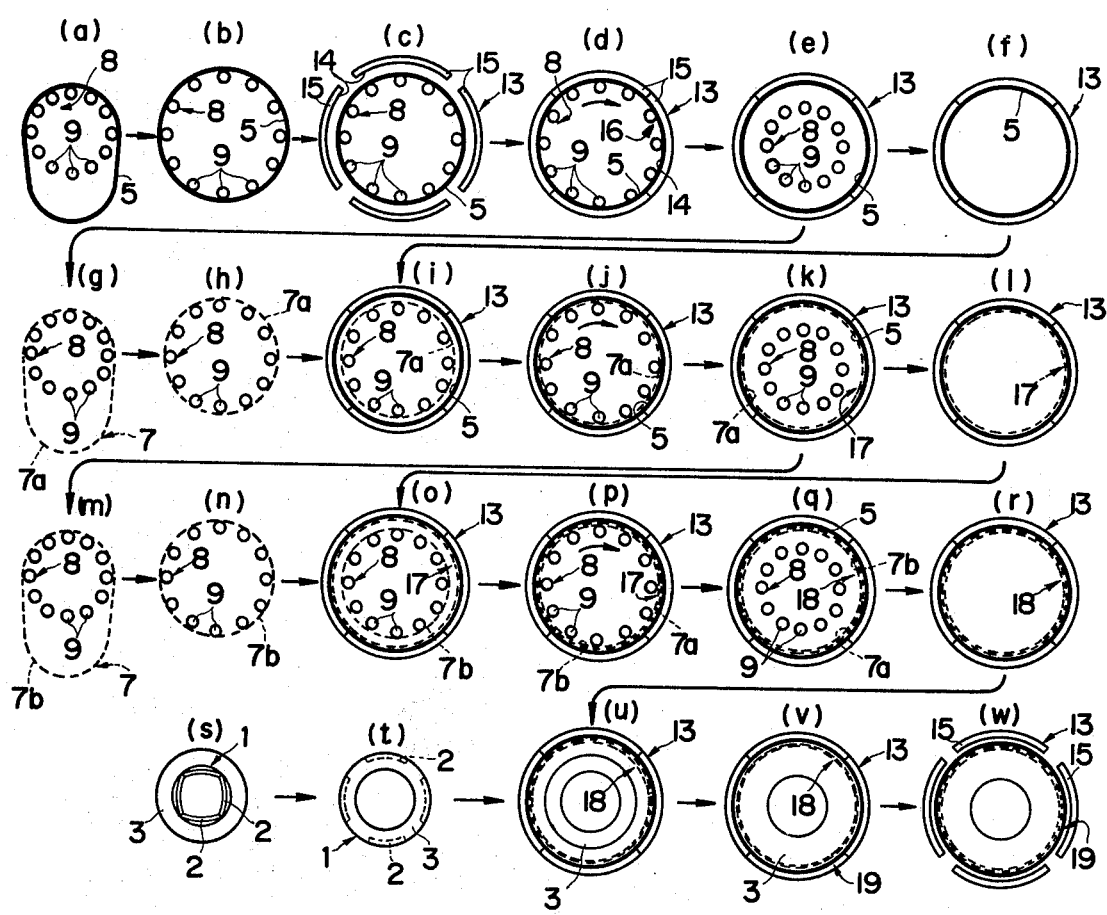
FIGS. 2a to 2w show the steps of a green tire building process for production of radial tires.

There is shown in FIGS. 1 and 2 a well known rotatable tire building drum 1 which is collectively defined by a plurality of arcuate segments 2 radially movable so that the tire building drum can be contractable and expansible. The tire building drum can support a cylindrical green case 3 which comprises carcass plies turned up at its axially outer end portions to hold a pair of bead members each having a bead core, an apex rubber, a flipper, a chafer and the like. The green case is usually produced by the steps of applying the carcass plies on the tire building drum 1, setting the pair of bead members on the axially outer end portions of the carcass plies, and turning up the axially outer end portions of the carcass plies around the pair of bead members. The above productive method of the green case may be replaced by another method of only transferred onto the tire building drum 1 such a green case built on another separate tire building drum. The tire building drum 1 is designed to enable the cylindrical green case 3 to be deformed thereon. The reference numeral 4 designates a tread band building mechanism located in front of and at one side of the tire building drum 1 to hold both longitudinal ends of a belt-like tread rubber to be butt jointed so that an endless tread band 5 can be produced as shown in FIG. 2a. The produced tread band has a circumferential length substantially equal to a final circumferential length of the tread band to be assembled with the green case 3 and built on the tire building drum 1. A breaker band building mechanism 6 is disposed in front of and at the other side of the tire building drum 1 in opposing and spaced relation with the previous tread band building mechanism 4. The breaker band building mechanism 6 can also hold both longitudinal ends of a belt-like breaker ply to be butt jointed so that an endless breaker band 7 can be produced as shown in FIGS. 2g and 2m. The produced breaker band 7 has a circumferential length smaller than the final circumferential length to be applied on the inner periphery of the tread band 5. An applying drum 8 is positioned between the tread band building mechanism 4 and the breaker band building mechanism 6 to be radially expansible and rotatable around its own axis. The applying drum 8 has a plurality of rotatable rollers 9 at its radially outer end as shown in FIG. 2a and is revolvable in a horizontal plane to assume first, second and third positions, 10, 11 and 12 which are spaced in 90 degrees with each other. The first position 10 indicates a position where the applying drum 8 is in opposing and spaced relation with the tire building drum 1 and also in coaxial relation with the tire building drum 1. The second position 11 indicates a position where the applying drum 8 is in opposing and spaced relation with the tread band building mechanism 4. Similarly, the third position 12 indicates a position where the applying drum 8 is in opposing and spaced relation with the breaker band building mechanism 6. The applying drum 8 is able to receive the tread band 4 from the tread band building mechanism 4 and to support it with its final circumferential length when the applying drum 8 is held at the second position 11, while the applying drum 8 is able to receive the breaker band 7 from the breaker band building mechanism 4 and to support it when the applying drum 8 held at the third position 12. In addition, the applying drum 8 is able to be expanded when it is held at the first position 10 so that the breaker band 7 received by the applying drum 8 at the third position is radially expanded to its final circumferential length. An annular carrier mechanism 13 is located between the tire building drum 1 and the applying drum 8 assuming the first position 10 to be movable forwardly and backwardly along the axial directions of the tire building drum 1 and the applying drum 8 assuming the first position 10. The annular carrier mechanism 13 is able to surround the tire building drum 1 when it is moved to its extremest backward position and similarly to surround the applying drum 8 assuming the first position 10 when it is moved to its extremest forward position. The annular carrier mechanism 13 is adapted to comprise a plurality of arcuate segments 15 each of which has a radially inner face 14 and is radially moved by a suitable reciprocating mechanism such as a fluid cylinder not shown so that the annular carrier mechanism 13 is expansible and contractable. When the arcuate segments 15 are radially moved to their radially innermost positions, the arcuate faces 14 of the segments 15 collectively form an annular face 16 which is in coaxial relation with the tire building drum 1 and the applying drum 8 assuming the first position 10. It is therefore to be understood that the annular face 16 is in coaxial relation with the tire building drum 1 while the annular carrier mechanism 13 is surrounding the tire building drum 1 and that the annular face 16 is in coaxial relation with the applying drum 8 when the annular carrier face 16 is surrounding the applying drum 8.

The operation of the above first embodiment will now be described hereinlater.

The tread band building mechanism 4 is initially operated to hold and butt joint the both longitudinal end portions of a tread rubber to build an endless tread band 5 which has a circumferential length substantially equal to its final building circumferential length at the time when the endless tread band 5 is assembled with the green case 3. Simultaneously with the building operation of the tread band 5, the breaker band building mechanism 6 is similarly operated to hold and butt joint the both longitudinal end portions of a breaker ply to build a first endless breaker band 7a which has a circumferential length smaller than the final building circumferential length at the time when the first endless breaker band 7a is applied to the inner periphery of the tread band 5. The applying drum 8 is then revolved from the first position 10 to the second position 11. At this time, the applying drum 8 is under a contracted state with the circumferential length of the applying drum 8 connecting rollers 9 smaller than the circumferential length of the tread band 5. The tread band 5 is then received around and supported on the applying drum 8 from the tread band building mechanism 4. At this time, the upper portion of the tread band 5 is supported on the rollers 9 while the lower portion of the tread band 5 is drooped away from the rollers 9 as shown in FIG. 2a. The applying drum 8 is then expanded to its final expanded state where all the rollers 9 of the applying drum 8 are brought into contact with the tread band 5. As a result, the tread band 5 is retained by the applying drum 8 with its final building circumferential length maintained. These states of the tread band 5 and applying drum 8 are shown in FIG. 2b. The applying drum 8 is then revolved from the second position 11 to the first position 10 to be brought into coaxial relation with the annular carrier mechanism 13. The expanded annular carrier mechanism 13 is then forwardly moved to surround the applying drum 8 as shown FIG. 2c. The arcuate segments 15 of the annular carrier mechanism 13 are then concurrently radially inwardly moved so as to contract the annular carrier mechanism 13. At this time, the arcuate faces 14 of the segments 15 collectively from an annular face generally indicated at 16, and the inner circumferential length of the annular face 16 is substantially equal to the outer circumferential length of the tread band 5. The tread band 5 is thus held between and supported by the annular face 16 and the rollers 9 of the applying drum 8. The applying drum 8 is then rotated over a presetermined rotational angle which is corresponding to a circumferential length between the adjacent two rollers 9. It is thus to be understood that the rollers 9 of the applying drum 8 are rotated simultaneously around their own axes and around the rotational axis of the applying drum 8. The tread band 5 is therefore applied on the annular face 16 with its final building circumferential length and retained by the annular carrier mechanism 13 as shown FIG. 2d. The applying drum 8 is then contracted until the rollers 9 of the applying drum 8 are spaced from the inner periphery of the tread band 5 as shown FIG. 2e. The annular carrier mechanism 13 is then backwardly moved until the annular carrier mechanism 13 is positioned between the tire building drum 1 and the applying drum 8 as shown FIG. 2f. The applying drum 8 is then revolved from the first position 10 to the third position 12 so as to receive the first breaker band 7a formed on the breaker band building mechanism 6. The first breaker band 7a which is to be received around and supported by the applying drum 8 has a circumferential length longer than the circumferential length of the envelope connecting the rollers 9 of the applying drum 8 so that the upper portion of the first breaker band 7a is supported on the rollers 9 of the applying drum 8 but the lower portion of the first breaker band 7a is drooped away from the rollers 9. The applying drum 8 is then expanded to its intermediate expanded state where the circumferential length of the envelope connecting the rollers 9 is substantially equal to the first breaker band 7a. At this time, the circumferential length of the first breaker band 7a is smaller than the final building circumferential length measured when the first breaker band 7a is applied on the inner periphery of the tread band 5 and substantially equal to the circumferential length of the envelope connecting the rollers 9 of the applying drum 8 in the state of the intermediate expanded state so that the rollers 9 of the applying drum 8 are brought into contact with the inner periphery of the first breaker band 7a. As a result, the first breaker band 7a is cylindrically retained by the applying drum 8 as shown FIG. 2h. The applying drum 8 is then revolved from the third position 12 to the first position 10 to be brought into coaxial relation with the annular carrier mechanism 13. Accordingly, the first breaker band 7a supported on the applying drum 8 is brought into coaxial relation with the tread band 5 supported on the annular carrier mechanism 13. The annular carrier mechanism 13 is then forwardly moved. At this time, the tread band 5 supported on the annular carrier mechanism 13 is not contacted with the first breaker band 7a supported on the applying drum 8 since the first breaker band 7a is built to have a circumferential length smaller than its final building circumferential length at the time when the first breaker band 7a is applied on the inner peripheral face of the tread band 5. The forward movement of the annular carrier mechanism 13 is effected until the annular carrier mechanism 13 surrounds the applying drum 8 so that the first breaker band 7a can be brought into alignment with the tread band 5 in their mid-circumferential planes can be located within and in coaxial relation with the tread band 5 supported on the annular carrier mechanism 13 as shown in FIG. 2i. The applying drum 8 is then expanded to its final expanded state. As a result, the first breaker band 7a is polygonally deformed to have a plurality of apexes which are pressingly held between the rollers 9 and the inner peripheral face of the tread band 5. The applying drum 8 is then rotated to a predetermined angle which is corresponding to a circumferential length between the adjacent two rollers 9 of the applying drum 8. As a result, the rollers 9 of the applying drum 8 are rotated around their own axes and around the rotational axis of the applying drum 8 so that the first breaker band 7a is applied on the inner periphery of the tread band 5 with its circumferential length radially expanded to its final building circumferencial length to form a first tread breaker assembly 17 carried by the annular carrier mechanism 13 as shown FIG. 2j. At this time, the elongation ratio of the first breaker band 7a preferably ranges 2 to 5 percents. The reason is due to the fact that if the elongation ratio of the first breaker band 7a is less then 2 percents the first breaker band 7a may possibly be contacted with the tread band 5 to prevent the first breaker band 7a from being inserted into the tread band 5 when the annular carrier mechanism 13 is forwardly moved in the aforementioned manner if the tread band 5 is partially radially inwardly projected and waved from the annular face 16 without being completely applied thereon, and that if the elongation ratio of the first breaker band 7a is more than 5 percents cords embedded in the first breaker band 7a are disordered in their arrangement and angles thereby lowering quality of finished tires. The applying drum 8 is then contracted to bring the rollers 9 into spaced relation with the first tread breaker assembly 17 as shown in FIG. 2k. The annular carrier mechanism 13 is then backwardly moved until the annular carrier mechanism 13 is disposed between the tire building drum 1 and the applying drum 8 as shown in FIG. 2l. The applying drum 8 is then revolved from the first position 10 to the third position 12. Between the times when the applying drum 8 receives the first breaker band 7a from the breaker band building mechanism 6 and when the applying drum 8 is revolved from the first position 10 to the third position 12, the breaker band building mechanism 6 is operated to build a second endless breaker band 7b, having a circumferential length shorter than its final building circumferential length measured when the second breaker band 7b is applied on the inner peripheral face of the tread band 5, by holding and butt jointing the both end portions of the breaker ply. The second breaker band built by the breaker band building mechanism 6 is received on the applying drum 8. At this time, the upper portion of the second breaker band 7b is similarly supported on the rollers 9 and the lower portion of the second breaker band 7b is drooped from the rollers 9 as shown in FIG. 2m since the circumferential length of the second breaker band 7b is longer than the circumferential length of the envelope connecting the rollers 9. The applying drum 8 is then expanded to its intermediate expanded state where the circumferential length of the envelope connecting the rollers 9 is substantially equal to the circumferential length of the second breaker band 7b. At this time, the circumferential length of the second breaker band 7b is also shorter than its final building circumferential length at the time when the second breaker band 7b is applied on the inner peripheral face of the tread band 5 and substantially equal to the circumferential length of the envelope connecting the rollers 9 of the applying drum 8 held in the intermediate expanded state so that all the rollers 9 of the applying drum 8 are brought into contact with the inner peripheral face of the second breaker band 7b. It is therefore understood that the second breaker band 7b is cylindrically supported on the applying drum 8 as shown in FIG. 2n. The applying drum 8 is then revolved from the third position 12 to the first position 10 where the applying drum 8 is brought into coaxial relation with the annular carrier mechanism 13 so that the second breaker band 7b supported on the applying drum 8 is also in coaxial relation with the first tread breaker assembly 17 supported on the annular carrier mechanism 13. The annular carrier mechanism 13 is then forwardly moved. At this time, the first tread breaker assembly 17 supported on the annular carrier mechanism 13 is not contacted with the second breaker band 7b supported on the applying drum 8 since the second breaker band 7b is built to have a circumferential length shorter than the final building circumferential length at the time when the second breaker band 7b is applied on the inner peripheral face of the tread band 5. The forward movement of the annular carrier mechanism 13 is effected until the annular carrier mechanism 13 surrounds the applying drum 8 so that the second breaker band 7b is brought into alignment with the tread band 5 in their mid-circumferential planes and is located within and in coaxial relation with the first tread breaker assembly 17 supported on the annular carrier mechanism 13 as shown in FIG. 2o. The applying drum 8 is then expanded to its final expanded state where the second breaker band 7b is polygonally deformed to have a plurality of apexes which are pressingly held between the first tread breaker assembly 17 and the rollers 9 of the applying drum 8. The applying drum 8 is then rotated to a predetermined angle which is corresponding to the circumferential length between the adjacent two rollers 9 of the applying drum 8 so that the rollers 9 of the applying drum 8 are rotated around their own axes and around the rotational axis of the applying drum 8. At this time, the second breaker band 7b is radially expanded to its final building circumferential length to be integrally applied on the inner surface of the first tread breaker assembly 17 and thereby to build a second tread breaker assembly 18 which is carried by the annular carrier mechanism 13. The second breaker band 7b preferably has an elongation ratio ranging 2 to 5 percents by the reasons as particularly described above. As well known in the art, the second breaker band 7b is required to be applied on the first breaker band assembly 17 in such a manner that the cords of the second breaker band 7b are intersected at a predetermined angle with those of the first breaker band 7a as shown in FIG. 2p. The applying drum 8 is then contracted as shown in FIG. 2q so that the rollers 9 of the applying drum 8 are spaced apart from the inner peripheral faces of the second tread breaker assembly 18. The annular carrier mechanism 13 is backwardly moved until it is located between the tire building drum 1 and the applying drum 8 as shown in FIG. 2r. Independently from the foregoing steps, a suitable tire band building drum is operated to produce an endless cylindrical green case 3 by the steps of applying carcass plies on the tire band building drum, assembling such as bead cores, apex rubbers, flippers, chafers and the like with both axial ends of the carcass plies to build the cylindrical green case 3. The above green case 3 built on the tire band building drum is preliminarily received on the contracted tire building drum 1 as shown in FIG. 2s. The tire building drum 1 is then expanded as shown in FIG. 2t. The annular carrier mechanism 13 is then backwardly moved until it surrounds the tire building drum 1 so that the green case 3 supported on the tire building drum 1 is aligned in its mid-circumferential plane with that of the second tread breaker assembly 18 and is located within and in coaxial relation with the second tread breaker assembly 18 supported on the annular carrier mechanism 13 as shown in FIG. 2u. The tire building drum 1 is then operated to toroidally deform the green case 3 so that the green case 3 is applied on the inner periphery of the second breaker band 7b to integrally assemble the second tread breaker assembly 18 and the green case 3 for production of a green tire 19 as shown in FIG. 2v. The segments 15 of the annular carrier mechanism 13 are concurrently radially outwardly moved as shown in FIG. 2w. The annular carrier mechanism 13 is then forwardly moved until it is positioned between the tire building drum 1 and the applying drum 8. The tire building drum 1 is then contracted to remove a green tire 19 therefrom.

While there has been described one cycle of the steps of the operation of the first embodiment embodying the present invention, such cycles are required to be repeated for production of a number of green tires in a similar manner.

Figure 3:
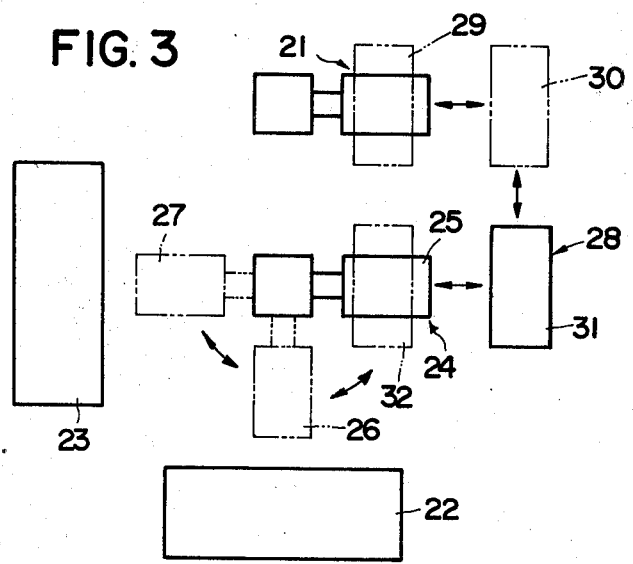
FIG. 3 is a schematic layout of a second embodiment of the green tire building apparatus for production of radial tires embodying the present invention.

FIG. 3 shows a second embodiment in which a tread band building mechanism 22 is disposed in the vicinity of a tire building drum 21. A breaker band building mechanism 23 is positioned between the tire building drum 21 and the tread band building mechanism 22 and backwardly of the tire building drum 21. An applying drum 24 is disposed between the tire building drum 21 and the tread band building mechanism 22 to assume a first position 25 where the rotational axes of the tire building drum 21 is in parallel relation with the applying drum 24, a second position 26 where the applying drum 24 is in opposing relation with the tread band building mechanism 22, and a third position 27 where the applying drum 24 is also in opposing relation with the breaker band building mechanism 23, the above three positions being in ninety degrees spaced relation with each other. An annular carrier mechanism 28 is movable in a horizontal plane as shown in arrows to assume a first position 29 where the annular carrier mechanism 28 is coaxially surrounding the tire building drum 21, a second position 30 where the annular carrier mechanism 28 is in coaxial relation with the tire building drum 21 and forwardly spaced from the tire building drum 21, and a third position 31 where the annular carrier mechanism 28 is in coaxial relation with the applying drum 24 disposed at the first position 25, and a fourth position where the annular carrier mechanism 28 is coaxially surrounding the applying drum 24 located at the first position 25. The operation of the second embodiment is substantially equal to the first embodiment described above with the exception that the annular carrier mechanism 28 is moved in a complexed manner, for example, from the first position 29 to the fourth position 32 and from the fourth position 32 to the first position 29.

FIG. 4 shows a third embodiment in which a tread band building mechanism 36 is positioned backwardly of a tire building drum 35 and a breaker band building mechanism 37 is also positioned in the vicinity of the tire building drum 35. A pair of applying drums 38a and 38b are provided in opposing relation with the tread band building mechanism 36 and the breaker band building mechanism 37. The applying drum 38a is revolvable in a horizontal plane to assume a first position 39 where the applying drum 38a is in opposing relation with the tread band building mechanism 36, and a second position 40 where the applying drum 38a is in ninety degrees spaced relation with the first position 39. The applying drum 38b is also revolvable in a horizontal plane to assume a third position 41 where the applying drum 38b is in opposing relation with the breaker band building mechanism 37, and a fourth position 42 where the applying drum 38b is in ninety degrees spaced relation with the third position 41. An annular carrier mechanism 43 is movable in a horizontal plane as shown in arrows to assume a first position 44 where the annular carrier mechanism 43 is coaxially surrounding the tire building drum 35, a second position 45 where the annular carrier mechanism 43 is located in spaced and coaxial relation with the tire building drum 35, a third position 46 where the annular carrier mechanism 43 is in spaced and coaxial relation with the applying drum 38b and in lateral alignment with the second position 45, a fourth position 47 where the annular carrier mechanism 43 is coaxially surrounding the applying drum 38b, a fifth position 48 where the annular carrier mechanism 43 is in spaced and coaxial relation with the applying drum 38a and in lateral alignment with the second and third positions 45 and 46, and a sixth position 49 where the annular carrier mechanism 43 is coaxially surrounding the applying drum 38a. In the third embodiment, the applying drum 38a receives a tread band 5 from the tread band building mechanism 36 at the first position 39 and is then revolved to the second position 40. The tread band 5 is applied on the annular surface of the annular carrier mechanism 43, which is moved from the fifth position 48 to the sixth position 49, to be retained by the annular carrier mechanism 43. The applying drum 38b receives a breaker band 7 from the breaker band building mechanism 37 at the third position 41 and is then revolved to the fourth position 42. The breaker band 7 is integrally applied on the inner peripheral surface of the tread band 5 retained by the annular carrier mechanism 43 which is moved from the third position 46 to the fourth position 47 through the sixth position 49 and the fifth position 48 to build a tread breaker assembly.

FIG. 5 shows a fourth embodiment wherein a breaker band building mechanism 55 and a tread band building mechanism 56 are disposed around and in the vicinity of an index table 57 which is intermittently rotatable at ninety degrees in a horizontal plane. On the index table 57 are provided a pair of applying drum 58a and 58b which are in ninety degrees spaced relation with each other to be opposing to the tread band building mechanism 56 and the breaker band building mechanism 55, respectively. A tire building drum 59 is also provided on the index table 57 is in opposite and alignedly spaced relation with the applying drums 58a and 58b. An annular carrier mechanism 60 is disposed in opposing relation with the breaker band building mechanism 55 to be movable toward and away from the rotational axis of the index table 57. In the fourth embodiment the index table 57 is intermittently rotated and stopped to produce a green tire 19 by applying consecutively on the inner periphery of the annular carrier mechanism 60 the tread band 5 received on the applying drum 58a from the tread band building mechanism 56, the breaker band 7 received on the applying drum 58b from the breaker band building mechanism 55 and the green case 3 retained by the tire building drum 59.

Figure 6:
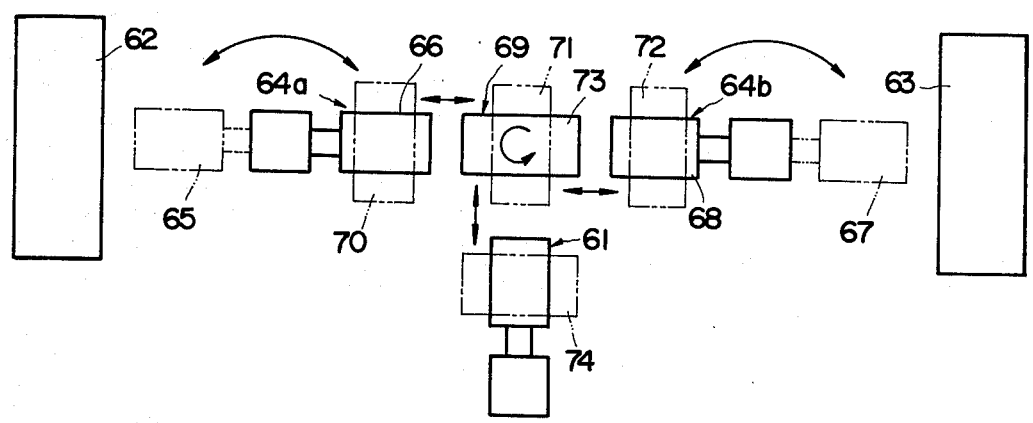
FIG. 6 is a schematic layout of a fifth embodiment of the green tire building apparatus for production of radial tires embodying the present invention.

FIG. 6 shows a fifth embodiment wherein a tread band building mechanism 62 is disposed backwardly of a tire building drum 61 and a breaker band building mechanism 63 is disposed forwardly of the tire building drum 61 and in opposing relation with a tread band building mechanism 62. A pair of applying drums 64a and 64b are interposed between the tread band building mechanism 62 and the breaker band building mechanism 63 in spaced relation with each other. The applying drum 64a is revolvable in a horizontal plane to assume a first position 65 where the applying drum 64a is in opposing relation with the tread band building mechanism 62, and a second position 66 where the applying drum 64a is in 180 degrees spaced relation with the first position 65. The applying drum 64b is also revolvable in a horizontal plane to assume a third position 67 where the applying drum 64b is in opposing relation with the breaker band building mechanism 63 and a fourth position 68 where the applying drum 64b is in 180 degrees spaced relation with the third position 67. The applying drum 64a located at the first and second positions 65 and 66 is in coaxial relation with the applying drum 64b located at the third and fourth positions 67 and 68. An annular carrier mechanism 69 is movalbe along the applying drums 64a and 64b located at the second and fourth positions 66 and 68 respectively to assume a first position 70 where the annular carrier mechanism 69 is coaxially surrounding the applying drum 64a, a second position 71 where the annular carrier mechanism 69 is located between and in coaxial relation with the applying drums 64a and 64b, and a third position 72 where the annular carrier mechanism 69 is coaxially surrounding the applying drum 64b positioned at the fourth position 68. The annular carrier mechanism 69 is also revolvable in a horizontal plane as shown in a circular arrow at ninety degrees to assume a fourth position 73 where the annular carrier mechanism 69 is in coaxial relation with the tire building drum 61, and a fifth position 74 where the annular carrier mechanism 69 is coaxially surrounding the tire building drum 61. In the fifth embodiment, the applyinng drum 64a receives the tread band 5 from the tread band building mechanism 62 at the first position 65 and then is revolved at 180 degrees to the second position 66. The tread band 5 is then applied on the inner peripheral surface of the annular carrier mechanism 69 which is moved from the second position 71 to the first position 70. The applying drum 64b then receives the breaker band 7 from the breaker band building mechanism 63 at the third position 67 and then is revolved at 180 degrees to the fourth position 68. The breaker band 7 is then applied on the inner peripheral surface of the tread band 5 supported by the annular carrier mechanism 69 which is moved from the first position 70 to the third position 72 through the second position 71. The annular carrier mechanism 69 is then returned to the second position 71 and revolved at ninety degrees to the fourth position 73. The annular carrier mechanism 69 is then moved to the fifth position 74 to coaxially surround the green case 3 on the tire building drum 61 and the green case 3 is then toroidally deformed by the tire building drum 61 to produce a green tire 19.

Figure 7:
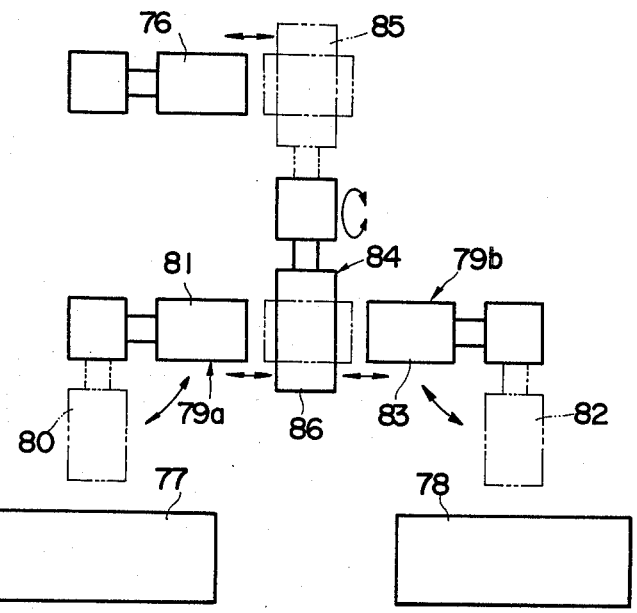
FIG. 7 is a schematic layout of a sixth embodiment of the green tire building apparatus for production of radial tire embodying the present invention.

FIG. 7 shows a sixth embodiment wherein a tire building drum 76 is movable forwardly and backwardly as shown in an arrow. In the vicinity of and in spaced relation with the tire building drum 76 is disposed a tread band building mechanism 77 which is in axial alignment and spaced relation with a breaker band building mechanism 78. A pair of applying drums 79a are positioned between the tire building drum 76 and the tread band building mechanism 77, the breaker band building mechanism 78. The applying drum 19a is revolvable in a horizontal plane to assume a first position 80 where the applying drum 79a is in opposing relation with the tread band building mechanism 77, and a second position 81 which is ninety degrees spaced apart from the first position 80, and movable frowardly and backwardly as shown in an arrow. The applying drum 79b is also revolvable in a horizontal plane to assume a third position 82 where the applying drum 79b is in opposing relation with the breaker band building mechanism 78, and a fourth position 83 which is ninety degrees spaced apart from the third position 82 and movable forwardly and backwardly as shown in an arrow. An annular carrier mechanism 84 is revolvable in a vertical plane as shown in a circular arrow to assume a first position 85 where the annular carrier mechanism 84 is in coaxial relation with the tire building drum 76, and a second position 86 where the annular carrier mechanism 84 is in coaxial relation with the applying drum 79a and 79b. In the sixth embodiment, the applying drum 79a receives the tread band 5 of the tread band building mechanism 77 at the first position 80 and is then revolved at ninety degrees to the second position 81. The applying drum 79a is then moved until the applying drum 79a is coaxially surrounded by the annular carrier mechanism 84 located at the second position 86. The tread band 5 is then applied on the inner peripheral surface of the annular carrier mechanism 84 in the similar manners as described above. The applying drum 79a is then moved backwardly to the second position 81. On the other hand, the applying drum 79b receives the breaker band 7 from the breaker band building mechanism 78 at the third position 82 and then is ninety degrees revolved to the fourth position 83. The applying drum 79b is moved backwardly until the applying drum 79b is coaxially surrounded by the annular carrier mechanism 84 located at the second position 86, and the breaker band 7 is applied on the inner peripheral surface of the tread band 5 applied on the annular carrier mechanism 84 to produce a tread breaker assembly. The annular carrier mechanism 84 is then revolved in a vertical plane at 180 degrees from the second position 86 to the first position 85 where the tire building drum 76 is forwardly moved while supporting the green case 3 to permit the annular carrier mechanism 84 to coaxially surround the tire building drum 76. The green case 3 is then toroidally deformed by the tire building drum 76 to be applied on the tread breaker assembly supported on the annular carrier mechanism 84 for production of a green tire 19. In order to enhance production efficiency of the green tire 19, another carrier mechanism is required to be provided at a position 180 degrees spaced apart from the annular carrier mechanism 84 to be revolved in a vertical plane together with the annular carrier mechanism 84.

Figure 8:
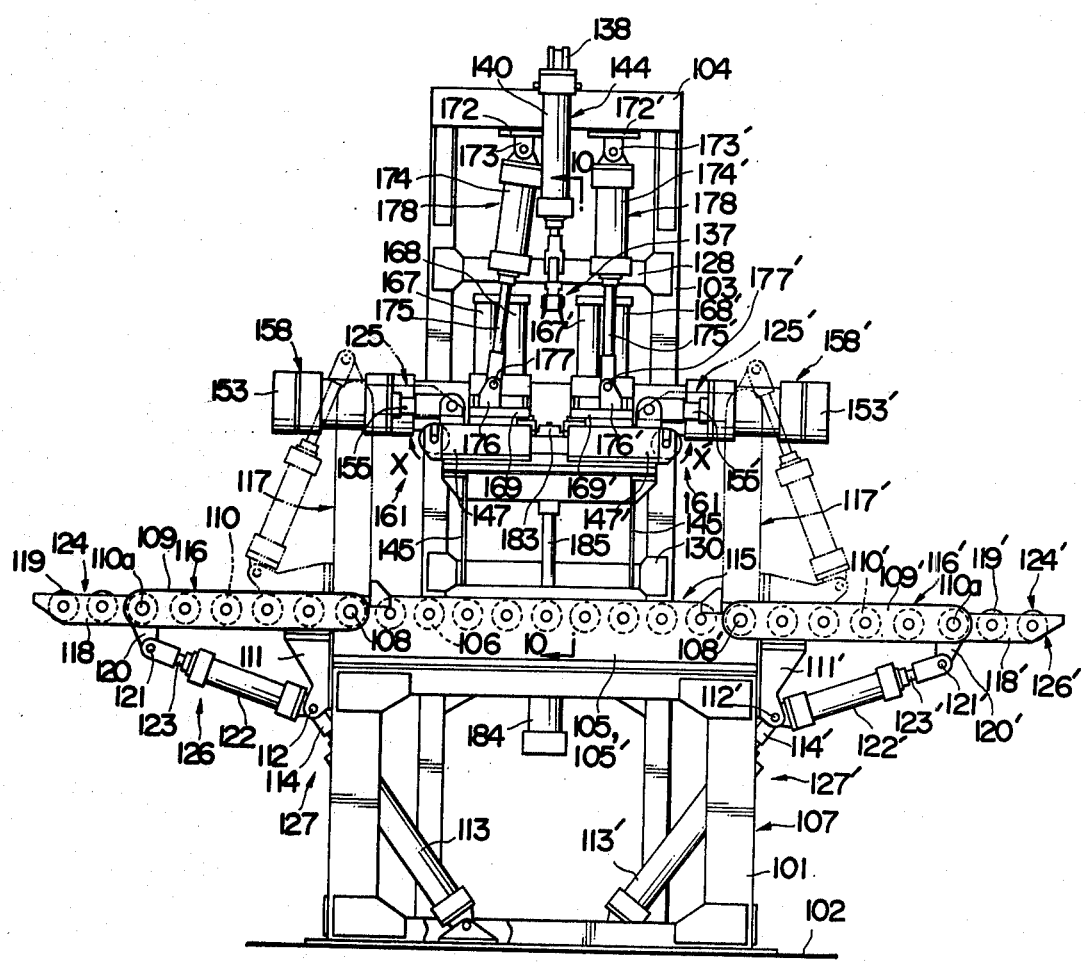
FIG. 8 is an elevational view of a tread band building mechanism employed in the first to sixth embodiments illustrated in FIGS. 3 to 7.
Figure 9:
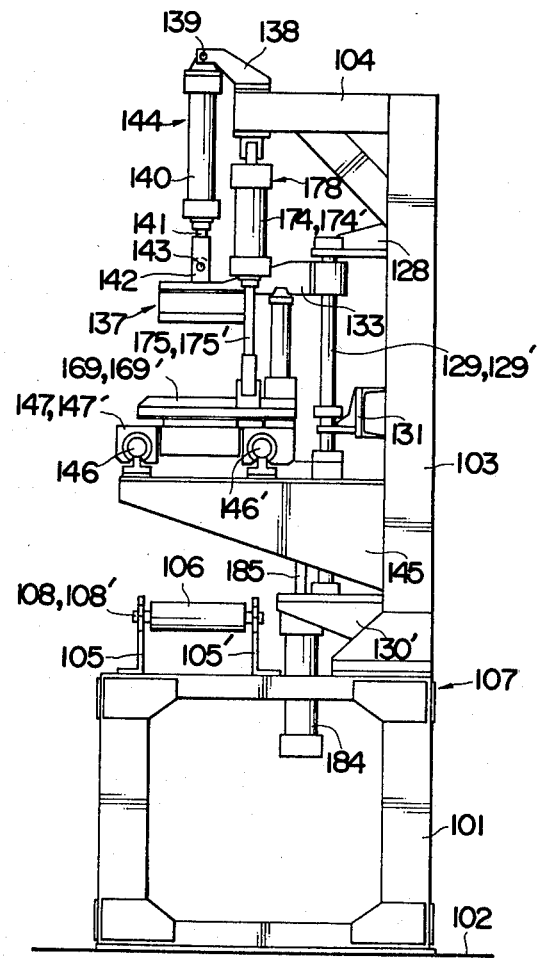
FIG. 9 is a side view of the tread band building mechanism illustrated in FIG. 8.

The tread band building mechanism employed in the aforementioned first to six embodiments will be described in detail hereinlater. In FIGS. 8 and 9, the reference numeral 101 designates a central lower frame mounted on a floor 102 and is formed by a number of angle members into a box shape. On the rear portion of the central lower frame 101 is securely mounted a vertical central upper frame 103 which has a upper portion securely mounting a horizontal supporting frame 104 projecting forwardly. A pair of roller supporting members 105 and 105' are fixedly mounted on the central lower frame 101 forwardly of the central upper frame 103 in spaced and parallel relation with each other. A plurality of rollers 106 are rotatably supported at their both ends by the roller supporting members 105 and 105' in spaced and parallel relation with each other. The central lower frame 101, the central upper frame 103, the supporting frame 104, the roller supporting members 105 105' and the rollers 106 constitute as a whole a central frame generaly indicated by the reference numeral 107. On the upper longitudinally spaced portions of the central lower frame 101 are fixed pivotal pins 108 and 108' which are in parallel with the rollers 106. A pair of inner swingable frames 109 and 109' are pivotally supported at their inner end portions on the central frame 107 through the pivotal pins 108 and 108', respectively. The inner swingable frame 109 has thereon a plurality of rollers 110 which are in parallel relation with the rollers 106 supported on the roller supporting members 105 and 105' and in spaced relation with each other. On the inner lower portion of the inner swingable frame 109 is securely mounted a bracket 111 which is pivotally connected through a pivotal pin 112 with a piston rod 114 of a fluid operated cylinder 113. The lower end of the fluid operated cylinder 113 is pivotally connected with the lower central portion of the central lower frame 101. It is thus to be understood that when the fluid operated cylinder 113 is operated to cause the piston rod 114 to be retracted and projected, the inner swingable frame 109 is swung between a horizontal position 116' where the inner swingable frame 109 is horizontally aligned with the central frame 107 to form a tread rubber loading surface 115 and a vertical position 117 where the inner swingable frame 109 is in perpendicular relation with the central frame 107. An outer swingable frame 118 is pivotally connected at its inner end portion with the outer end portion of the inner swingable frame 109 through a rotational axle 110a of the roller 110. The outer swingable frame 118 has thereon a plurality of rollers 119 which are in parallel relation with the rollers 110 and in spaced relation with each other. On the inner lower portion of the outer swingable frame 118 is securely mounted a bracket 120 which is pivotally connected through a pivotal pin 121 with a piston rod 123 of a fluid operated cylinder 122. The lower end of the fluid operated cylinder 122 is pivotally connected with the bracket 111 through a pivotal pin 112. It is thus to be understood that when the fluid operated cylinder 122 is operated to cause the piston rod 123 to be retracted and projected, the outer swingable frame 118 is swung between a horizontal position 124 where the outer swingable frame 118 is horizontally aligned with the central frame 107 and the inner swingable frame 109 to form a tread rubber loading surface 115 and a vertical position 125 where the outer swingable frame 118 is in perpendicular relation with the inner swingable frame 109. The inner swingable frame 109 and the outer swingable frame 118 constitute as a whole a swingable frame generally indicated at 126. In addition, the bracket 111 and the fluid operated cylinder 113 constitute as a whole a swingable frame swinging mechanism, generally indicated at 127, which serves to swing the swingable frame 126 from the horizontal positions 116 and 124 to its upward positions.

Figure 10:
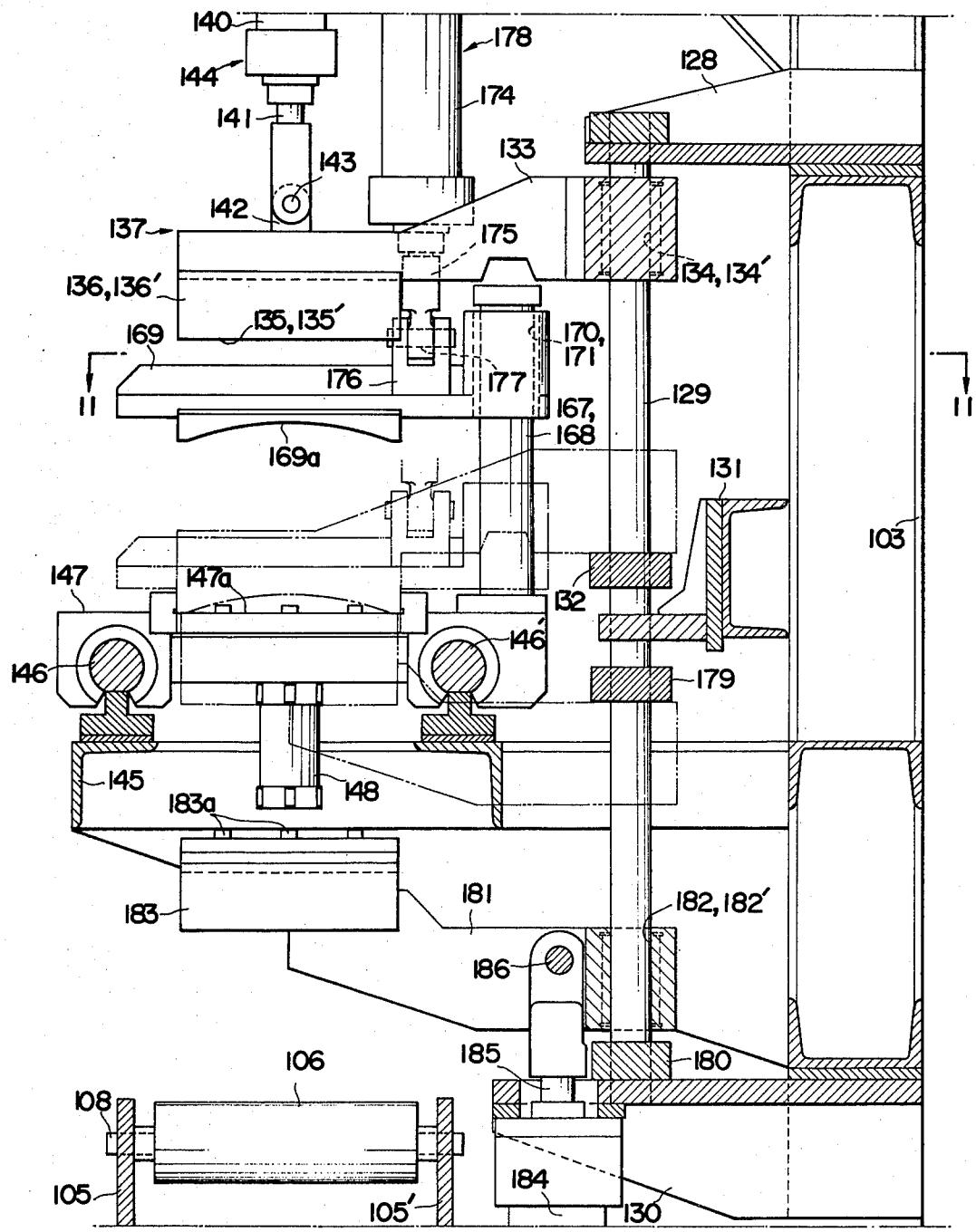
FIG. 10 is an enlarged view partially cross-sectioned as seen from the lines 10—10 of FIG. 8.

On the other hand, the inner swingable frame 109' has thereon a plurality of rollers 110' which are in parallel relation with the rollers 106 and in spaced relation with each other. On the inner lower portion of the inner swingable frame 109' is securely mounted a bracket 111' which is pivotally connected through a pivotal pin 112' with a piston rod 114' of a fluid operated cylinder 113'. The lower end of the fluid operated cylinder 113' is pivotally connected with the lower central portion of the central lower frame 101. It is thus to be understood that when the fluid operated cylinder 113' is operated to cause the piston rod 114' to be retracted and projected, the inner swingable frame 109' is swung between a horizontal position 116' where the inner swingable frame 109' is horizontally aligned with the central frame 107 to form a tread rubber loading surface 115 and a vertical position 117' where the inner swingable frame 109' is in perpendicular relation with the central frame 107. An outer swingable frame 118' is pivotally connected at its inner end portion with the outer end portion of the inner swingable frame 109' through a rotational axle 110a of the roller 110'. The outer swingable frame 118' has thereon a plurality of rollers 119' which are in parallel relation with the rollers 110' and in spaced relation with each other. On the inner lower portion of the outer swingable frame 118' is securely mounted a bracket 120' which is pivotally connected through a pivotal pin 121' with a piston rod 123' of a fluid operated cylinder 122'. The lower end of the fluid operated cylinder 122' is pivotally connected with the bracket 111' through a pivotal pin 112'. It is thus to be understood that when the fluid operated cylinder 122' is operated to cause the piston rod 123' to be retracted and projected, the outer swingable frame 118' is swung between a horizontal position 124' where the outer swingable frame 118' is horizontally aligned with the central frame 107' and the inner swingable frame 109' to form a tread rubber loading surface 115 and a vertical position 125' where the outer swingable frame 118' is in perpendicular relation with the inner swingable frame 109'. The inner swingable frame 109' and the outer swingable frame 118' constitute as a whole an additional swingable frame generally indicated at 126'. In addition, the bracket 111' and the fluid operated cylinder 113' constitute as a whole swingable frame swinging mechanism, generally indicated at 127', which serves to swing the swingable frame 126' from the horizontal positions 116' and 124' to its upward positions. With reference to FIGS. 8, 9 and 10, the reference numeral 128 indicates a bracket which is securely mounted on the upper portion of the central upper frame 103 to forwardly project, and a pair of vertically extending guide rods 129 and 129' have upper ends fixed to the bracket 128. On the central upper frame 103 between the bracket 128 and the central lower frame 101 is securely mounted a bracket 130 which forwardly projects to fixedly support the lower ends of the guide rods 129 and 129'. On the forward face of the central upper frame 103 between the brackets 128 and 130 is securely mounted a supporting member 131 which supports the longitudinally intermediate portions of the guide rods 129 and 129'. A stop member 132 is secured to the guide rods 129 and 129' slightly over the supporting member 131. A slider 133 is provided on the tread rubber loading surface 115 between the swingable frames 126 and 126' to have a rear portion in which a pair of slide bores 134 and 134' are formed to be in sliding engagement with the guid rods 129 and 129' between the bracket 128 and the stop member 132. On the lower surface of the slider 133 are securely mounted a pair of cutters 136 and 136' extending in parallel relation with the rollers 106 and in spaced relation with each other to respectively have blades 135 and 135'. The foregoing cutters 136 and 136' constitute as a whole an end severing assembly generally designated at 137.

On the supporting frame 104 is securely mounted a bracket 138 to which a vertical fluid operated cylinder 140 is connected through a pivotal pin 139. The leading end of a piston rod 141 of the fluid operated cylinder 140 is pivotally connected through a pivotal pin 143 with a bracket 142 secured to the front end portion of the slider 133. It is thus to be understood that when the fluid operated cylinder 140 is operated to cause the piston rod 141 to be retracted and projected, the slider 133 is moved upwardly and downwardly along the guide rods 129 and 129' together with the end severing assembly 137. The downward movement of the slider 133 is stopped by the stop member 132. The foregoing brackets 138, 142, and the fluid operated cylinder 140 constitute as a whole an end severing assembly moving means generally indicated by the reference numeral 144.

In FIGS. 8, 9, 10 and 11, a supporting plate 145 is secured to the central upper frame 103 between the supporting member 131 and the bracket 130 to project horizontally and forwardly. On the supporting plate 145 is securely mounted a pair of parallel and spaced rails 146 and 146' horizontally extending along the longitudinal direction of the central frame 107, i.e., right to left direction in FIG. 8. A first table 147 is slidably mounted on the rails 146 and 146' in the vicinity of the swingable frame 126 and located immediately above the tread rubber loading surface 115. As best shown in FIGS. 10 and 12, the first table 147 has a flat supporting face 147a and a vertical face 147b in perpendicular relation with the supporting face 147a. A fluid operated cylinder 148 is secured to the first table 147 immediately below the supporting face 147a and has a piston rod 149 slidably engaged with a bore 150 formed in the first table 147. It is thus to be understood that when the fluid operated cylinder is operated to cause the piston rod 149 to be retracted and projected, the leading end of the piston rod 149 is moved to and away from the upper surface of the supporting face 147a. In the vicinity of the supporting face 147a on the first table 147 is formed a recess 151 which is designed to receive a plurality of rotatable rollers 152 in parallel and spaced relation with each other in such a way that the upper face of each of the rollers 152 is aligned in height with the supporting face 147a. An additional first table 147' is slidably mounted on the rails 146 and 146' in the vicinity of the additional swingable frame 126' and located immediately above the tread rubber loading surface 115. As best shown in FIGS. 10 and 12, the first table 147' has a flat supporting face 147a' and a vertical face 147b' in perpendicular relation with the supporting face 147a. In the similar manner as the fluid operated cylinder 148, an additional fluid operated cylinder not shown is secured to the first table 147 immediately below the supporting face 147a and has a piston rod also not shown. In the vicinity of the supporting face 147a' on the first table 147' is formed a recess 151' which is designed to receive a plurality of rotatable rollers 152' in parallel and spaced relation with each other in such a way that the upper face of each of the rollers 152' is aligned in height with the supporting face 147a'.

Figure 11:
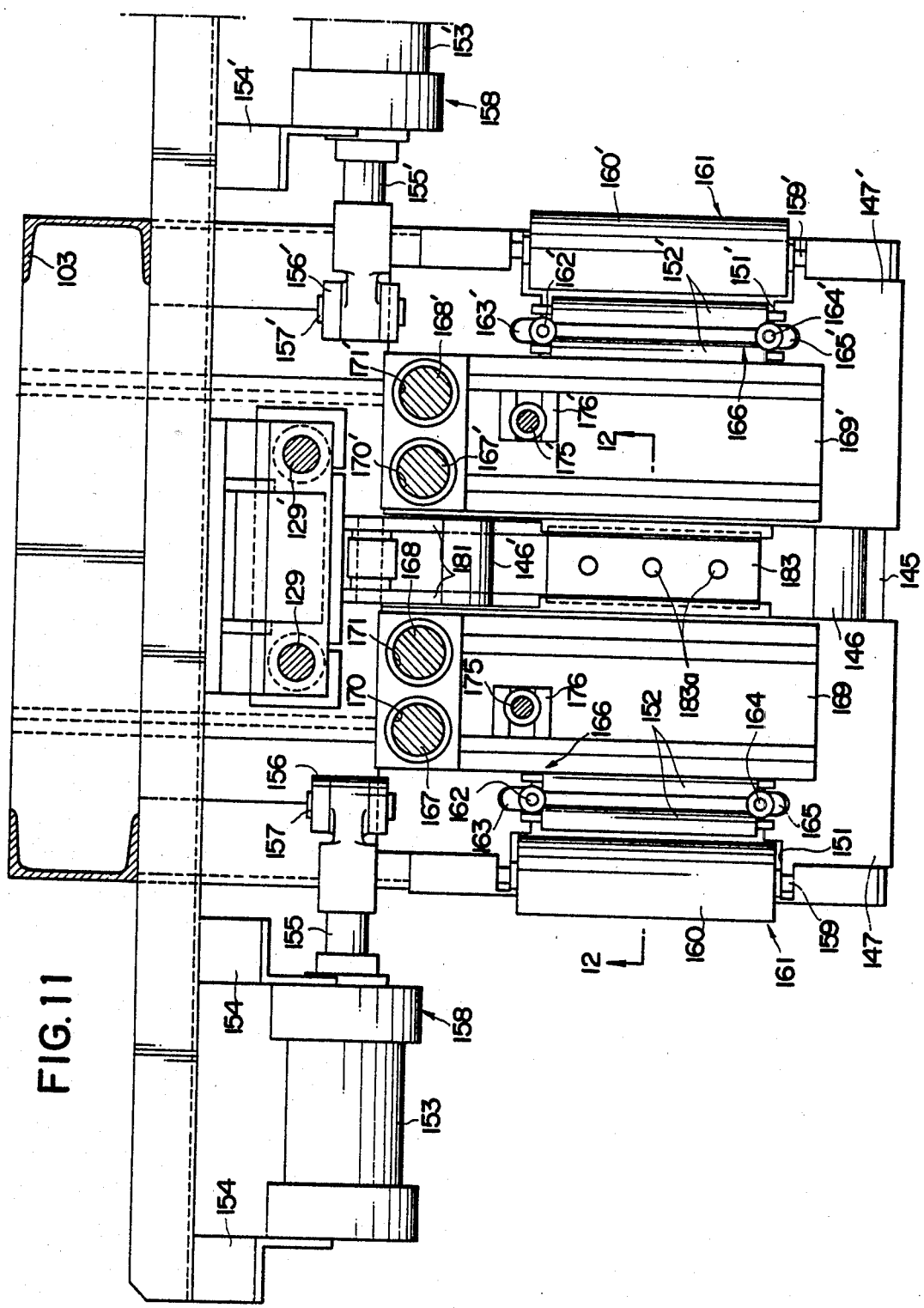
FIG. 11 is an enlarged view partially cross-sectioned as seen from the lines 11—11 of FIG. 10.
Figure 12:
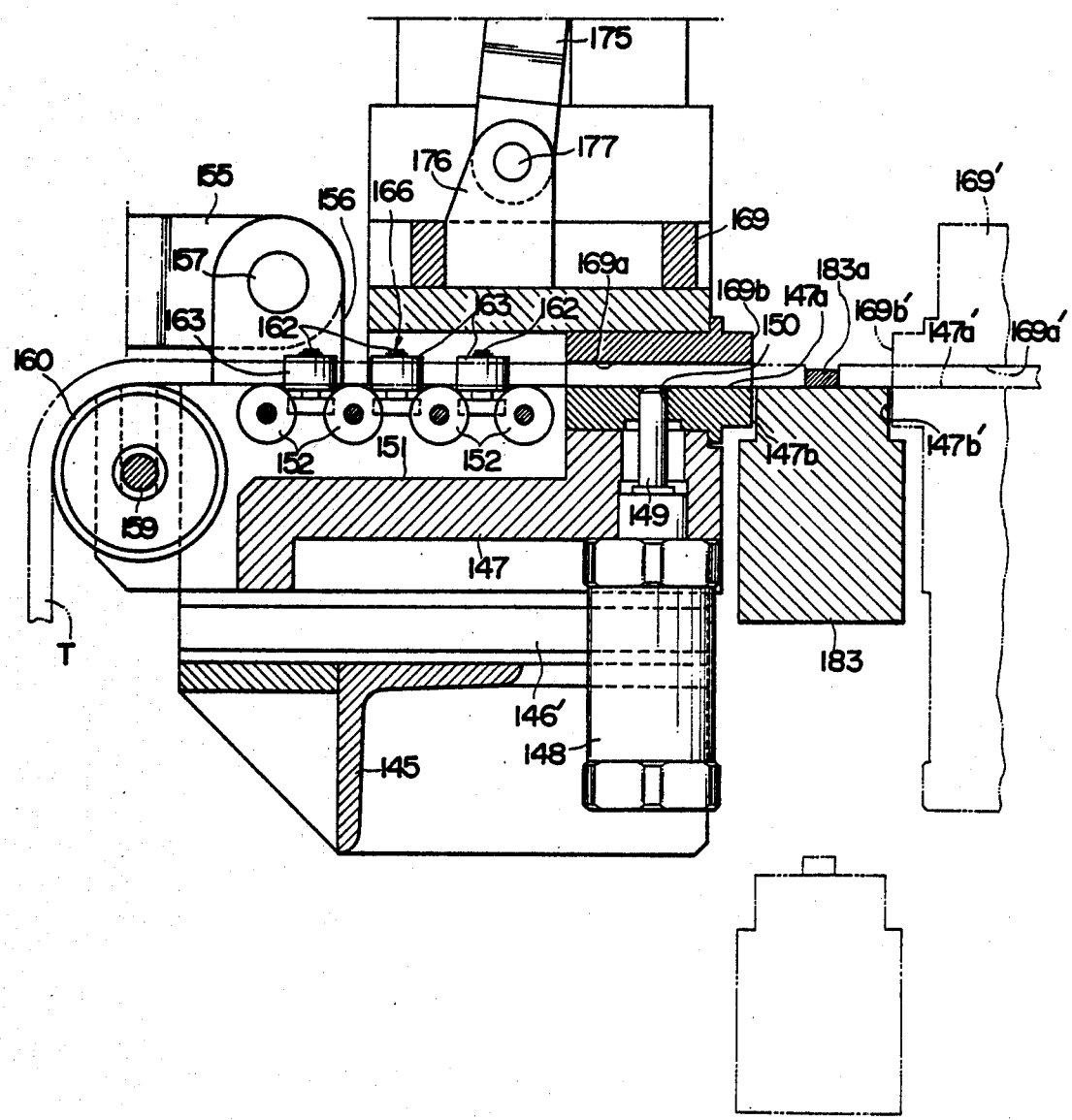
FIG. 12 is an enlarged view partially cross-sectioned as seen from the lines 12—12 of FIG. 11.

In FIGS. 8 and 11, there is provided a horizontal fluid operated cylinder 153 which is secured to the central upper frame 103 through a bracket 154 to extend along the longitudinal direction of the central frame 107. The fluid operated cylinder 153 has a piston rod 155 which is pivotally connected through a pivotal pin 157 at its leading end with a bracket 156 secured to the rear upper face of the first table 147. A horizontal fluid operated cylinder 153' which is secured to the central upper frame 103 through a bracket 154' to extend along the longitudinal direction of the central frame 107. The fluid operated cylinder 153' has a piston rod 155' which is pivotally connected through a pivotal pin 157' at its leading end with a bracket 156' secured to the rear upper face of the first table 147'. It is thus to be understood that when the fluid operated cylinders 153 and 153' are operated to cause the piston rods 155 and 155' to be projected and retracted, the first tables 147 and 147' are horizontally moved toward and away from each other along the rails 146 and 146'. The fluid operated cylinders 153, 153' and the brackets 154, 154', 156', 156, 156' constitute as a whole a first table transferring means generally denoted at 158. In FIGS. 8, 11 and 12, a rotational shaft 159 has both axial ends fixed to the first table 147 to be accommodated in the recess 151 and to support a cylindrical member 160 which has an upper face aligned in height with the supporting face 147a of the first table 147. Between the rotational shaft 159 and the cylindrical member 160 is interposed a drive motor and a planetary differential gear to driving rotate the cylindrical member 160 in a direction shown as an arrow X of FIG. 8. Another rotational shaft 159 has both axial ends fixed to the upper table 147' to be accommodated in the recess 151' and to support a cylindrical member 160 which has an upper face aligned in height with the supporting face 147a' of the first table 147'. Between the rotational shaft 159' and the cylindrical member 160' is interposed a drive motor and a planetary differential gear to drivingly rotate the cylindrical member 160' in a direction shown as an arrow X' of FIG. 8. The above pair of rotational shafts 159 and 159', the cylindrical members 160 and 160', the drive motor, and the planetary differential gear constitute as a whole a transferring means generally indicated at 161. Between the front end portions of the rollers 152 are disposed a plurality of vertical rotary shafts 162 each of which has a lower end rotatably supported on the first table 147 and supports a cylindrical roller 163. Between the rear end portions of the rollers 152 are also disposed a plurality of vertical rotary shafts 164 in opposing relation with the vertical rotary shafts 162, each of the rotary shaft 164 having a lower end rotatably supported on the first table 147 and supporting a cylindrical roller 165. On the other hand, between the front end portions of the rollers 152' are disposed a plurality of vertical rotary shafts 162', each of which has a lower end rotatably supported on the first table 147' and supports a cylindrical roller 163'. Between the rear end portions of the rollers 152' are also disposed a plurality of vertical rotary shafts 164' in opposing relation with the vertical rotary shafts 162', each of the rotary shaft 164' having a lower end rotatably supported on the first table 147' and supporting a cylindrical roller 165'. The rotary shafts 162, 162', 164, 164' and the rollers 163, 163', 165, 165' constitute as a whole a centering means generally indicated at 166. In FIGS. 8, 10, 11 and 12, a pair of vertical guide posts 167 and 168 are securely mounted on the rear upper face of the first table 147 in spaced and parallel relation with each other in the longitudinal direction of the central frame 107. A second table 169 is located above the first table 147 and has a rear portion in which is formed a pair of sliding bores 170 and 171 in sliding engagement with the guide posts 167 and 168, respectively. The second table 169 has a contacting face 169a which is in opposing relation with the supporting face 147a of the first table 147 to have a profile substantially equal to the contour of the tread rubber T. The second table 169 has at its inner side a vertical face 169b extending in alignment with the vertical face 147b of the first table 147. On the other hand, another pair of vertical guide posts 167' and 168' are securely mounted on the rear upper face of the first table 147' in spaced and parallel relation with each other in the longitudinal direction of the central frame 107. A second table 169' is located above the first table 147' and has a rear portion in which is formed a pair of sliding bores 170' and 171' in sliding engagement with the guide posts 167' and 168', respectively. The second table 169' has a contacting face 169a' which is in opposing relation with the supporting face 147a' of the first table 147' to have a profile substantially equal to the contour of the tread rubber T. The second table 169' has at its inner side a vertical face 169b' extending in alignment with the vertical face 147b' of the first table 147'. It is thus to be noted that when the fluid operated cylinders 153 and 153' are operated to cause the piston rods 155 and 155' to be projected and retracted, the second tables 169 and 169' are moved toward and away from each other together with the first tables 147 and 147' along the rails 146 and 146'. In FIGS. 8, 9, 10 and 12, a bracket 172 is secured to the lower face of the supporting frame 104 to pivotally support the rear end of a vertical fluid operated cylinder 174 through a pivotal pin 173. The fluid operated cylinder 174 has a piston rod 175 the leading end of which is pivotally connected through a pivotal pin 177 with a bracket 176 secured to the second table 169. Another bracket 172' is secured to the lower face of the supporting frame 104 to pivotally support the rear end of a vertical fluid operated cylinder 174' through a pivotal pin 173'. The fluid operated cylinder 174' has a piston 175' the leading end of which is pivotally connected through a pivotal pin 177' with a bracket 176' secured to the second table 169'. It is thus to be understood that when the fluid operated cylinders 174 and 174' are operated to cause the piston rods 175 and 175' to be projected and retracted, the second tables 169 and 169' are moved upwardly and downwardly along the guide posts 167, 168, 167' and 168'. The fluid operated cylinders 174, 174', and the brackets 172, 172', 176, 176' constitute as a whole a second table moving means, generally indicated at 178, which serves to move the second tables 169 and 169' upwardly and downwardly. As best shown in FIGS. 10 and 12, a stop member 179 is secured to the guide rods 129 and 129' somewhat below the supporting member 131 while another stop member 180 is secured to the lower ends of the guide rods 129 and 129'. A lifter 181 is positioned between the second tables 169 and 169' and has at its rear end portions a pair of sliding bores 182 and 182' which are slidably engaged with the guide rods 129 and 129' between the stop members 179 and 180. On the front end of the lifter 181 is securely mounted a projection member 183 which has three vertical protrusions 183a aligned and spaced with each other. In FIGS. 8, 9 and 10, a vertical fluid operated cylinder 184 is secured at its upper end to the bracket 130 and has a piston rod 185 the leading end of which is pivotally connected with the lifter 181 through a pivotal pin 186. It is thus to be understood that when the fluid operated cylinder 184 is operated to cause the piston rod 185 to be projected and retracted, the lifter 181 is moved upwardly and downwardly along the guide rods 129 and 129'. The upward movement of the lifter 181 is stopped by the stop member 179 whereupon the upper face of the lifter 181 is aligned in height with the supporting surfaces 147a and 147a' of the first tables 147 and 147'.

The operation of the tread band building mechanism thus constructed above will now be described hereinlater.

In preparatory stage, all the piston rods 114, 114', 123 and 123' of the fluid operated cylinder 113, 113', 122 and 122' are completely retracted, and the inner swingable frames 109, 109' and the outer swingable frames 118, 118' are maintained at their horizontal positions 116, 116', 124, and 124' as shown in dotted lined of FIG. 8. At this time, the swingable frames 126 and 126' are horizontally stretched together with the central frame 107 to form a horizontal tread rubber loading surface 115. Also at this time, the piston rod 141 of the fluid operated cylinder 140 is completely retracted so that the end severing assembly 137 is maintained at its uppermost position. Also at this time, the piston rods 155 and 155' of the fluid operated cylinder 153 and 153' are completely retracted so that the first tables 147 and 147' are maintained at their remotest spaced positions. As the consequence, the second tables 169 and 169' are also maintained at their remotest spaced positions. Also at this time, the piston rods 175 and 175' of the fluid operated cylinders 174 and 174' are completely retracted, and the second tables 169 and 169' are moved upwardly to assume their uppermost positions where the second tables 169 and 169' are most remotely spaced from the first tables 147 and 147'. Also at this time, the piston rod 185 of the fluid operated cylinder 184 is completely projected, and the lifter 181 is upwardly moved to assume its uppermost position where the upper face of the lifter 181 is held aligned in height with the supporting surfaces 147a and 147a' of the first tables 147 and 147'.

In the first stage, an endless adhesive tread rubber T severed in a predetermined length is transferred to and loaded on the tread rubber loading surface 115 by a suitable transferring mechanism not shown. The central portion of the tread rubber T is positioned on the central frame 107 while the end portions of the tread rubber T are positioned on the swingable frames 126 and 126'.

In the second stage, the fluid operated cylinders 113 and 113' are concurrently operated to cause the piston rod 114 and 114' to be projected so that the inner swingable frames 109 and 109' are swung upwardly from their horizontal positions 116 and 116' together with the outer swingable frames 118 and 118' around the longitudinal both ends of the central frame 107. As the result, the ends of the tread rubber T on the swingable frames 126 and 126' are turned up. The swinging motions of the inner swingable frames 109 and 109' are stopped at the vertical positions 117 and 117'.

In the third stage, the fluid operated cylinder 122 and 122' are concurrently operated to cause the piston rods 123 and 123' to be projected so that the outer swingable frames 118 and 118' are swung around the rotational axes 110a and 110a' to the vertical positions 125 and 125' where the ends of the tread rubber T are further turned up. At this time, the ends of the tread rubber T are held by the rollers 119 and 119' of the outer swingable frames 118 and 118' and the cylindrical members 160 and 160' as shown in phantom lines of FIG. 8. The transferring mechanism 161 is then operated to cause the cylindrical members 160 and 160' to be rotated as shown in arrows X and X' of FIG. 8 so that the ends of the tread rubber T held by the rollers 119, 119' and the cylindrical members 160, 160' are moved toward each other on the rollers 152 and 152' of the first tables 147 and 147'. At this time, the centering means 166 serves to center the end portions of the tread rubber T in cooperation with the transferring means 161 in such a way that the side faces of the tread rubber T are in rolling contact with the rollers 163, 165, 163' and 165' to regulate the travelling direction of the tread rubber T. The transfer of the tread rubber T is stopped when the leading ends of the tread rubber T are brought into engagement with the protrusion 183a of the projection member 183. At this time, the lower surface of the tread rubber T is supported on the supporting faces 147a and 147a' of the first tables 147 and 147'. Also at this time, the opposing end faces of the tread rubber T are spaced with each other with a distance substantially equal to the diameter of the projection 183a.

In the fourth stage, the fluid operated cylinders 174 and 174' are concurrently operated to cause the piston rods 175 and 175' to be projected so that the second tables 169 and 169' are downwardly moved along the guide posts 167, 168, 167' and 168' until the contacting faces 169a and 169a' of the second tables 169 and 169' are brought into contact with the upper end faces of the tread rubber T as shown in phantom lines in FIG. 10 and in solid lines in FIG. 12. As the result, the end portions of the tread rubber T are held by the second tables 169, 169' and the first tables 147, 147'. At this time, the end portions of the tread rubber T are pressingly held by the second tables 169, 169' and the first tables 147, 147' since the contacting faces 169a and 169a' of the second tables 169 and 169' equally formed in contour to the upper end faces of the tread rubber T.

Also at this time, the end faces of the tread rubber T are projected from the vertical faces 169b, 169b', 147b and 147b' of the first and second tables 169, 169', 147 and 147' at a predetermined length. The fluid operated cylinder 113, 113', 122 and 122' are then concurrently operated to cause the piston rods 114, 114', 123 and 123' to be retracted so that the inner and outer swingable frames 109, 109', 118 and 118' are swung from the vertical positions 117, 117', 125 and 125' as shown in phantom lines in FIG. 8 to the horizontal positions 116, 116', 124 and 124' as shown in solid lines of FIG. 8.

In the fifth stage, the fluid operated cylinder 140 is operated to cause the piston rod 141 to be projected so that the slider 133 and the end severing assembly 137 are downwardly moved along the guide rods 129 and 129' toward the end portions of the tread rubber T which are projected on the vertical faces 147b, 169b, 147b', and 169b'. The downward movement of the slider 133 thereby causes the end severing assembly 137 to pass through the vertical faces 147b, 147b', 169b and 169b' and to cause the blades 135 and 135' to cut the end portions of the tread rubber T projected on the vertical faces 147b, 169b, 147b' and 169b' at the predetermined length. The length of the tread rubber T is substantially equal to the final building circumferential length at the time when the tread rubber T is applied with the green case 3. The downward movement of the slider 133 is stopped when the slider 133 is brought into engagement with the stop member 132 and the blades 135 and 135' of the end severing assembly 137 are brought into engagement with the upper face of the lifter 181 as shown in phantom lines of FIG. 10. By the severings of the end portions of the tread rubber T, flat new end faces are generated and the projection amount of the tread rubber T projected from the vertical faces 147b, 169b, 147b' and 169b' becomes smaller than that of the tread rubber T before severed. The new projection amount preferably ranges 5 to 10 percents of the most thickened portion in cross section of the tread rubber T although the projection amount is somewhat fluctuated by the cross sectional contour of the tread rubber T. The reason is due to the fact that if the projection amount is extremely small the amount of a deformable tread rubber is too small and thereby makes its adhesion or jointing to be decreased even if the adhesion force is enhanced, and that if the projection amount is extremely large there is caused a loss of uniformity in cross section of the adhesion portions since the amount of the deformable tread rubber is abundant.

In the sixth stage, the fluid operated cylinder 140 is operated to cause the piston rod 141 to be retracted so that the slider 133 and the end severing assembly 137 are moved upwardly along the guide rods 129 and 129' away from the tread rubber T. The upward movement of the slider 133 and the end severing assembly 137 are stopped when the slider 133 is moved to its initial position. The fluid operated cylinder 184 is then operated to cause the piston rod 185 to be retracted so that the lifter 181 is moved downwardly while being guided by the guide rods 129 and 129' until the lifter 181 is brought into engagement with the stopper 180.

In the seventh stage, the fluid operated cylinders 153 and 153' are concurrently operated to cause the piston rods 155 and 155' to be projected so that the second tables 160, 169' and the first tables 147, 147' are moved toward each other while holding the end portions of the tread rubber T along the rails 146 and 146' in the longitudinal direction of the central frame 107. The movements of the second tables 169, 169' and the first tables 147, 147' are stopped when they are brought into engagement with the vertical faces 169b' and 147b'. As the consequence, the end portions of the tread rubber T projected from the vertical faces 169b, 147b, 169b' and 147b' are pressingly deformed and butt jointed. At this time, the end portions of the tread rubber T butt jointed are completely aligned since the end portions of the tread rubber T are centered by centering means 166. In this manner, there is built a tread band 5 which has a circumferential length substantially equal to the final building circumferential length at the time when the tread band 5 is assembled with the green case 3.

In the eighth stage, the fluid operated cylinders 174 and 174' are concurrently operated to cause the piston rods 175 and 175' to be retracted so that the second tables 169 and 169' are moved upwardly along the guide posts 167, 168 167' and 168' away from the butted and jointed portions of the tread band 5. At this time, the second tables 169 and 169' are easily separated from the jointed portions of the tread band 5 since the adhesion of the jointed portions of the tread band 5 and the contacting faces 169a and 169a' of the second tables 169 and 169' are not so strong as that of the jointed portions of the tread band 5 and the supporting faces 147a and 147a' of the first tables 147 and 147'. If the second tables 169, 169' and the first tables 147, 147' are not easily separated from the jointed portions of the tread band 5, it is preferable to make a special surface treating on the contacting faces 169a and 169a' of the second tables 169 and 169' or the supporting faces 147a and 147a' of the first table 147 and 147'. The pair of fluid operated cylinders 148 are then concurrently operated to cause the piston rods 149 to be projected until the leading ends of the piston rod 149 extend onto the supporting faces 147a and 147a' of the first tables 147 and 147', thereby making the jointed portions of the tread band 5 to be forcibly separated from the supporting faces 147 and 147a' of the first tables 147 and 147'.

In the ninth stage, the tread band 5 thus butt jointed is supported by two rollers of the tread band building mechanism and removed forwardly to be received by the applying drum 8 which is in a contracted state. The fluid operated cylinders 153 and 153' are concurrently operated to cause the piston rods 155 and 155' to be retracted so that the second tables 169, 169' and the first tables 147 and 147' are moved away from each other to their initial position as described in the preparatory stage. At this time, the pair of fluid operated cylinders 148 are concurrently operated to cause the piston rods 149 to be retracted from the supporting faces 147a and 147a' of the first tables 147 and 147'. The fluid operated cylinder 184 is then operated to cause the piston rod 185 to be projected so that the lifter 181 is upwardly moved to its initial stage as explained in the preparatory stage.

While there has been described one cycle of the operation of the tread band building mechanism, such cycles will be repeated if a number of the tread bands 5 are built from the tread rubber T. Any one of the first tables 147 and 147' of the tread band building mechanism may be horizontally moved in a longitudinal direction of the central frame 107 with the remaining one of the first tables 147 and 147' stationarily secured to the central frame 107. In addition, any one of the second tables 169 and 169' may be horizontally moved in a longitudinal direction of the central frame 107 with the remaining one of the second tables 169 and 169' stationarily secured. The second tables 169 and 169' may be supported on the central frame 107.

While there has been described in the above that the inner swingable frame 109 and the outer swingable frame 118 are swung upwardly with respect to the central frame 107 or the inner swingable frame 109, the inner swingable frame 109 and the outer swingable frame 118 may be swung downwardly to turn down the tread rubber T without "being upwardly moved" as described above.

The breaker band building mechanism employed in the first to sixth embodiments will now be described hereinlater.

Figure 13:
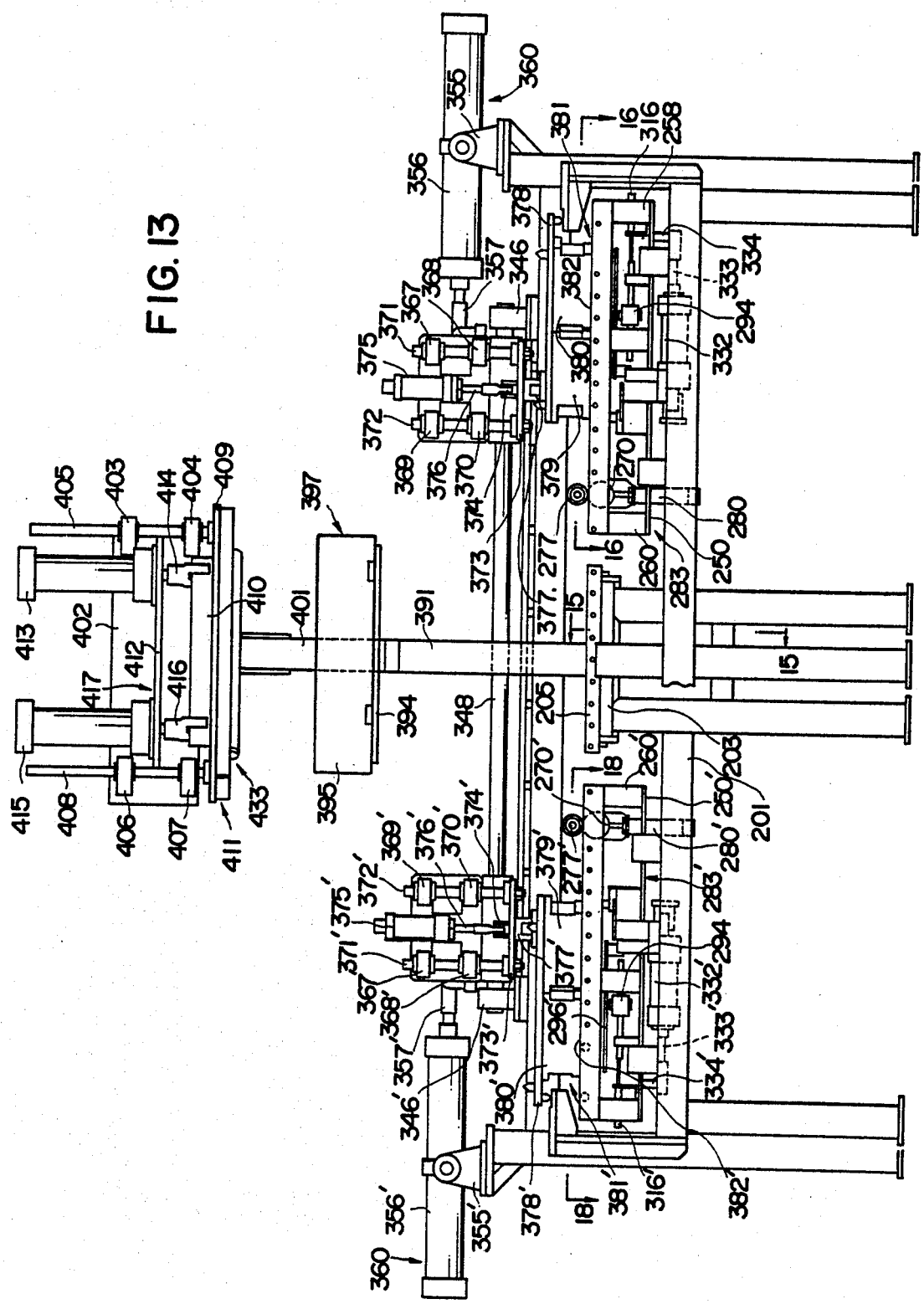
FIG. 13 is an elevational view of a breaker band building mechanism employed in the first to sixth embodiments illustrated in FIGS. 3 to 7.
Figure 14:
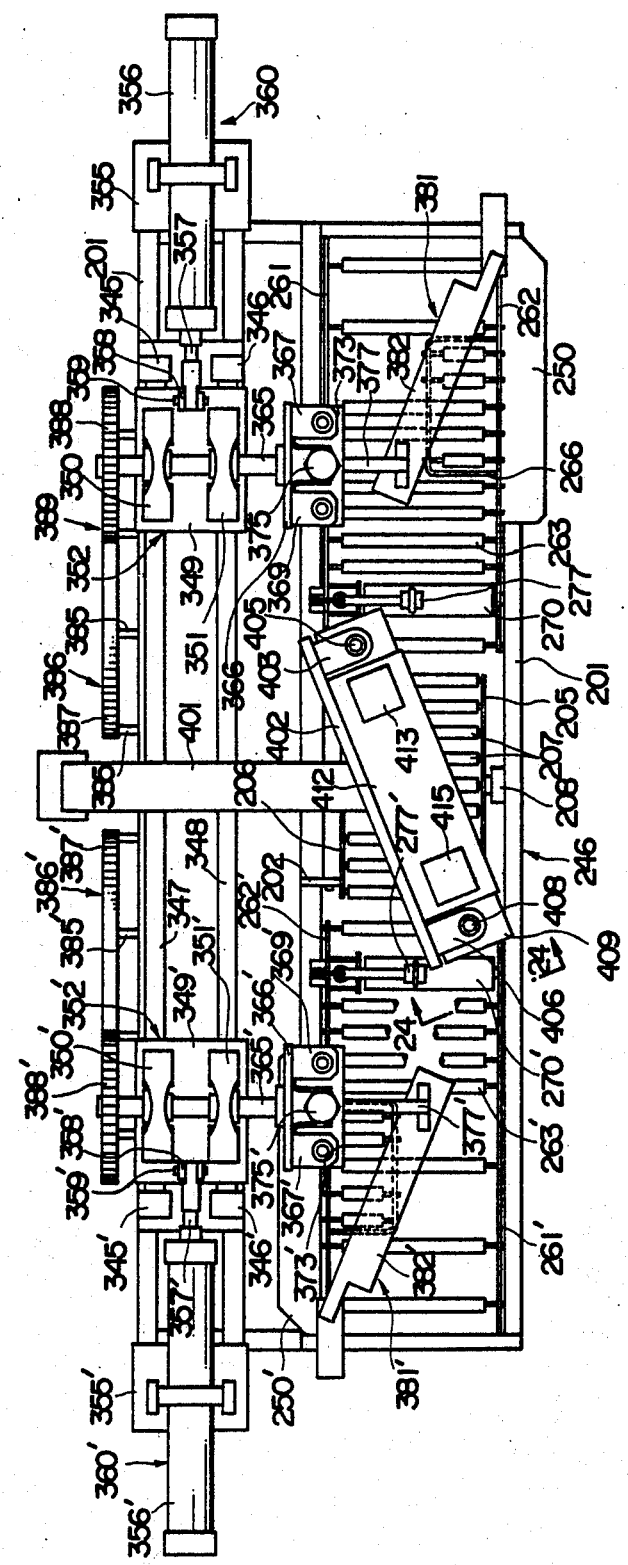
FIG. 14 is a plan view of the breaker band building mechanism illustrated in FIG. 13.
Figure 15:
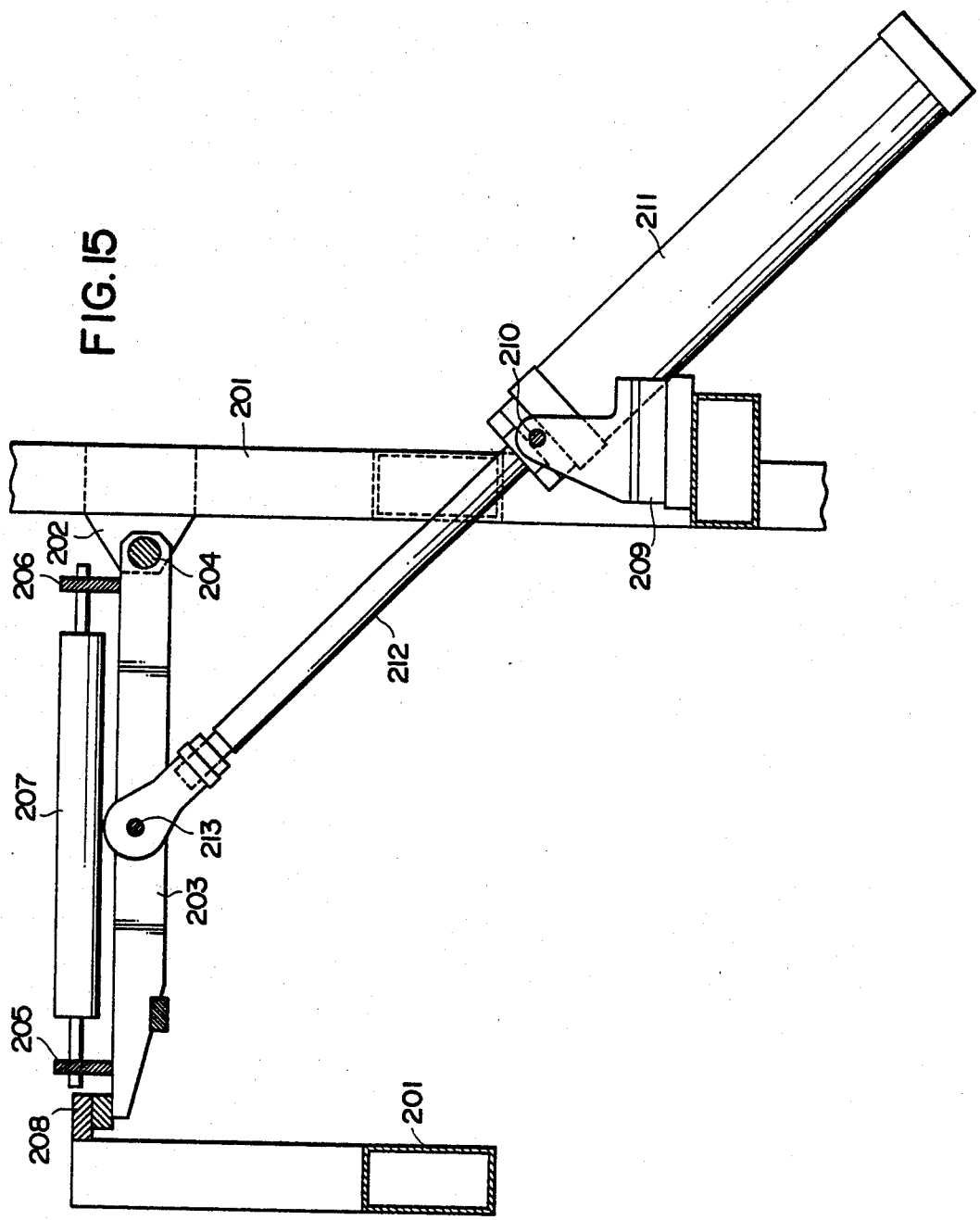
FIG. 15 is a view partially cross-sectioned as seen from the lines 15—15 of FIG. 13.

In FIGS. 13 and 14, the reference numeral 201 indicates a frame made of an angle member and extending in a forward and backward direction and having a central inner side to which a bracket 202 is fixed as particularly shown in FIG. 15. A swingable plate 203 is pivotally connected at one end with the bracket 202 through a pivotal pin 204 and has an upper surface on which a pair of supporting plates 205 and 206 are securely mounted in parallel and spaced relation with each other in the forward and backward direction of the frame 201. A plurality of rollers 207 are pivotally supported at their axial ends on the supporting plates 205 and 206 in parallel and spaced relation with each other. On the upper portion of the frame 201 in opposing relation with the bracket 202 is securely mounted a stop member 208 which courses the other end of the swingable plate 203 to be brought into engagement with the stop member 208, thereby maintaining the swingable plate 203 in its horizontal state when the swingable plate 203 is swung upwardly. A bracket 209 is secured to the frame 201 immediately below the bracket 202 to pivotally support through a pivotal pin 210 a fluid operated cylinder 211 having a piston rod 12 the leading end of which is pivotally connected through a pivotal pin 213 with the central portion of the swingable plate 203. It is therefore to be understood that when the fluid operated cylinder 211 is operated to cause the piston rod 212 to be retracted, the swingable plate 203 is swung downwardly around the pivotal pin 204, and that when the fluid operated cylinder 211 is operated to cause the piston rod 212 to be projected, the swingable plate 203 is swung upwardly around the pivotal pin 204 to its horizontal state where the other end of the swingable plate 203 is brought into engagement with the stop member 208.

Figure 16:
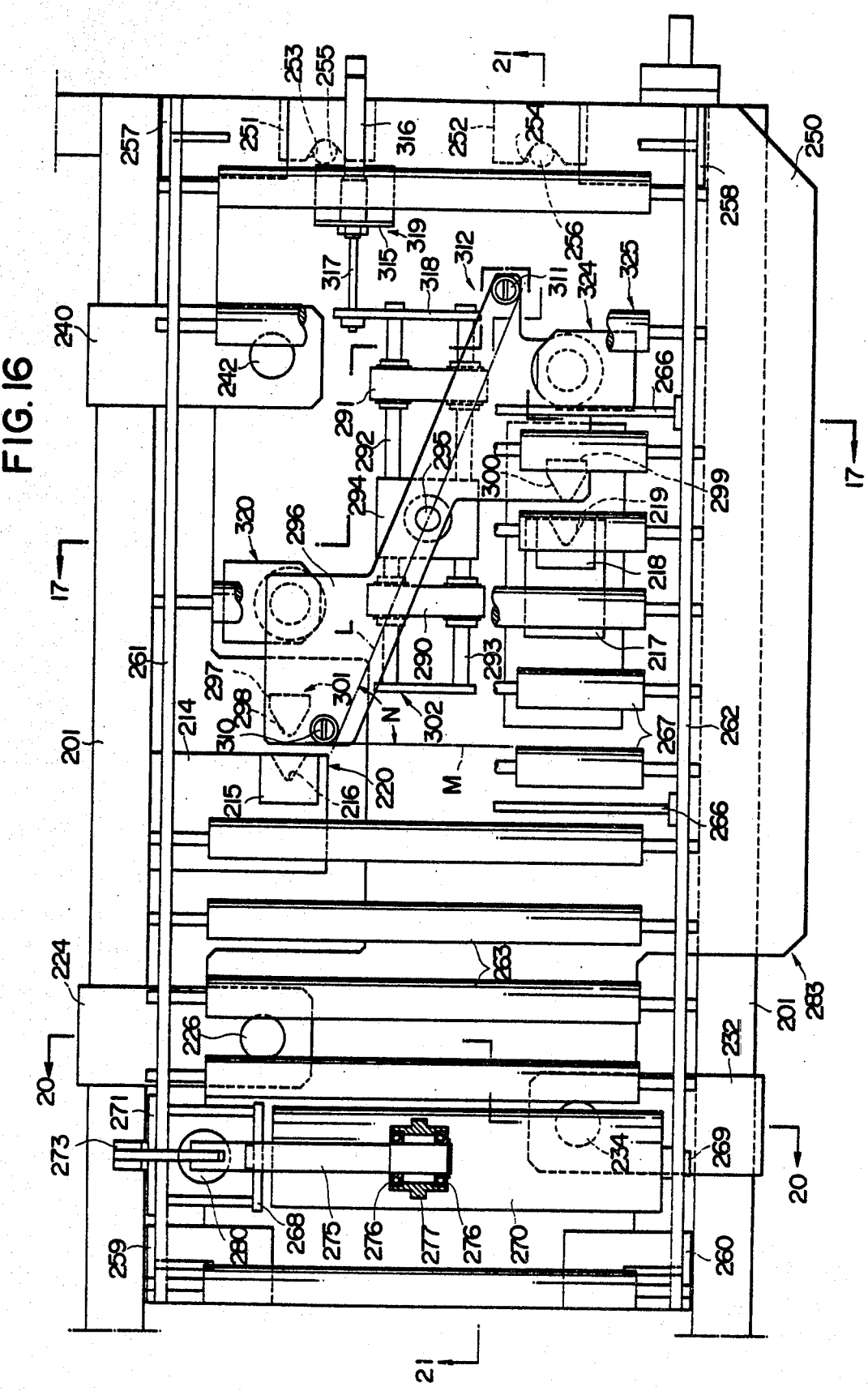
FIG. 16 is a view partially cross-sectioned as seen from the lines 16—16 of FIG. 13.
Figure 17:
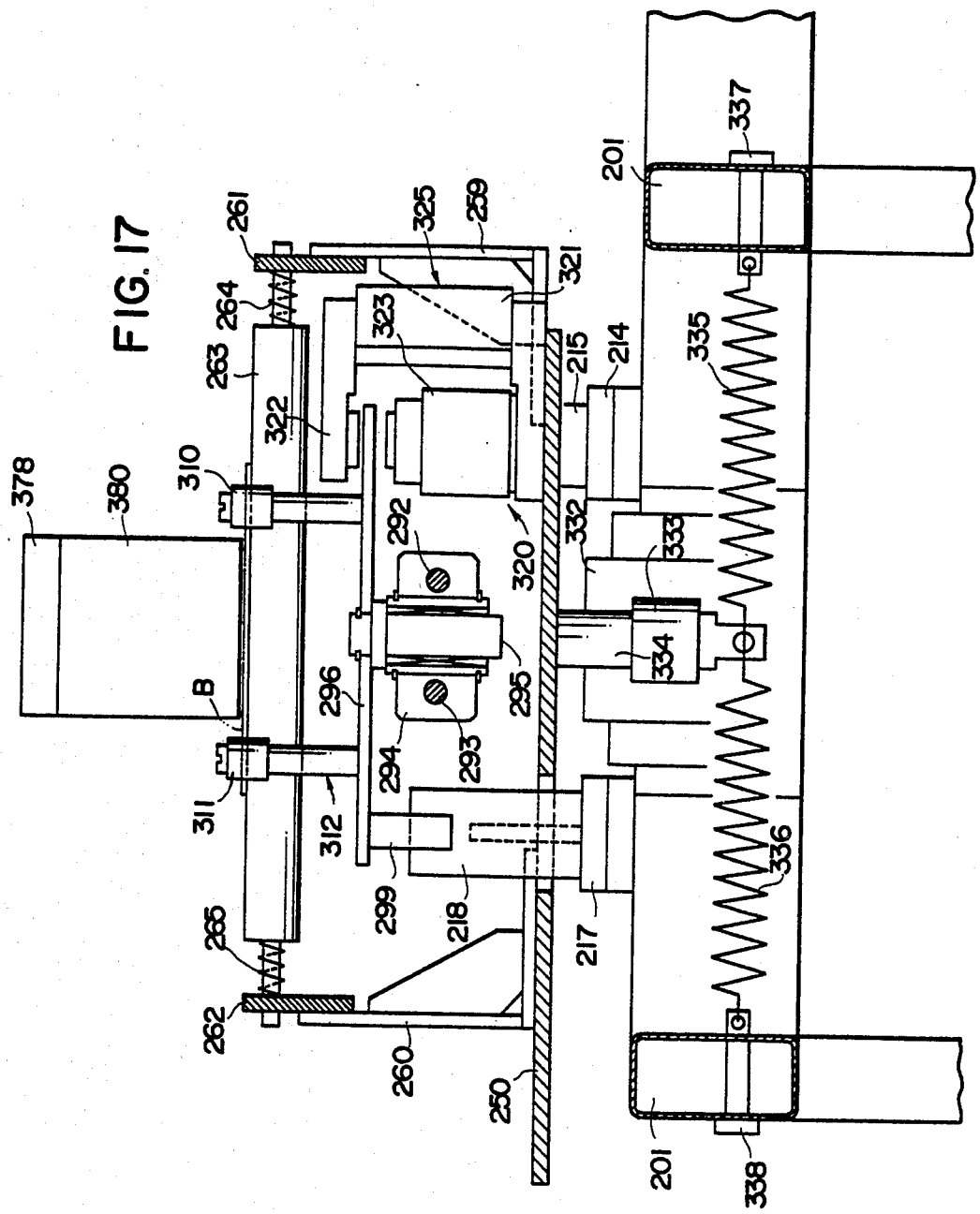
FIG. 17 is a view partially cross-sectioned as seen from the lines 17—17 of FIG. 16.

In FIGS. 16 and 17, the reference numberal 214 indicates a supporting member which is secured to the front end inner side of the frame 201. On the supporting member 214 is securely mounted a positioning member 215 on the front side of which is a conical positioning recess 216 is formed. Another supporting member 217 is secured to the inner side of the frame 201 in front of the supporting member 214 and has an upper surface on which is securely mounted another positioning member 218. On the front side of the supporting member 218 is formed another conical positioning recess 219 which has a height substantially equal to that of the foregoing positioning recess 216. The previously mentioned positioning recesses 215 and 218 constitute as a whole a positioning assembly generally indicated at 220.

Figure 18:
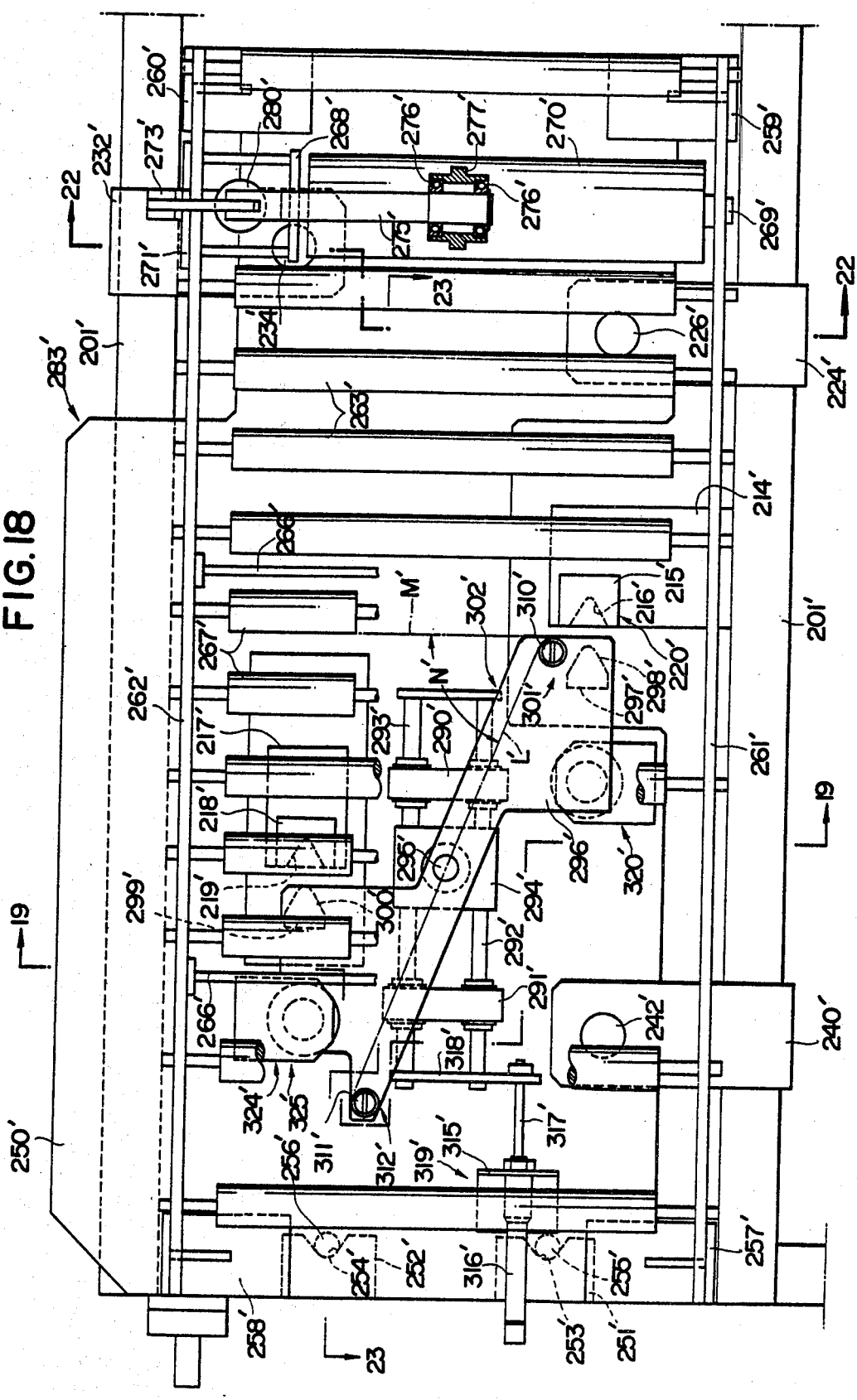
FIG. 18 is a view partially cross-sectioned as seen from the lines 18—18 of FIG. 13.
Figure 19:
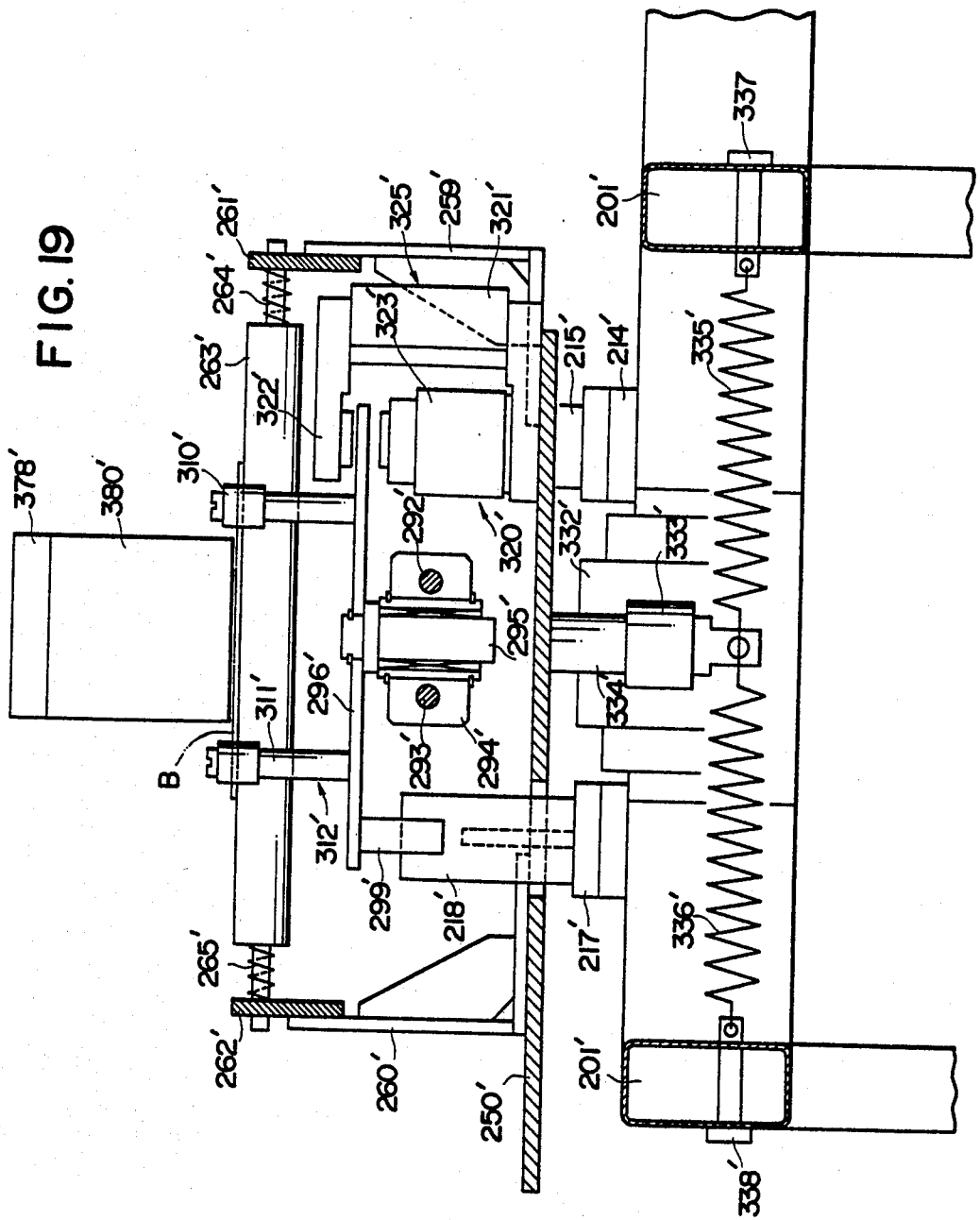
FIG. 19 is a view partially cross-sectioned as seen from the lines 19—19 of FIG. 18.
Figure 20:
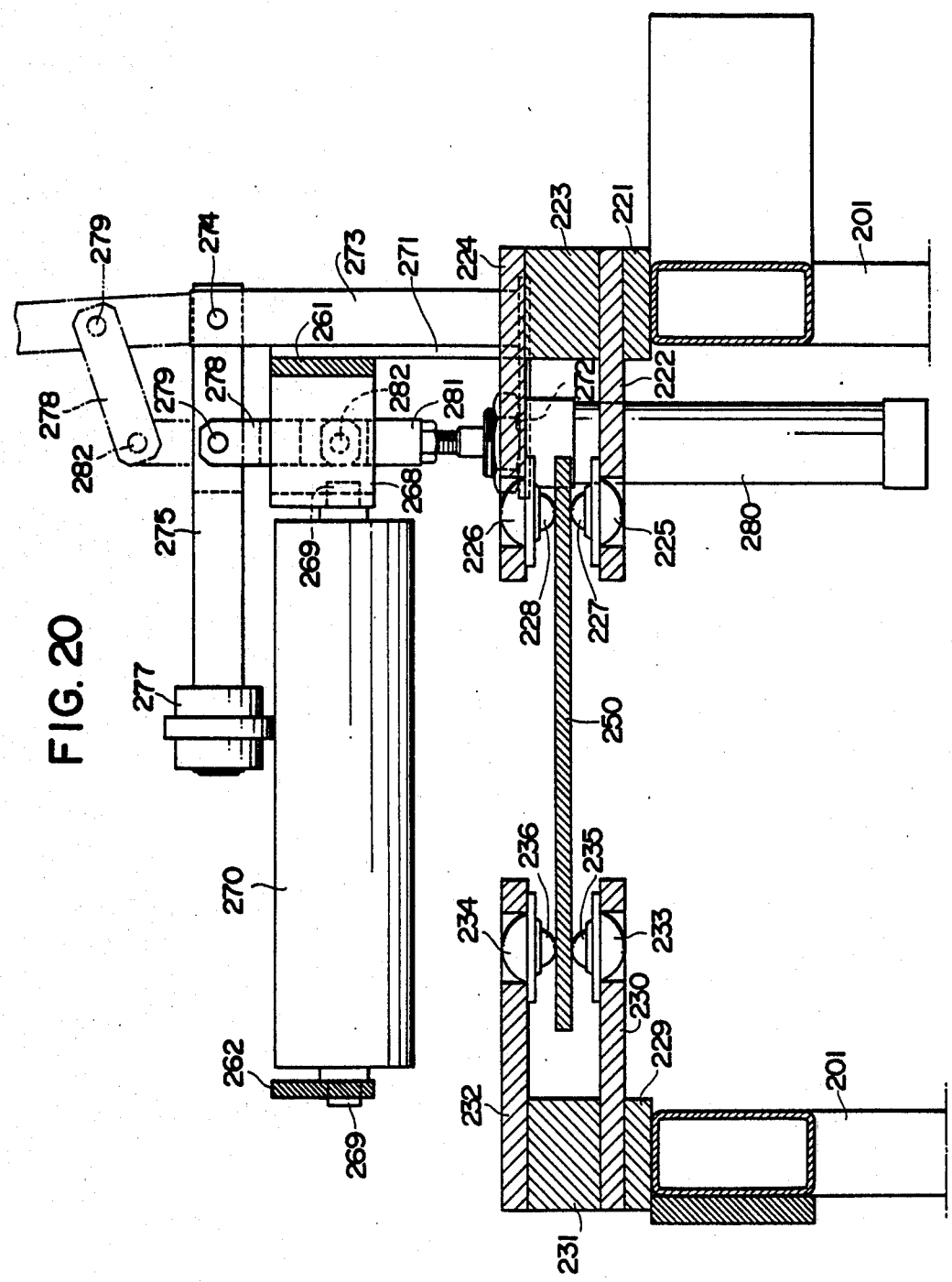
FIG. 20 is a view partially cross-sectioned as seen from the lines 20—20 of FIG. 16.
Figure 21:
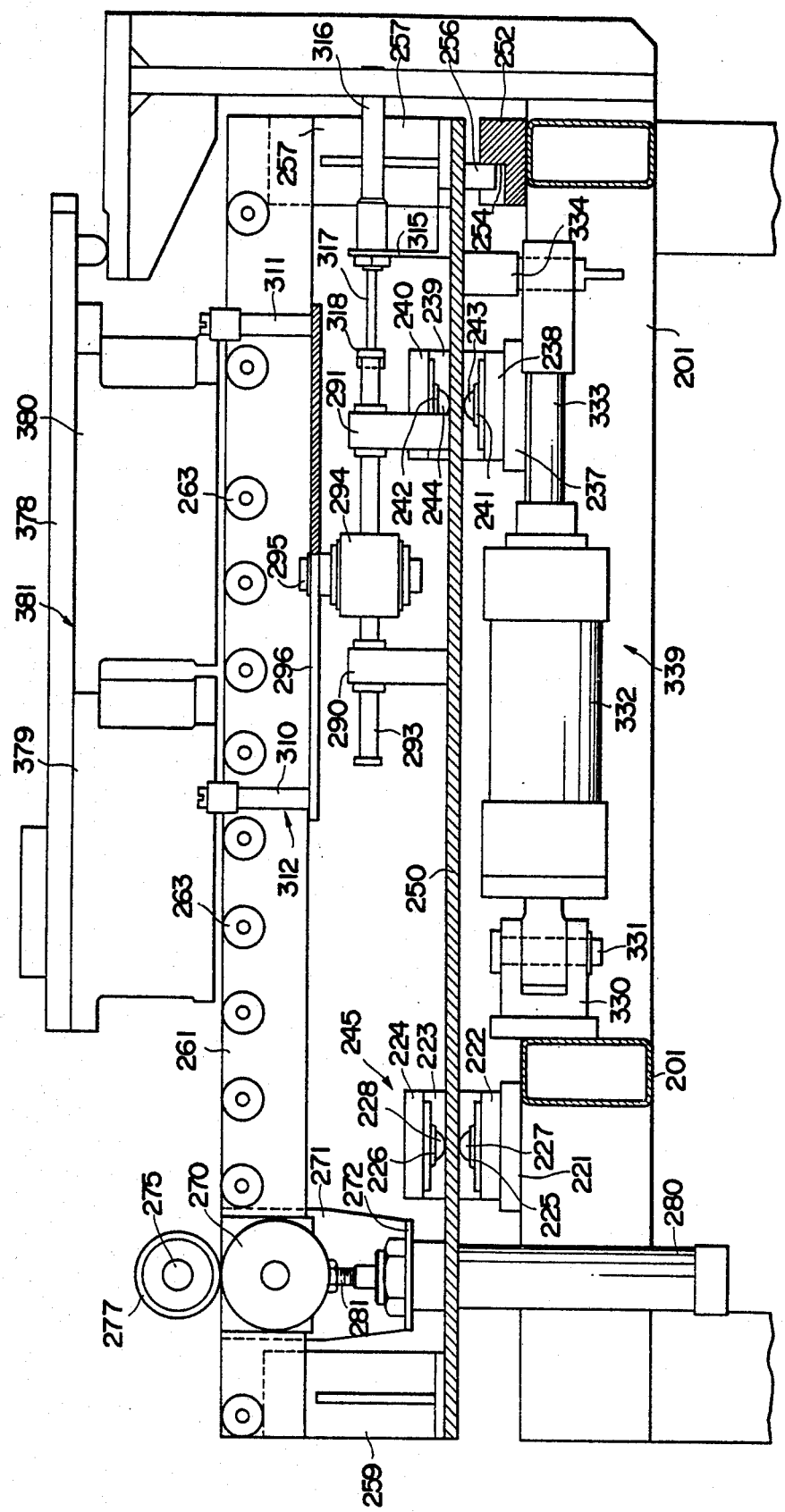
FIG. 21 is a view partially cross-sectioned as seen from the lines 21—21 of FIG. 16.

In FIGS. 18 and 19, the reference numeral 214' indicates a supporting member which is secured to the front end inner side of the frame 201. On the supporting member 214' is securely mounted a positioning member 215' on the front side of which is a conical positioning recess 216' is formed to have a height substantially equal to that of the positioning recess 216. Another supporting member 217' is secured to the inner side of the frame 201 backwardly of the supporting member 214' and has an upper surface on which is securely mounted another positioning member 218'. On the rear side of the supporting member 218' is formed another conical positioning recess 219' which has a height substantially equal to that of the foregoing positioning recess 216'. The previously mentioned positioning recesses 215' and 218' constitute as a whole an additional positioning assembly generally indicated at 220'. It is thus to be noted that the positioning assembly 220 is positioned in spaced relation with the positioning assembly 220' in the longitudinal direction of the frame 201. As best shown in FIGS. 16, 20 and 21, the reference numeral 221 designates a plate member which is secured to the upper front end portion of the frame 201 on which a supporting plate 222 is securely mounted to extend inwardly. On the supporting plate 222 is securely mounted a spacer 223 on which another supporting plate 224 is securely mounted immediately above the supporting plate 222 to extend inwardly, having a substantially same contour or shape as the previous supporting plate 222, with a vertical space equal to the thickness of the spacer 223 between the supporting plates 222 and 224. On the free end portions of the supporting plate 222 and 224 are mounted semi-spherical receivers 225 and 226 which have therein spherical members 227 and 228, respectively, in spaced relation with each other. The reference numeral 229 designates a plate member which is secured in opposing relation with the plate member 221 to the upper portion of the frame 201 on which a supporting plate 230 is securely mounted to extend inwardly. On the supporting plate 230 is securely mounted a spacer 231 on which another supporting plate 232 is securely mounted immediately above the supporting plate 230 to extend inwardly, having a substantially same contour or shape as the previous supporting plate 230, with a vertical space equal to the thickness of the spacer 231 between the supporting plates 230 and 232. On the free end portions of the supporting plate 230 and 232 are mounted semi-spherical receivers 233 and 234 which have therein spherical members 235 and 236, respectively, in spaced relation with each other. The space between the spherical members 235 and 236 is substantially equal to that between the spherical members 227 and 228. The reference numeral 237 designates a plate member which is secured in parallel and spaced relation with the plate member 221 to the upper portion of the frame 201 on which a supporting plate 238 is securely mounted to extend inwardly. On the supporting plate 238 is securely mounted a spacer 239 on which another supporting plate 240 is securely mounted immediately above the supporting plate 238 to extend inwardly, having a substantially same contour or shape as the previous supporting member 238, with a vertical space equal to the thickness of the spacer 239 between the supporting plates 238 and 240. On the free end portions of the supporting plates 238 and 240 are mounted semi-spherical receivers 241 and 242 which have therein spherical members 243 and 244, respectively, in spaced relation with each other. Between the spherical members 243 and 244 is formed a space which has a height substantially equal to that between the spherical members 227 and 228. The supporting plates 222, 224, 230, 232, 238, 240 and the receivers 225, 226, 233, 234, 241, 242 constitute as a whole a movable frame supporting mechanism generally indicated at 245 which serves to movably support in a horizontal plane a movable frame which will become apparent as the description proceeds.

Figure 22:
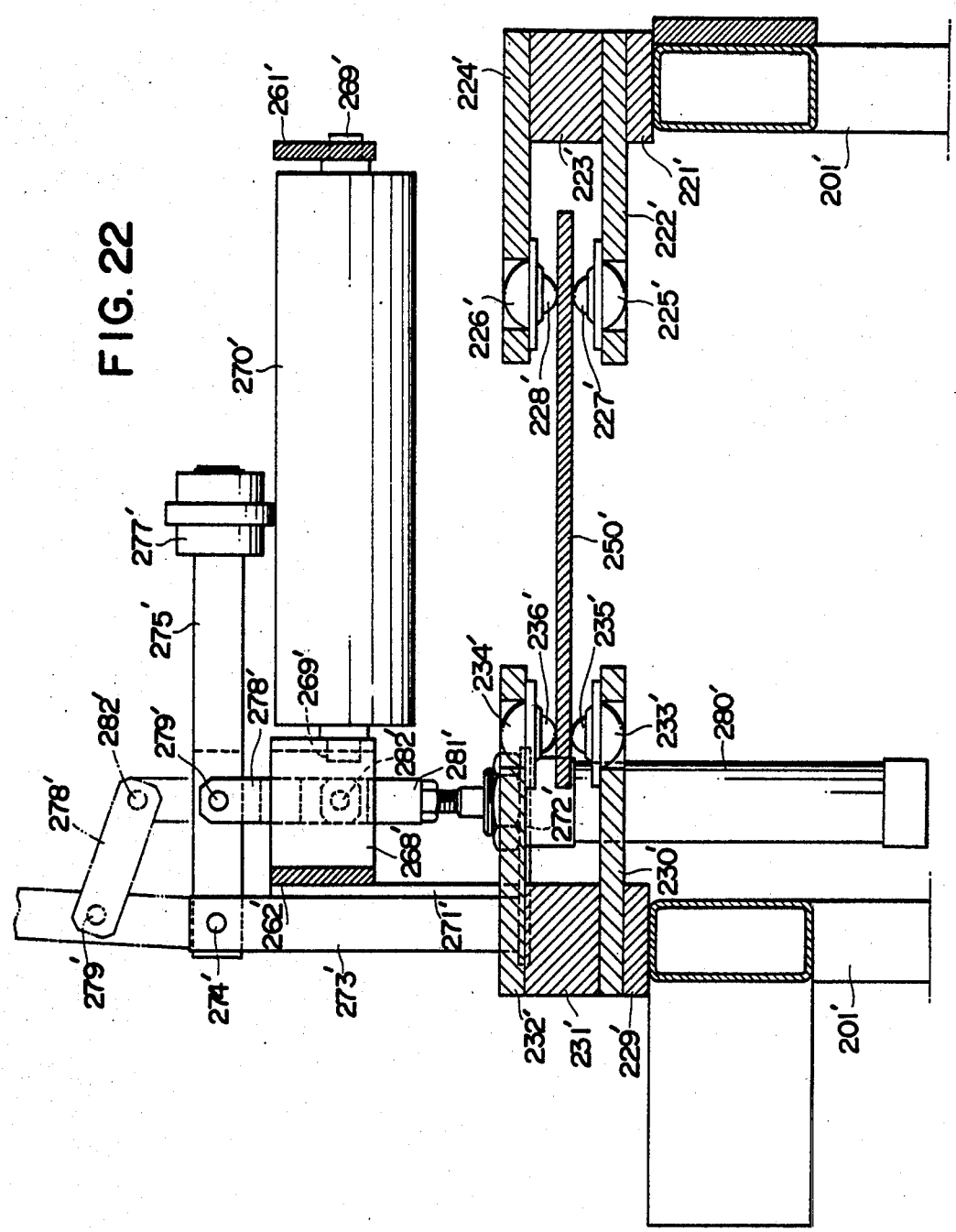
FIG. 22 is a view partially cross-sectioned as seen from the lines 22—22 of FIG. 18.
Figure 23:
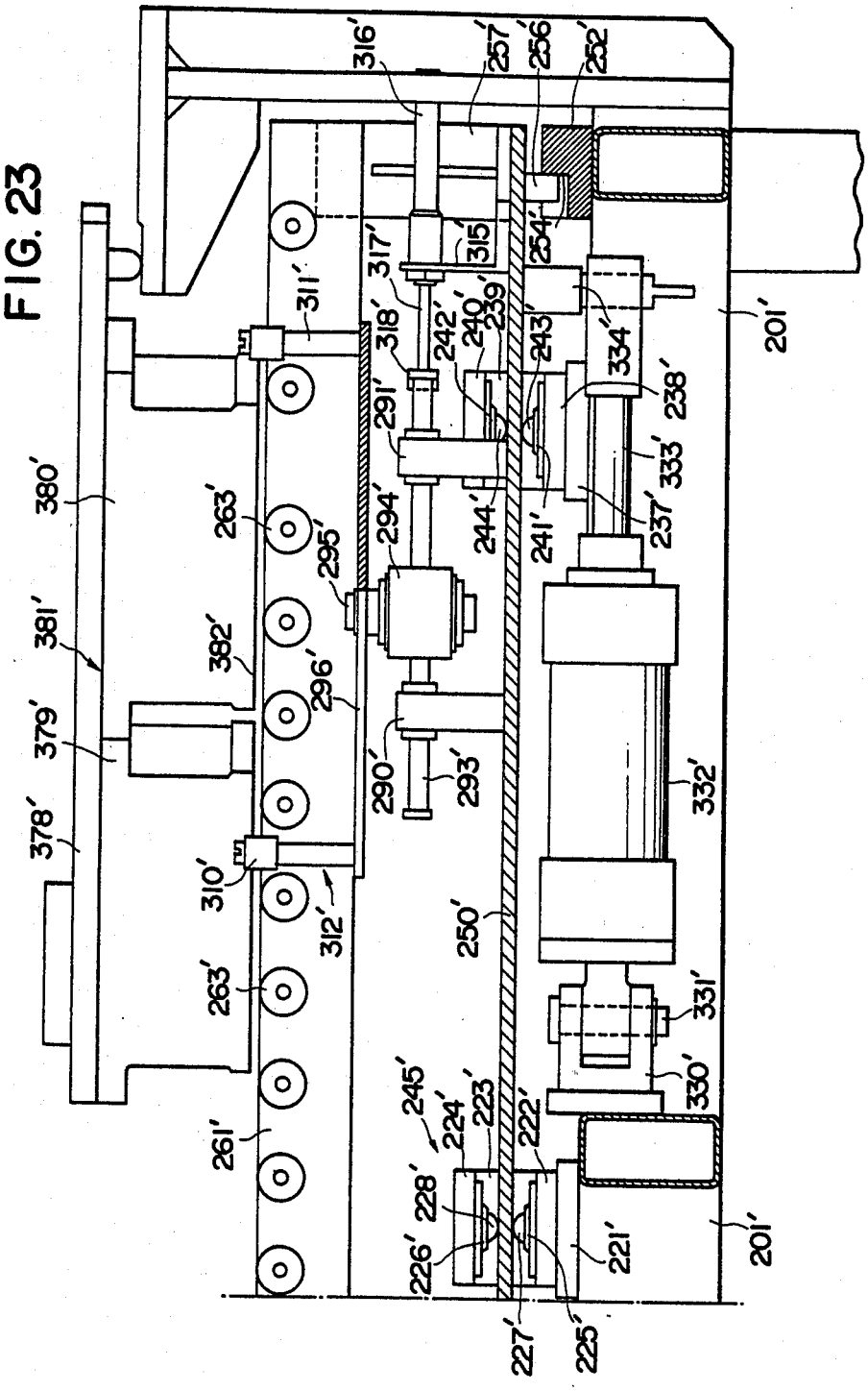
FIG. 23 is a view partially cross-sectioned as seen from the lines 23—23 of FIG. 18.
Figure 24:
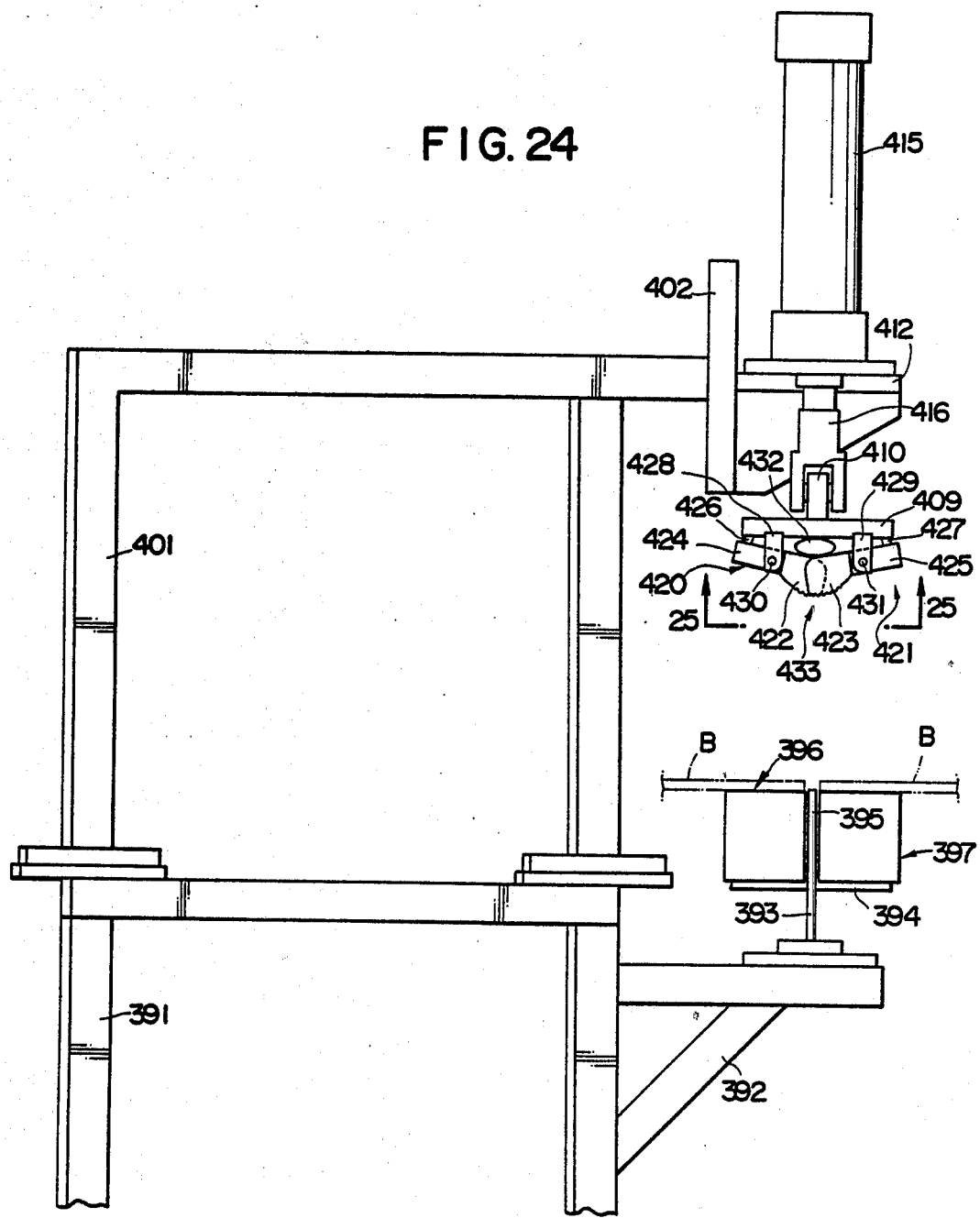
FIG. 24 is a side view as seen from the lines 24—24 of FIG. 14.
Figure 25:
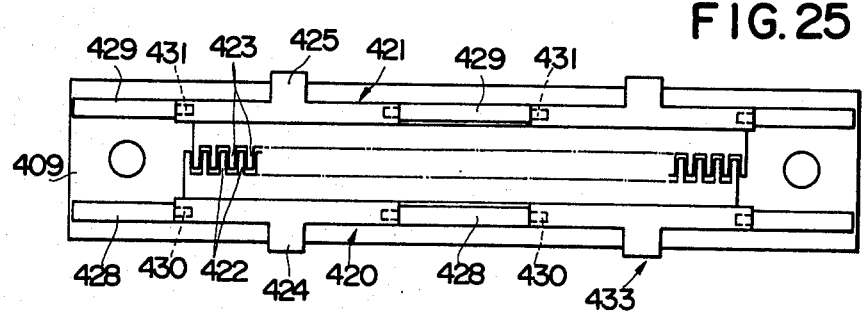
FIG. 25 is a view as seen from the lines 25—25 of FIG. 24.

In FIGS. 18, 22 and 23, the reference numeral 221' designates a plate member which is secured to the upper rear end portion of the frame 201 on which a supporting plate 222' is securely mounted to extend inwardly. On the supporting plate 222' is securely mounted a spacer 223' on which another supporting plate 224' is securely mounted immediately above the supporting plate 222' to extend inwardly, having a substantially same contour or shape as the previous supporting member 222', with a vertical space equal to the thickness of the spacer 223' between the supporting plates 222' and 224'. On the free end portions of the supporting plates 222' and 224' are mounted semi-spherical receivers 225' and 226' which have therein spherical members 227' and 228', respectively, in spaced relation with each other. The reference numeral 229' designates a plate member which is secured in opposing relation with the plate member 221' to the upper portion of the frame 201 on which a supporting plate 230' is securely mounted to extend inwardly. On the supporting plate 230' is securely mounted a spacer 231' on which another supporting plate 232' is securely mounted immediately above the supporting plate 230' to extend inwardly, having a substantially same contour or shape as the previously supporting plate 230', with a vertical space equal to the thickness of the spacer 231' between the supporting plates 230' and 232'. On the free end portions of the supporting plate 230' and 232' are mounted semi-spherical receivers 233' and 234' which have therein spherical members 235' and 236', respectively, in spaced relation with each other. The space between the spherical members 235' and 236' is substantially equal to that between the spherical members 227' and 228'. The reference numeral 237' designates a plate member which is secured in parallel and spaced relation with the plate member 221' to the upper portion of the frame 201 on which a supporting plate 238' is securely mounted to extend inwardly. On the supporting plate 238' is securely mounted a spacer 239' on which another supporting plate 240' is securely mounted immediately above the supporting plate 238' to extend inwardly, having a substantially same contour or shap as the previously supporting member 238', with a vertical space equal to the thickness of the spacer 239' between the supporting plates 238' and 240'. On the free end portions of the supporting plates 238' and 240' are mounted semispherical receivers 241' and 242' which have therein spherical members 243' and 244', respectively, in spaced relation with each other. Between the spherical members 243' and 244' is formed a space which has a height substantially equal to that between the spherical members 227' and 228'. The supporting plates 222', 224', 230', 232', 238', 240' and the receivers 225', 226', 233', 234', 241', 242' constitute as a whole a movable frame supporting mechanism generally indicated at 245' which serves to movably support in a horizontal plane a movable frame which will become apparent as the description proceeds. The frame 201, the swingable plate 203, the roller 207, the positioning members 220, 220', and the movable frame supporting mechanisms 145, 145' constitute as a whole a fixed frame generally denoted at 146. In FIGS. 16, 17, 20 and 21, a horizontal plate 250 is held by and between the spherical members 227, 228, 235, 236, 243 and 244 of the receivers 225, 226, 233, 234, 241 and 242 to be secured to the fixed frame 146 so that the horizontal plate 150 can be freely movable in a horizontal plane by the free rotations of the spherical members 227, 228, 235, 236, 243 and 244. A pair of guide members 251 and 252 are secured to the front end of the frame 201 in spaced relation with each other. On the rear end portions of the guide members 251 and 252 are respectively formed guide recesses 253 and 254 each of which is in a triangular shape. A pair of guide rods 255 and 256 are securely mounted on the front end lower surface of the horizontal plate 250 to be spaced with an interval substantially equal to that of the guide members 251 and 252. It is thus to be understood that the guide rods 255 and 256 serve to regulate the position of the horizontal plate 250 in width and angular directions when the horizontal plate 250 advances and the guide rods 255 and 256 are respectively brought into engagement with the guide recesses 253 and 254 of the guide members 251 and 252. On the four corners of the horizontal plate 250 are securely mounted vertical brackets 257, 258, 259 and 260, the brackets 257 and 259 being connected by a horizontal supporting plate 261 extending forwardly and backwardly while the brackets 258 and 260 being connected by another horizontal supporting plate 262 which is in parallel and spaced relation with the previous supporting plate 261. A plurality of parallel and spaced rollers 263 are rotatably supported at both axial ends on the supporting plates 261 and 262 in such a way that each of the rollers 263 is disposed at a height substantially equal to those of the rollers 207 and held at all times at a null position by a pair of compression coil springs 264 and 265. A supporting bracket 266 is secured to the supporting plate 262 to rotatably support a plurality of parallel and spaced rollers 267 together with the supporting plate 262. As best shown in FIGS. 16 and 20, a bracket 268 is secured to the rear inner side of the supporting plate 261 which supports together with the supporting plate 262 a shaft 269 in parallel with the rollers 263. The shaft 269 rotatably carries a cylindrical member 270 having a height substantially equal to those of the rollers 263. Between the shaft 269 and the cylindrical member 270 are accommodated a suitable driving means such as a drive motor, a planetary reduction gear and the like to drivingly rotate the cylindrical member 270. On the outer side of the supporting plate 261 opposite to the bracket 268 is securely mounted a vertical plate 271 which has a lower end securely connected with a horizontally extending a supporting plate 272. On the supporting plate 272 is fixedly mounted a vertical bracket 273 which has an upper end swingable supporting through a pivotal pin 274 one end of a swingable arm 275. The other end of the swingable arm 275 rotatably supports through bearings 276 a roller 277 which can be rollingly contacted with the longitudinally intermediate portion of the cylindrical member 270 when the swingable arm 275 is swung downwardly. A connecting arm 278 is pivotally connected at one end with the longitudinally intermediate portion of the swingable arm 275 through a pivotal pin 279. On the supporting plate 272 immediately below the connecting arm 278 is securely mounted a fluid operated cylinder 280 which has a piston rod 281 the leading end of which is pivotally connected with the other end of the connecting arm 278 through a pivotal pin 282. It is therefore to be noted that when the fluid operated cylinder 280 is operated to cause the piston rod 281 to be projected the swingable arm 275 is swung upwardly to its uppermost position shown in phantom lines of FIG. 20 through the connecting arm 278, and that the fluid operated cylinder 280 is again operated to cause the piston rod 281 to be retracted, the swingable arm 275 is swung downwardly until the roller 271 is brought into contact with the cylindrical member 270. The horizontal plate 250, the supporting plates 261, 262, the rollers 263, the cylindrical member 270, the roller 277 and the fluid operated cylinder 280 constitute as a whole a movable frame, generally indicated at 283, which is supported movably in a horizontal plane by the movable frame supporting mechanism 245. In FIGS. 18, 19, 22 and 23, a horizontal plate 250' is held by and between the spherical members 227', 228', 235', 236', 243' and 244' of the receivers 225', 226', 233', 234', 241' and 242' to be secured to the fixed frame 146 so that the horizontal plate 150' can be freely movable in a horizontal plane by the free rotations of the spherical members 227', 228', 235', 236', 243' and 244'. A pair of guide members 251' and 252' are secured to the front end of the frame 201 in spaced relation with each other. On the rear end portions of the guide members 251' and 252' are respectively formed guide recesses 253' and 254' each of which is in a triangular shape. A pair of guide rods 255' and 256' are securely mounted on the front end lower surface of the horizontal plate 250' to be spaced with an interval substantial equal to that of the guide members 251' and 252'. It is thus to be understood that the guide rods 255' and 256' serve to regulate the position of the horizontal plate 250' in width and angular directions when the horizontal plate 250' advances and the guide rods 255' and 256' are respectively brought into engagement with the guide recesses 253' and 254' of the guide members 251' and 252'. On the four corners of the horizontal plate 250' are securely mounted vertical brackets 257', 258', 259' and 260', the brackets 257' and 259' being connected by a horizontal supporting plate 261' extending forwardly and backwardly while the brackets 258' and 260' being connected by another horizontal supporting plate 262' which is in parallel and spaced relation with previous supporting plate 261'. A plurality of parallel and spaced rollers 263' are rotatably supported at both axial ends on the supporting plates 261' and 262' in such a way that each of the rollers 263' is disposed at a height substantially equal to those of the rollers 207' and held at all times at a null position by a pair of compression coil springs 264' and 265'. A supporting bracket 266' is secured to the supporting plate 262' to rotatably support a plurality of parallel and spaced rollers 267' together with the supporting plate 262'. As best shown in FIGS. 18 and 22, a bracket 268' is secured to the front inner side of the supporting plate 262' which supports together with the supporting plate 261' a shaft 269' in parallel with the rollers 263'. The shaft 269' rotatably carries a cylindrical member 270' having a height substantially equal to those of the rollers 263'. Between the shaft 269' and the cylindrical member 270' are accommodated a suitable driving means such as a drive motor, a planetary reduction gear and the like to drivingly rotate the cylindrical member 270'. On the outer side of the supporting plate 262' opposite to the bracket 268' is securely mounted a vertical plate 271' which has a lower end securely connected with a horizontally extending a supporting plate 272'. On the supporting plate 272' is fixedly mounted a vertical bracket 273' which has an upper end swingably supporting through a pivotal pin 274' one end of a swingable arm 275'. The other end of the swingable arm 275' rotatably supports through bearing 276' a roller 277' which can be rollingly contacted with the longitudinally intermediate portion of the cylindrical member 270' when the swingable arm 275' is swung downwardly. A connecting arm 278' is pivotally connected at one end with the longitudinally intermediate portion of the swingable arm 275' through a pivotal pin 279'. On the supporting plate 272' immediately below the connecting arm 278' is securely mounted a fluid operated cylinder 280' which has a piston rod 281' the leading end of which is pivotally connected with the other end of the connecting arm 278' through a pivotal pin 282'. It is therefore to be noted that when the fluid operated cylinder 280' is operated to cause the piston rod 281' to be projected the swingable arm 275' is swung upwardly to its uppermost position shown in phantom lines of FIG. 22 through the connecting arm 278', and that the fluid operated cylinder 280' is again operated to cause the piston rod 281' to be retracted, the swingable arm 275' is swung downwardly until the roller 271' is brought into contact with the cylindrical member 270'. The horizontal plate 250', the supporting plates 261', 262', the rollers 263', the cylindrical member 270', the roller 277' and the fluid operated cylinder 280' constitute as a whole a movable frame, generally indicated at 283', which is supported movably in a horizontal plane by the movable frame supporting mechanism 245'.

A resilient breaker ply B both longitudinal ends of which are cut at a substantially same angle with respect to its longitudinal direction is transferred from backwardly to forwardly onto the fixed frame 246 and the movable frames 283, 283'. At this time, the longitudinally intermediate portion of the breaker ply B is supported on the fixed frame 246 while the longitudinally end portions of the breaker ply B are supported on the movable frames 283 and 283'. In FIGS. 16, 17 and 21, a pair of bearings 290 and 291 are fixedly mounted on the front end portion of the horizontal plate 250 in spaced relation with each other in a breaker ply travelling direction. On the bearings 290 and 291 are slidably mounted a pair of slide rods 292 and 293 in spaced and parallel relation with each other. On the slide rods 292 and 293 between the bearings 290 and 291 is mounted a supporting member 294 which supports rotatably a vertical pin 295. A horizontal plate 296 is fixed to the upper end of the vertical pin 295 so that the plate 296 is movable in a breaker ply travelling direction and rotatable around the vertical pin 295 in a horizontal plane. On the rear lower surface of the plate 296 is securely mounted a vertical positioning member 297 which has at its rear face a conical projection 298 to be engageable with the positioning recess 216. On the front lower surface of the plate 296 is also securely mounted another vertical positioning member 299 which has at its front face a conical projection 300 to be engageable with the positioning recess 219. The positioning members 297 and 299 constitute as a whole a positioning projection assembly generally indicated at 301. The horizontal plate 296 and the positioning projection assembly 301 constitute as a whole a positioning plate generally denoted at 302. In FIGS. 18, 19 and 23 a pair of bearings 290' and 291' are fixedly mounted on the rear end portion of the horizontal plate 250' in spaced relation with each other in a breaker ply travelling direction. On the bearings 290' and 291' are slidably mounted a pair of slide rods 292' and 293' in spaced and parallel relation with each other. On the slide rods 292' and 293' between the bearings 290' and 291' is mounted a supporting member 294' which supports rotatably a vertical pin 295'. A horizontal plate 296' is fixed to the upper end of vertical pin 295' so that the plate 296' is movable in a breaker ply travelling direction and rotatable around the vertical pin 295' in a horizontal plane. On the front lower surface of the plate 296' is securely mounted a vertical positioning member 297' which has at its front face a conical projection 298' to be engageable with the positioning recess 216'. On the rear lower surface of the plate 296' is also securely mounted another vertical positioning member 299' which has at its rear face a conical projection 300' to be engageable with the positioning recess 219'. The positioning members 297' and 299' constitute as a whole a positioning projection assembly generally indicated at 301'. The horizontal plate 296' and the positioning projection assembly 301' constitute as a whole a positioning plate generally denoted at 302' and spaced from the positioning plate 302 in the longitudinal direction of the fixed frame 46.

In FIGS. 16, 17 and 21, there is shown an engaging pin 310 which is engageable with the front end of the breaker ply B and which has a upper end secured to the rear lower surface of the horizontal plate 296. Another engaging pin 311 which is engageable with the front end of the breaker ply B has a lower end secured to the front upper surface of the horizontal plate 296. The engaging pin 311 on the horizontal plate 296 is spaced from the engaging pin 310. The two engaging pins 310 and 311 constitute as a whole an end engaging member 312. Therefore, the straight front end of the breaker ply B is to be engaged at its two points with the end engaging member 312. A straight line L connecting the two points of the straight front end of the breaker ply B and the end engaging member 312 is intersected at a predetermined angle N, such as sixty degrees with a standard line M in parallel with the rotational axis of the roller 263. The standard line M is also substantially perpendicular to the longitudinal direction of the fixed frame 246 when the positioning projection assembly 301 is brought into engagement with the corresponding positioning assembly 220 of the fixed frame 246. More than two engaging pins as the engaging pins 310 and 311 may be provided according to the present invention.

In FIGS. 18, 19 and 23, there is shown an engaging pin 310' which is engageable with the rear end of the breaker ply B and which has a lower end secured to the front upper surface of the horizontal plate 296'. Another engaging pin 311' which is engageable with the rear end of the breaker ply B has a lower end secured to the rear upper surface of the horizontal plate 296'. The engaging pin 311' on the horizontal plate 296' is spaced from the engaging pin 310'. The two engaging pins 310' and 311' constitute as a whole an end engaging member 312'. Therefore, the straight front end of the breaker ply B is to be engaged at its two points with the end engaging member 312'. A straight line L' connecting the two points of the straight front end of the breaker ply B and the end engaging member 312' is intersected at a predetermined angle N', such as sixty degrees with a standard line M' in parallel with the rotational axis of the roller 263'. The standard line M' is also substantially perpendicular to the longitudinal direction of the fixed frame 246' when the positioning projection assembly 301' is brought into engagement with the corresponding positioning assembly 220' of the fixed frame 246'. More than two engaging pins as the engaging pins 310' and 311' may be provided according to the present invention. In FIGS. 16 and 21, on the front upper surface of the horizontal plate 250 is securely mounted a bracket 315 to which a fluid operated cylinder 316 is secured. The fluid operated cylinder 316 has a piston rod 317 the leading end of which is secured to a connecting plate 318 connecting the slide rods 292 and 293. It is thus to be understood that when the fluid operated cylinder 316 is operated to cause the piston rod 317 to be projected, the positioning plate 302 is moved backwardly together with the slide rods 292, 293, the supporting member 294 and the pivotal pin 295, and that when the fluid operated cylinder 316 is inversely operated to cause the piston rod 317 to be retracted, the positioning plate 302 is moved forwardly in a similar fashion. In FIGS. 18 and 23, on the rear upper surface of the horizontal plate 250' is securely mounted a bracket 315' to which a fluid operated cylinder 316' is secured in opposing relation with the fluid operated cylinder 316. The operated cylinder 316' has a piston rod 317' the leading end of which is secured to a connecting plate 318' connecting the slide rods 292' and 293'. It is thus to be understood that when the fluid operated cylinder 316' is operated to cause the piston rod 317' to be projected, the positioning plate 302' is moved backwardly together with the slide rods 292', 293', the supporting member 294' and the pivotal pin 295', and that when the fluid operated cylinder 316' is inversely operated to cause the piston rod 317' to be retracted, the positioning plate 302' is moved forwardly in a similar fashion. The fluid operated cylinders 316, 316', the brackets 315, 315', and the connecting plates 318, 318' constitute as a whole a positioning plate moving mechanism, generally indicated at 319, which serves to move the positioning plates 302 and 302' so as to enable the end engaging members 312 and 312' to be engaged with the straight ends of the breaker ply B on the fixed frame 246 and the movable frames 283, 283'. In FIGS. 16 and 17, there is illustrated a disc brake generally denoted at 320 and comprising a bracket 321 securely mounted on the horizontal plate 250, an upper braking portion 322 secured to the upper end of the bracket 321 to be positioned above and spaced from the horizontal plate 296, and a lower braking portion 323 secured to the lower end of the bracket 321 to be positioned below and spaced from the horizontal plate 296 in opposing relation with the upper braking portion 322. The disc brake 320 is therefore operated to cause the upper and lower braking portions 322 and 323 to be pressingly contacted with the plate 296 so that the plates 250 and 296 are relatively fixed. Another disc brake generally represented at 324 is provided on the horizontal plate 250 forwardly of the disc brake 320 and has a construction substantially identical to that of the previously mentioned disc brake 320 although the construction of the disc brake 324 is not particularly described hereinlater. The operation of the disc brake 324 is also entirely identical to that of the disc brake 320 since it serves to fix the plates 250 and 296. The disc brakes 320 and 324 constitute as a whole a fixing mechanism generally indicated at 325 which serves to fixed the movable frame 283 having the horizontal plate 250 and the positioning plate 302 having the plate 296 when the end engaging member 312 is brought into engagement with the straight front end of the breaker ply B. In FIGS. 18 and 19 there is illustrated a disc brake generally denoted at 320' and comprising a bracket 321' securely mounted on the horizontal plate 250', an upper braking portion 322' secured to the upper end of the bracket 321' to be positioned above and spaced from the horizontal plate 296', and a lower braking portion 323' secured to the lower end of the bracket 321' to be positioned below and spaced from the horizontal plate 296' in opposing relation with the upper braking portion 322'. The disc brake 320' is therefore operated to cause the upper and lower braking portions 322' and 323' to be pressingly contacted with the plate 296' so that the plates 250' and 296' are relatively fixed. Another disc brake generally represented at 324' is provided on the horizontal plate 250' backwardly of the disc brake 320' and has a construction substantially identical to that of the previously mentioned disc brake 320' although the construction of the disc brake 324' is not particularly described hereinlater. The operation of the disc brake 324' is also entirely identical to that of the disc brake 320' since it serves to fix the plates 250' and 296'. The disc brakes 320' and 324' constitute as a whole a fixing mechanism generally indicated at 325' which serves to fixed the movable frame 283' having the horizontal plate 250' and the positioning plate 302' having the plate 296' when the end engaging member 312' is brought into engagement with the straight rear end of the breaker ply B. In FIGS. 13, 17 and 21, a bracket 330 is secured to the frame 201 to pivotally support through a pivotal pin 331 a rear end of fluid operated cylinder 332 which horizontally extends below the horizontal plate 250. The fluid operated cylinder 332 has a piston rod 333 the leading end of which is pivotally connected with a vertical 334 secured to the front lower central portion of the horizontal plate 250. A pair of tension springs 335 and 336 are connected at one ends with the lower end of the vertical pin 334 and at the other ends with fixing pins 137 and 138 secured to the frame 201 so that the vertical pin 134 can be held at a central position in width of the frame 201. It is thus to be noted that when the fluid operated cylinder 332 is operated to cause the piston rod 333 to be retracted, the movable frame 283 is horizontally and backwardly moved together with the positioning plate 302 so as to enable the positioning projection assembly 301 to be brought into engagement with the positioning member 200, and that the fluid operated cylinder 332 is inversely operated to cause the piston rod 333 to be projected, the movable frame 283 is also horizontally but forwardly moved together with the positioning plate 302 so as to enable the positioning assembly 301 to be disengaged from the positioning member 220. In FIGS. 13, 19 and 23, a bracket 330' is secured to the frame 201 to pivotally support through a pivotal pin 331' a rear end of a fluid operated cylinder 332' which horizontally extends below the horizontal plate 250'. The fluid operated cylinder 332' has a piston rod 333' the leading end of which is pivotally connected with a vertical pin 334' secured to the rear lower central portion of the horizontal plate 250'. A pair of tension springs 335' and 336' are connected at one ends with the lower end of the vertical pin 334' and at the other ends with fixing pins 137' and 138' secured to the frame 201 so that the vertical pin 134' can be held at a central position in width of the frame 201. It is thus to be noted that when the fluid operated cylinder 332' is operated to cause the piston rod 333' to be retracted, the movable frame 283' is horizontally and forwardly moved together with the positioning plate 302' so as to enable the positioning projection assembly 301' to be brought into engagement with the positioning member 220', and that the fluid operated cylinder 332' is inversely operated to cause the piston rod 333' to be projected, the movable frame 283' is also horizontally but backwardly moved together with the positioning plate 302' so as to enable the positioning assembly 301' to be disengaged from the positioning member 220'. The brackets 330, 330', the pivotal pins 331, 331', the fluid operated cylinders 132, 132' and the vertical pins 334, 334' constitute as a whole a movable frame moving mechanism generally indicated at 339 which is operated when the fixing mechanisms 325 and 325' are operated to cause the positioning plates 302 and 302' to be fixed to the movable frame 283 and 283'. In FIGS. 13 and 14, the reference numerals 345 and 346 indicate retainers fixed to the front upper face of the frame 201 in spaced relation with each other. The reference numerals 345' and 346' also indicate retainers fixed to the rear upper face of the frame 201 in spaced relation with each other. A pair of parallel and spaced guide rods 347 and 348 extend horizontally to have both longitudinal ends secured to the retainers 345, 345', 346 and 346'. On the front portions of the guide rods 347 and 348 is slidably supported a slider 349 on which a pair of bearings 350 and 351 are securely mounted in spaced relation with each other. The slider 349 and the bearings 350, 351 constitute as a whole a horizontal travelling member generally indicated at 352 which can be horizontally moved while being guided by the guide rods 347 and 348. On the rear portions of the guide rods 347 and 348 is slidably supported another slider 349' on which a pair of bearings 350' and 351' are also securely mounted in spaced relation with each other. The slider 349' and the bearings 350', 351' constitute as a whole a horizontal travelling member generally indicated at 352' which can be horizontally moved while being guided the the guide rods 347 and 348. A bracket 355 is secured to the frame 201 forwardly of the slider 349 to pivotally support a longitudinally intermediate portion of a fluid operated cylinder 356. The leading end of a piston rod 357 of the fluid operated cylinder 356 is pivotally connected through a pivotal pin 359 with a bracket 358 which is securely mounted on the slider 349. On the other hand, a bracket 355' is secured to the frame 201 backwardly of the slider 349' to pivotally support a longitudinally intermediate portion of a fluid operated cylinder 356'. The leading end of a piston rod 357' of the fluid operated cylinder 356' is pivotally connected through a pivotal pin 359' with a bracket 358' which is securely mounted on the slider 349'. It is thus to be understood than when the fluid operated cylinders 356 and 356' are simultaneously operated to cause the piston rods 357 and 357' to be projected, the horizontal travelling members 352 and 352' are moved toward each other while being guided by the guide rods 347 and 348, and that when the fluid operated cylinders 356 and 356' are inversely simultaneously operated to cause the piston rods 357 and 357' to be retracted, the horizontal travelling members 352 and 352' are moved away from each other while being guided by the guide rods 347 and 348. The brackets 355, 355', the fluid operated cylinders 356, 356', the brackets 358, 358' and the pivotal pins 359, 359' constitute as a whole a horizontal travelling member moving mechanism generally denoted at 360 which serves to move the horizontal travelling members 352 and 352' toward and away from each other. A rotary shaft 365 is rotatably supported on the bearings 350 and 351 to have one end to which a vertical plate 366 is secured. On the side face of the vertical plate 366 are securely mounted two pairs of supporting members 367, 368, 369 and 370 spaced laterally and vertically to slidably receive a pair of slide rods 371 and 372. A retaining plate 373 is secured to the lower ends of the slide rods 371 and 372 and has thereon a bracket 374. A vertical fluid operated cylinder 375 is attached to the side face of the vertical plate 366 above the bracket 374 and has a piston rod 376 the leading end of which is pivotally connected with the bracket 374. On the lower face of the retaining plate 373 is securely mounted through a bracket 377 an extension plate 378 which is adapted to extend in parallel with the straight line L of the end engaging assembly 312 when the positioning projection 301 is brought into engagement with the positioning member 220. A pair of magnets 379 and 380 are supported by the extension plate 378 so as to enable the breaker ply B to be carried by attracting steel cords therein. The magnets 379 and 380 therefore constitute an end retaining member generally indicated at 381 which can retain the front end of the breaker ply B. It is thus to be understood that the end retaining member 381 extends in parallel with the straight line L connecting the two points as shown in FIG. 16 when the positioning projection 301 is engaged with the positioning member 220. The end retaining member 381 has at its front end a side edge 382 which is to be aligned with the straight line of the front end of the breaker ply B. And it is to be noted that the end retaining member 381 can be rotated in a vertical plane by rotation of the rotary shaft 385. On the other hand, a rotary shaft 365′ is rotatably supported on the bearings 350′ and 351′ to have one end to which a vertical plate 366′ is secured. On the side face of the vertical plate 366′ are securely mounted two pairs of supporting members 367′, 368′, and 369′ and 370′ spaced laterally and vertically to slidably receive a pair of slide rods 371′ and 372′. A retaining plate 373′ is secured to the lower ends of the slide rods 371′ and 372′ and has thereon a bracket 374′. A vertical fluid operated cylinder 375′ is attached to the side face of the vertical plate 366′ above the bracket 374′ and has a piston rod 376′ the leading end of which is pivotally connected with the bracket 374′. On the lower face of the retaining plate 373′ is securely mounted through a bracket 377′ an extension plate 378′ which is adapted to extend in parallel with the straight line L of the end engaging assembly 312′ when the positioning projection 301′ is brought into engagement with the positioning member 220′. A pair of magnets 379′ and 380′ are supported by the extension plate 378′ so as to enable the breaker ply B to be carried by attaching steel cords therein. The magnets 379′ and 380′ therefore constitute an additional end retaining member generally indicated at 381′ which can retain the rear end of the breaker ply B. It is thus to be understood that the end retaining member 381′ extends in parallel with the straight line L′ connecting the two points as shown in FIG. 18 when the positioning projection 301′ is engaged with the positioning member 220′. The end retaining member 381′ has at its rear end a side edge 382′ which is to be aligned with the straight line of the rear end of the breaker ply B. And it is to be noted that the end retaining member 381′ can be rotated in a vertical plane by rotation of the rotary shaft 365′. As an end retaining member, a vaccum type attracting pad may be employed in lieu of each of the magnets 379, 380, 379′ and 380′ according to the present invention. On the front side face of the frame 201 is securely mounted through a plurality of brackets 385 a horizontal rack 386 which extends in parallel with the fluid operated cylinder 356 to have rack teeth 387 thereon. On the other end of the rotary shaft 365 is securely supported a large diameter gear 388 in meshing with the rack teeth 387 of the rack 386. On the rear face of the frame 201 is also securely mounted through a plurality of brackets 385′ a horizontal rack 386′ which extends in parallel with the fluid operated cylinder 356′ to have rack teeth 387′ thereon. On the other end of the rotary shaft 365′ is securely supported a large diameter gear 388′ in meshing with the rack teeth 387′ of the rack 386′. When the fluid operated cylinders 356 and 356′ are operated to cause the piston rods 357 and 357′ to be projected, thereby moving the horizontal travelling members 352 and 352′ toward each other, the gears 388 and 388′ are rotated while being meshed with the rack teeth 387 and 387′ of the racks 386 and 386′ so as to rotate the rotary shafts 365 and 365′. As a consequence, the end retaining members 381 and 381′ are turned up in a vertical plane while attractingly supporting the front and rear end portions of the breaker ply B. At this time, the straight ends of the breaker ply B are therefore in parallel, opposing and spaced relation with each other by the end retaining members 381 and 381′. The racks 386, 386′ and the gears 388, 388′ constitute as a whole an end retaining member revolving mechanism generally indicated at 389 which can turn up or revolve the front and rear end portions of the breaker ply B together with the end retaining members 381 and 381′ in cooperation with the horizontal travelling member moving mechanisms 160 and 160′.

In FIGS. 13, 14, 24 and 25, a vertical frame 391 is secured at its lower end to the frame 201 between the racks 386 and 386′ to have an upper end portion on which a bracket 392 is securely mounted over the movable frames 283, 283′ and at a central position between the end retaining members 381 and 381′. On the upper surface of the vertical frame 391 is securely mounted an interposing plate 393 which is in parallel with the end retaining members 381 and 381′ when they are revolved and turned up by the fluid operated cylinders 156 and 156′ and which has a thickness substantially equal to a space defined between the end retaining members 381 and 381′ when they are revolved as above. On the interposing plate 393 is securely mounted a horizontal supporting plate 394 with which the extension plates 378 and 378′ are engageable to support or rest the end retaining members 381 and 381′ when they are revolved as above. On the interposing plate 393 over the supporting plate 394 is formed a central projection 395 which is to fill the space defined between the revolved end retaining members 381 and 381′ to form a flat jointed surface 396 together with the end retaining members 381 and 381′. The bracket 392, the interposing plate 393 and the supporting plate 394 constitute as a whole a lower jointing table generally designated at 397. On the vertical frame 391 is further securely mounted another vertical frame 401 on which a vertical plate 402 is securely mounted immediately above the lower jointing table 397. On one end of the vertical plate 402 are secured a pair of guide members 403 and 404 which are spaced in a vertical direction to slidably receive a guide rod 405. Similarly on the other end side of the vertical plate 402 are secured a pair of guide members 406 and 407 which are also spaced in a vertical direction to slidably receive a guide rod 408. To the lower ends of the guide rods 405 and 408 is secured a horizontal plate 409 on which a connecting plate 410 is securely mounted. The horizontal plate 409 and the connecting plate 410 constitute as a whole an upper jointing table generally indicated at 411 which are moved downwardly and upwardly toward and away from the lower jointing table 397 while being guided by the guide rods 405 and 408. On the side face of the vertical plate 402 between the guide members 403, 404, 406 and 407 is securely mounted a horizontal bracket 412 on which a pair of vertical fluid operated cylinders 413 and 415 are fixedly mounted in spaced relation with each other along the bracket 412. The fluid operated cylinders 413 and 415 respectively have piston rods 414 and 416 the leading ends of which are connected with the connecting plate 410 so that the fluid operated cylinders 413 and 415 can be operated to downwardly and upwardly move the upper jointing table 411 toward and away from the lower jointing table 497. The fluid operated cylinders 413 and 415 constitute as a whole an upper jointing table lifting mechanism generally indicated at 471. A jointing member 420 comprises a number of forward projections 422 formed at its inner side and each having a number of parallel grooves, a pair of rearward projections 424 formed at its outer side to be spaced from each other along the horizontal plate 409, and a pair of pins 426 each formed on each of the projections 424. Another jointing member 421 is provided in opposing relation with the jointing member 420 to comprise a number of forward projections 423 formed at its inner side and each having a number of parallel grooves, a pair of rearward projections 425 formed at its outer side to be spaced from each other along the horizontal plate 409, and a pair of pins 427 each formed on each of the projections 425. The jointing members 420 and 421 are disposed in such a way that the forward projections 422 and 423 are intermeshed with each other and the rear projections 424 and 425 are pivotally connected through pivotal pins 430 and 431 with brackets 428 and 429 secured to the lower surface of the horizontal plate 409. Between the forward projections 422, 423 of the jointing members 420, 421 and the horizontal plate 409 is disposed an air bag 432 which is in communication with a suitable air source not shown. The jointing members 420, 421, the brackets 428, 429 and the air bag 432 constitute as a whole an end jointing mechanism generally represented at 433 which serves to butt joint the straight end faces of the breaker ply B supported by the end retaining members 381 and 381' in opposing and spaced relation with each other in cooperation with the upper jointing table lifting mechanism 417 when the upper jointing table 411 is moved toward the lower jointing table 397 by the upper jointing table lifting mechanism 417.

The operation of the breaker band building mechanism thus constructed will now be described hereinafter.

Figure 26A:
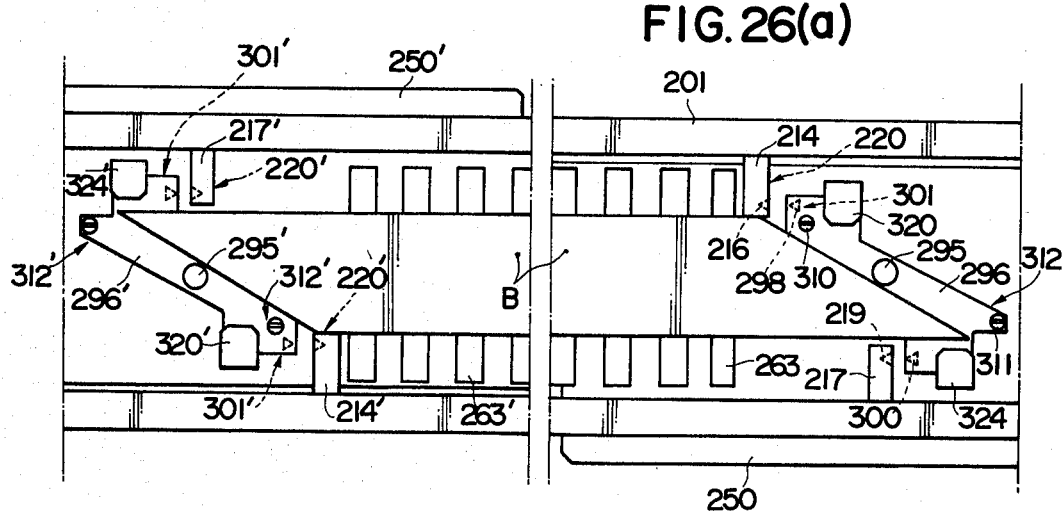
FIGS. 26a to 26c are operational views for describing the steps of the operation of the breaker band building mechanism.

Firstly, a resilient breaker ply B, which has a length shorter than a final building length of a breaker ply to be applied on the inner periphery of a tread band and both longitudinal end faces cut at a same angle to the longitudinal direction of the breaker ply B, is moved toward the fixed frame 246 while being retained by a suitable servicer not shown. The servicer is then further moved to transfer the breaker ply B over the end engaging member 312' to the movable frame 283'. The servicer then unloads the breaker ply B to cause the forward end to be mounted on the rollers 263' of the movable frame 283'. After the forward end of the breaker ply B is then passed over the cylindrical member 270', a suitable senser not shown is acted to cause the servicer to be stopped so that the servicer is transiently stopped to unload the breaker ply B. The fluid operated cylinder 280' is then operated to cause the piston rod 281' to be retracted so that the swingable arm 275' is downwardly swung through the connecting arm 278' from the position shown in phantom lines to the position shown in solid lines in FIG. 22. The forward end of the breaker ply B is thus pressingly held between the roller 277' and the cylindrical member 270'. The cylindrical member 270' is driven to rotate through the planetary reduction gear by the drive motor so that the breaker ply B is moved forwardly along the fixed frame 246 as the forward end of the breaker ply B is pressingly held between the roller 277' and the cylindrical member 270'. When the forward end of the breaker ply B arrives at a position slightly backwardly of the end engaging member 312, a suitable senser not shown is operated to cause the drive motor to be stopped, thereby transiently stopping unloading of the breaker ply B. At this time, it is not required for the breaker ply B to be stopped at an accurate position. The fluid operated cylinder 280 is then operated to cause the piston rod 281 to be retracted so that the swingable arm 275 is downwardly swung through the connecting arm 278 from the position shown in the phantom lines to the position shown in solid lines in FIG. 20. The forward end of the breaker ply B is therefore held between the roller 277 and the cylindrical member 270. The fluid operated cylinder 211 is then operated to cause the piston rod 212 to be retracted so that the swingable plate 203 is downwardly swung around the pivotal pin 204. As a consequence, the central portion of the breaker ply B is not supported by the rollers 207. At this time, the cylindrical member 270' is rotated again so that the rear portion of the breaker ply B projected rearwardly from the cylindrical member 270 is transferred forwardly, thereby causing the central portion of the breaker ply B to be drooped downwardly between the cylindrical members 270 and 270'. When the rear end of the breaker ply B is then passed over the end engaging member 312', a suitable senser not shown is acted to stop the drive motor so that the cylindrical member 270 is stopped and the movement of the breaker ply B is also stopped. Similarly, it is not required for the breaker ply B to be stopped at an accurate position. The servicer is then moved away from the fixed frame 246 whereupon the rear end portion of the breaker ply B is released from the servicer to be transferred on the rollers 263' of the movable frame 283'. During the times of unloading the breaker ply B on the rollers 263 and 263' of the movable frames 283 and 283' from the servicer, the breaker ply B centered at its whole longitudinal direction by a suitable centering mechanism and a slight space between the straight end face of the breaker ply B and the end engaging portion 312' is formed. As the breaker ply B is made of a resilient material and a predetermined time lapses after the longitudinal ends are cut, the cut angles of the breaker ply B at both longitudinal ends are fluctuated from those of the breaker ply B immediately after cut. The distance between the straight front end face of the breaker ply B and the engaging pin 310 is different from that between the straight front end face of the breaker ply B and the engaging pin 311. Similarly, the distance between the straight rear end face of the breaker ply B and the engaging pin 310' is different from that between the straight rear end face of the breaker ply B and the engaging pin 311'. Further, the breaker ply B may be stopped at different longitudinal positions if the stop accuracies of the drive motors for the cylindrical members 270 and 270' are degraded. At this stage, the longitudinally central portion of the breaker ply B is supported on the fixed frame 246 while both longitudinal end portions of the breaker ply B is supported on the movable frames 283 and 283' as shown in FIG. 26(a).

Figure 26B:
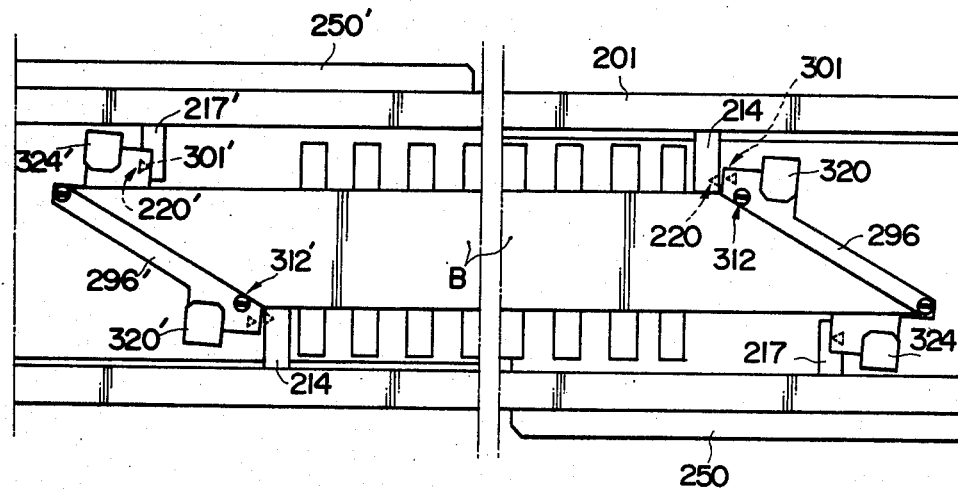

The fluid operated cylinders 316 and 316' are concurrently operated to cause the piston rods 317 and 317' to be projected so that the plates 296 and 296' are moved horizontally toward the straight end faces of the breaker ply B together with the supporting members 294 and 294' while being guided by the slide rods 292, 293, 292' and 293'. At this time, any one of the engaging pins 310 and 311 is brought into engagement with the straight front end face of the breaker ply B since the distance between the straight front end face of the breaker ply B and the engaging pin 310 is different from that between the straight front end face of the breaker ply B and the engaging pin 311. On the other hand, any one of the engaging pins 310' and 311' is brought into engagement with the straight rear end face of the breaker ply B since the distance between the straight rear end face of the breaker ply B and the engaging pin 310' is different from that between the straight rear end face of the breaker ply B and the engaging pin 311'. When the piston rods 317 and 317' are then further projected from the above stage, the horizontal plates 296 and 296' are rotated around the pins 295 and 295' while moving toward the straight end faces of the breaker ply B so that the remaining engaging pin 310 or 311 and 310' or 311' are brought into engagement with the straight end faces of the breaker ply B. As described above, the end engaging members 312 and 312' can be engaged at two points with the front and rear end faces of the breaker ply B since the positioning plates 302 and 302' are supported by the movable frames 283 and 283' to be movable two-dimentionally in a horizontal plane. When the end engaging members 312 and 312' are brought into engagement with the straight front and rear end faces of the breaker ply B at the two points as above, the operations of the fluid operated cylinders 316 and 316' are stopped. At this time, the straight lines L and L' respectively connecting the two points in engagement with the straight end faces of the breaker ply B are intersected at same predetermined angle with the standard lines M and M' drawn on the positioning plates 302 and 302' although the standard lines M and M' are not in parallel with each other and not remained at a constant angle with respect to the fixed frame 246 since the positioning plates 302 and 302' have been moved two-dimentionally in the horizontal plane. In addition, the distance between the straight front and rear end faces of the breaker ply B and the pins 295, 295' are not necessarily constant in the event that the stop accuracies of the cylindrical members 270 and 270' are degraded. When the end engaging members 312 and 312' are engaged at the two points with the straight end faces of the breaker ply B in the above way, the disc brakes 320, 324, 320' and 324' are concurrently operated to pressingly hold the horizontal plates 296 and 296' so that the relative position between the movable frames 283, 283' and the positioning plates 302, 302' is fixed as shown in FIG. 26(b).

Figure 26C:
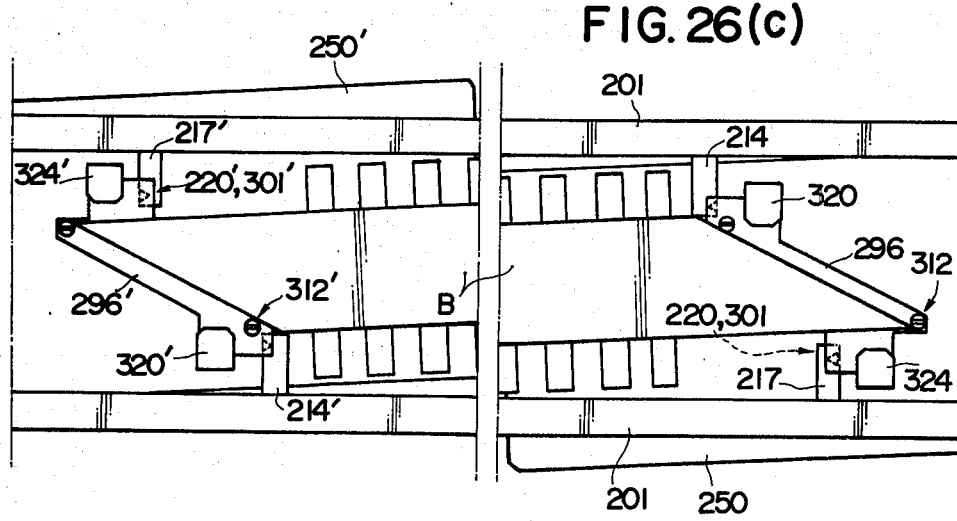

The fluid operated cylinders 132 and 132' are then concurrently operated to cause the piston rods 333 and 333' to be retracted after the relative position between the movable frames 283, 283' and the positioning plates 302, 302' is fixed by the fixing mechanisms 325 and 325' as above. As a consequence, the movable frame 283 is moved together with the positioning plate 302 while being supported by the movable frame supporting mechanism 245 to cause the positioning projection 301 to be engaged with the positioning member 220, while the movable frame 283' is moved together with the positioning plate 302' while being supported by the movable frame supporting mechanism 245' to cause the positioning projection 301' to be engaged with the positioning member 220'. At this time, any one of the positioning projections 298 and 300 is firstly engaged with the corresponding one of the positioning recesses 216 and 219 since the horizontal plate 296 is rotated at a certain angle around the pin 295. On the other hand, any one of the positioning projections 298' and 300' is also firstly engaged with the corresponding one of the positioning recesses 216' and 219' since the horizontal plate 296' is rotated at a certain angle around the pin 295'. From this state, when the piston rods 333 and 333' are further retracted, the horizontal plates 250 and 296 are moved two-dimentionally in unison with the horizontal plates 250' and 296' since the plates 250, 296, 250' and 296' are fixed by the fixing mechanisms 325 and 325'. As a result, the remaining one of the positioning projections 298 and 300 is engaged with the corresponding one of the positioning recesses 216 and 219 while the remaining one of the positioning projections 298' and 300' is engaged with the corresponding one of the positioning recesses 216' and 219'. As described above, the movable frame moving mechanism 339 is operated to cause the positioning projections 301 and 301' to be engaged with the positioning members 220 and 220', respectively, as shown in FIG. 26(c). The standard lines M and M' drawn on the positioning plates 302 and 302' are brought into parallel with each other so that the straight lines L and L' intersected at substantially equal angles N and N' with the standard lines M and M' and similarly brought into parallel with each other and held at a constant angle with respect to the fixed frame 246. Therefore, the straight front and rear end faces are in parallel with each other and also held at a constant angle with respect to the fixed frame 246 since the two points of the end faces engaged with the end engaging members 312 and 312' are connected by the straight lines L and L', respectively. Also, the positions of the pins 295 and 295' in the longitudinal direction of the fixed frame 246 are held constant with respect to the fixed frame 246 since the positioning projections 301 and 301' are engaged with the positioning members 220 and 220'. When the front and rear end faces of the breaker ply B are engaged with the end engaging members 312 and 312', the distances between the pins 295, 295' and the central points of the straight front and rear end faces are unchanged so that the central points of the straight front and rear end faces held constant in the longitudinal direction of the fixed frame 246. The straight end faces of the breaker ply B are thus positioned with respective precise angles and direction to the fixed frame 246.

The fluid operated cylinders 375 and 375' are then concurrently operated to cause the piston rods 376 and 376' to be projected so that the end retaining members 381 and 381' are moved downwardly toward the front and rear end portions of the breaker ply B through the brackets 374, 374', the retaining plates 373, 373', the brackets 377, 377' and the extension plates 378, 378'. When the lower ends of the end retaining members 381 and 381' are respectively brought into contact with the front and rear end portions of the breaker ply B, the operations of the fluid operated cylinders 375 and 375' are stopped. At this time, the side edges 382 and 382' of the end retaining members 381 and 381' are held constant with respect to the fixed frame 246, and the straight end faces of the breaker ply B are also held constant with respect to the fixed frame 246 so that the side edges 382 and 382' of the end retaining members 381 and 381' are respectively aligned with the straight end faces of the breaker ply B. As a consequence, the steel cords embedded in the breaker ply B are attracted respectively by the magnets 379, 380, 379' and 380' of the end retaining members 381 and 381' to cause the front and rear end portions of the breaker ply B to be retained by the end retaining members 381 and 381'.

The fluid operated cylinders 280 and 280' are then concurrently operated to cause the piston rods 281 and 281' to be projected so that the swingable arms 275 and 275' are swung upwardly from the position shown in the solid lines to the position shown in the phantom lines in FIGS. 20 and 22. The fluid operated cylinders 375 and 375' are then operated again to cause the piston rods 376 to be retracted at a predetermined distance so that the front and rear end portions of the breaker ply B are moved upwardly while being retained by the end retaining members 381 and 381' at a predetermined distance. The fluid operated cylinders 356 and 356' are then concurrently operated to cause the piston rods 357 and 357' to be projected so that the movable members 352 and 352' are moved toward each other along the longitudinal direction of the breaker ply B while being guided by the guide rods 347 and 347'. At this time, the gears 388 and 388' are moved toward each other together with the movable members 352 and 352' while being in meshing relation with the rack teeth 387 and 387' of the racks 386 and 386', respectively to rotate the rotary shafts 365 and 365', respectively. The front and rear end portions of the breaker ply B retained by the end retaining members 381 and 381' are therefore revolved or turned up in the vertical plane together with the end retaining members 381 and 381'. The revolution of the front and rear end portions of the breaker ply B is stopped when the extension plates 378 and 378' are brought into engagement with the supporting plate 394 of the lower jointing table 397. At this time, the central projection 395 fills the gap formed between the opposing end retaining members 381 and 381' to form a flat continuous jointing plane 396. As a consequence, the front and rear end faces of the breaker ply B retained by the end retaining members 381 and 381' are held in parallel and opposing relation with each other to form a gap substantially identical to the thickness of the central projection 395 as shown in phantom lines of FIG. 24.

The fluid operated cylinders 413 and 415 are then concurrently operated to cause the piston rods 414 and 416 to be projected so that the upper jointing table 411 and the end face jointing mechanism 433 are moved downwardly toward the lower jointing table 397 until the jointing members 420 and 421 of the end face jointing mechanism 423 are engaged with the front and rear end portions of the breaker ply B. When the piston rods 414 and 416 are further projected from the above state, the jointing members 420 and 421 are rotated around the pivotal pins 430 and 431 against the compressed fluid in the air bag 432. Accordingly, the front and rear end portions of the breaker ply B are forcibly moved toward each other in cooperation with the flat jointing plane 396 to be butt jointed. In this manner, the butt-jointing of the front and rear end portions of the breaker ply B is carried out by the upper jointing table lifting mechanism 417 and the end jointing mechanism 433. The finished breaker band 7 has a circumferential length shorter than a final building circumferential length at a time when the breaker band 7 is applied on the inner periphery of the tread band 5. The breaker band 7 is supported and removed by two rollers not shown of the breaker band building mechanism, and is then received on the applying drum 8 contracted.

After completion of the jointing operation, the fluid operated cylinders 413 and 415 are again operated to cause the piston rods 414 and 416 to be retracted so that the upper jointing table 411 is upwardly moved away from the lower jointing table 397 in unison with the end jointing mechanism 433. At this time, the fluid operated cylinders 356 and 356' are operated to cause the piston rods 357 and 357' to be retracted so that the movable members 352 and 352' are moved away from each other while being guided by the guide rods 347 and 348 to assume their initial positions. At this time, the gears 388 and 388' are also rotatingly moved horizontally while being meshed with the rack teeth 387 and 387' of the racks 386 and 386' so that the rotary shafts 365 and 365' are rotated to cause the end retaining members 381 and 381' to be returned to their initial positions while being rotated in the vertical plane. At this time, the fluid operated cylinder 211 is also operated to cause the piston rod 212 to be projected so that the swingable plate 203 is swung upwardly around the pivotal pin 204 until it is engaged with the stop member 208. At this time, the fluid operated cylinders 332 and 332' are also concurrently operated to cause the piston rods 333 and 333' to be projected so that the movable frames 283 and 283' are moved away from each other. At this time, the movable frames 283 and 283' can readily be returned to their initial positions since the movable frames 283 and 283' are resiliently balanced at all times and the guide rods 255, 256, 255' and 256' are engaged with the recesses 253, 254, 253' and 254' of the guide members 251, 252, 251' and 252'. At this time, the fixing mechanism 325 and 325' are operated to release the braking and fixing of the movable frames 283, 283' and the positioning plates 302, 302'. At this time, the fluid operated cylinders 316 and 316' are also concurrently operated to cause the piston rods 317 and 317' to be retracted so that the positioning plates 302 and 302' and the end engaging members 312 and 312' are returned to their initial positions.

While there has been described one cycle of the operation of the breaker band building mechanism, such cycles will be repeated for building a number of breaker bands.

The applying drum for use in the previous first to sixth embodiments will now be described hereinlater.

Figure 27:
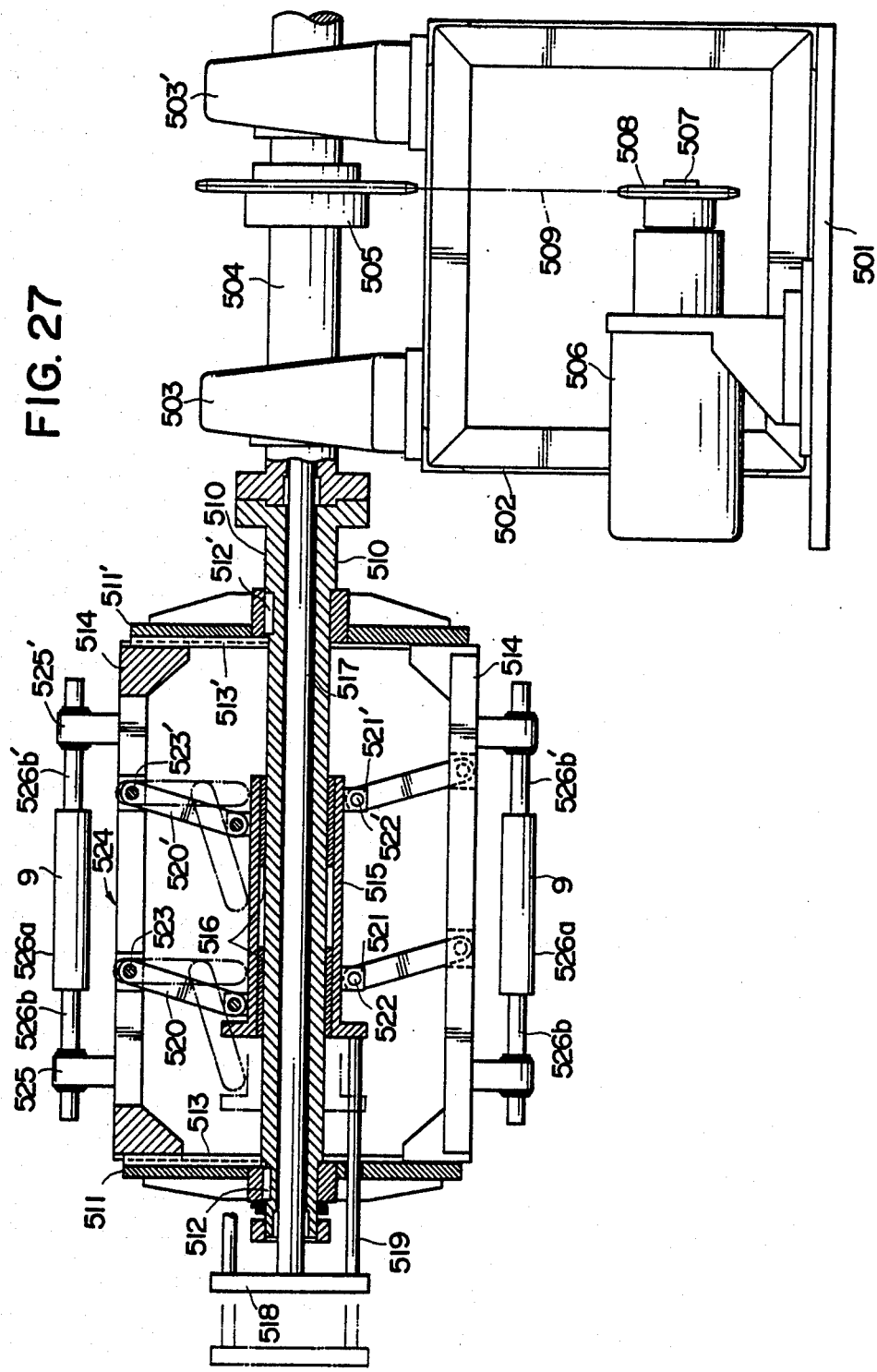
FIG. 27 is an elevational view, partially in cross-section of an applying drum for use in the first to sixth embodiments illustrated in FIGS. 3 to 7.

In FIG. 27, the reference numeral 501 indicates a base plate which is mounted on a turn table, now shown, driven by a suitable driving mechanism also not shown so that the turn table is rotated in a horizontal plane to enable such as for example the applying drum 8 in FIG. 1 to assume three positions 10, 11 and 12. On the base plate 501 is mounted a frame structure 502, made of angle members, on which is fixedly mounted a pair of bearings 503 and 503' to be spacedly positioned with each other in a predetermined interval. A horizontal drive shaft 4 is rotatably supported on the bearings 503 and 503' and has thereon a sprocket wheel 505 between the bearings 503 and 503'. An electric motor 506 is securely mounted on the frame structure 502 and has thereon a sprocket wheel 508. Between the sprocket wheels 505 and 508 is extended an endless chain 509 so that when the electric motor 506 is operated to rotate a rotary shaft 507, the drive shaft 504 is driven through the sprocket wheel 508, the endless chain 509 and the sprocket wheel 505. A drum shaft 510 is connected at one end with the drive shaft 504 in axial alignment with each other. On one end and the other end portions of the drum shaft 510 are securely mounted drum end plates 511 and 511' in opposing and spaced relation with each other by keys 512 and 512' and securing screws not shown. The drum end plate 511 has an inner face on which a plurality of radial extending guides 513 are formed in equi-angular relation with each other, while the drum end plate 511' has also an inner face on which a plurality of radial extending guides 513' are formed in equi-angular relation with each other. A plurality of arcuate segments 514 are each slidably engaged at both axial ends with the guides 513 and 513' of the drum end plates 511 and 511'. The segments 514 collectively define a cylindrical form when they are radially moved to their expanded positions shown in solid lines of FIG. 27. On the drum shaft 510 between the drum end plates 511 and 511' are slidably received a movable sleeve 515 on the both inner peripheries of which are oil contained bearing bushes 516 are fixed so that the movable sleeve 515 can axially be moved on the drum shaft 510 through the bearing bushes 516. A drive rod 517 is received in the drive shaft 504 and the drum shaft 510 to be rotatable together with the drive shaft 504 and the drum shaft 510 and axially movable with respect to the drive shaft 504 and the drum shaft 510. The drive rod 517 has a free-end projected from the free-end of the drum shaft 510 and fixedly supporting a disk plate 518. A plurality of parallel connecting rod 519 are connected at their one ends with the disk plate 518 in circumferentially equi-spaced relation with each other and at their other ends with the movable sleeve 515 so that when the drive rod 517 is axially moved within the drive shaft 504 and the drum shaft 510, the movable sleeve 515 is axially moved. The drive rod 517 has a fixed end connected with a suitable cylinder assembly not shown to be axially movable by projection and retraction of the cylinder assembly. A plurality of links 520 are pivotally connected at their radially inner ends with brackets 521 formed on the outer periphery of the movable sleeve 515 through pivotal pin 522, while a plurality of links 520' are axially spaced from the previously mentioned links 520 and also pivotally connected at their radially inner ends with brackets 521' formed on the outer periphery of the movable sleeve 515' through pivotal pin 522'. The radially outer ends of the link 520 and 520' are pivotally connected with the arcuate segments 514 through the pivotal pins 523 and 523', respectively. It is thus to be understood that when the movable sleeve 515 is axially moved to swing the links 520 and 520', the arcuate segments 514 are radially moved while being guided by the guides 513 and 513' to cause the cylindrical form of the segments 514 to be expanded and collapsed in diameter. The above plurality of arcuate segments 514 collectively define a cylindrical body generally designated at 524 which are adapted to be rotatable and expansible as above. A plurality of bearing brackets 525 are securely mounted on the outer peripheral surface of the segments 514 in circumferentially spaced relation with each other, while a plurality of bearing brackets 525' are axially spaced from the bearing brackets 525 and also securely mounted on the outer peripheral surface of the segments 514' in circumferentially spaced relation with each other. The guide rollers 9 one of which is seen in FIG. 28 and has been described above are each constructed to have a large diameter portion 526a and small diameter portions 526b and 526b' which are integrally and coaxially connected with the large diameter portion 526a. The guide rollers 9 are rotatably supported at the small diameter portions 526b and 526b' in parallel relation with the cylindrical body 524 to be rotatable around themselves and axially movable. In FIGS. 28, 29 and 30, a compression coil spring 527 surrounding the small diameter portion 526b has one end fixed to a step 526c between the large diameter portion 526a and the small diameter portion 526b of the guide roller 9 and the other end fixed to the inner face of the bearing bracket 525. Similarly, a compression coil spring 527' surrounding the small diameter portion 526b' has one end fixed to a step 526c' between the large diameter portion 526a and the small diameter portion 526b' of the guide roller 9 and the other end fixed to the inner face of the bearing brackets 525'. It is thus to be understood that the resilient forces of the compression coil springs 527 and 527' cause the axially central portion to be positioned at all times on an equatorial plane of the cylindrical body 524. Brackets 528 and 529 are integrally fixed to the both side faces of the bearing bracket 525, while brackets 528' and 529' are integrally fixed to the both side faces of the bearing bracket 525'. A guide rod 530 extends along rotational axis of the guide roller 9 and has both axial ends secured to brackets 528 and 528', while a guide rod 530' extends along the rotational axis of the guide roller 9 and has both axial ends secured to brackets 529 and 529'. The previously mentioned guide rods 530 and 530' constitute as a whole a guide means generally indicated at 531 which extends along the rotational axis of the guide roller 9. A pair of movable blocks 532 and 532' are slidably mounted on the guide rods 530 and 530' to be movable along the axes of the guide rods 530 and 530'. A radially extending pivotal pin 533 is rotatably supported on the axially central portion of each of the arcuate segments 514 to have a radially outer end to which a swingable lever 534 is fixed at its longitudinally intermediate portion to be swung around the pivotal pin 533. A connecting lever 535 is pivotally connected at one end with the movable block 532 through the pivotal pin 536 and at the other end with one end of the swingable lever 534 through a pivotal pin 537, while a connecting lever 535' is pivotally connected at one end with the movable block 532' through the pivotal pin 536' and at the other end with the other end of the swingable lever 534 through a pivotal pin 537'. The distance between the pins 533 and 537 are substantially equal to the distance between the pins 533 and 537' while the distance between the pins 536 and 537 is substantially equal to the distance between the pins 536' and 537' so that when the swingable lever 534 is swung around the pin 533 the movable blocks 532 and 532' can be moved through the connecting levers 535 and 535' toward and away from the pins 533 at a substantially equal distance while being guided by the guide rods 530 and 530'. On the movable block 532 is securely mounted a pair of brackets 538 and 539 which are spaced from the pin 536 and in parallel with the guide rods 530 and 530' and on which are respectively securely mounted extension plates 540 and 541 radially extending. Pins 542 and 543 are respectively mounted on the extension plates 540 and 541 in perpendicular relation therewith to rotatably support swingable plates 544 and 545, respectively. Each of the swingable plates 544 and 545 is long enough to be projected radially outwardly of the radially outer face of the large diameter portion 526a of the roller 9 when each of the swingable plates 544 and 545 is swung upwardly as shown in FIG. 28. The swingable plates 544 and 545 are resiliently urged to be rotated at a direction shown in an arrow Y of FIG. 28 by compression coil springs 546 and 547, respectively. Stop members 548 and 549 are secured to the brackets 538 and 539, respectively to prevent the swingable plates 544 and 545 from being rotated over their erected positions shown in FIG. 28. The movable block 532, the brackets 538, 539, the extension plates 540, 541 and the swingable plates 544, 545 constitute as a whole a side end engaging assembly generally indicated at 550. Secured to the both side faces of the bearing bracket 525 are a pair of brackets 551 and 552 which respectively support overthrowing rods 553 and 554 in parallel with the guide rods 530 and 530'. It is thus to be noted that when the side end assembly 550 is moved to a position shown in phantom lines of FIG. 28, the swingable plates 544 and 545 are overthrown against the compression coil springs 546 and 547. On the movable block 532' are securely mounted a pair of brackets 538' and 539' which are spaced from the pin 536' and in parallel with the guide rods 530 and 530' and on which are respectively securely mounted engaging plates 555 and 556 radially extending over the radially outer face of the large diameter portion 526a of the roller 9. The movable block 532', the brackets 538', 539' and the engaging plates 555, 556 constitute as a whole an additional side end engaging assembly generally indicated at 550'. A tensile coil spring 557 is connected at one end with a projection 558 formed on the bracket 529 below the guide rod 530' and at the other end with the pin 537' so that the swingable lever 534 is resiliently urges to be swung at a clockwise direction, and the side end engaging assemblies 550 and 550' are therefore moved toward each other at an equal distance through the swingable lever 534 and connecting levers 535, 535' while being guided by the guide rollers 530 and 530'. On the bearing bracket 525' is securely mounted a bracket 559 to which is secured a fluid operated cylinder 560 in parallel relation with the rotational axis of the roller 9. The fluid operated cylinder 560 has a piston rod 561 the leading end of which is connected with one ends of two rigid wires 562 and 563 which have the other ends connected with the brackets 538' and 539' so that when the fluid operated cylinder 560 is operated to cause the piston rod 561 to be projected and retracted the side end engaging assembly 550' can be moved along the roller 9 while beig guided by the guide rods 530 and 530'. The movement of the side end engaging assembly 550' is transferred to the side end engaging assembly 550 through the swingable lever 534 and the connecting lever to cause the side end engaging assembly 550 to be also moved along the roller 9 while being guided by the guide rods 530 and 530'. As a consequence, the side end engaging assemblies 550 and 550' can concurrently be moved toward and away from each other. The tesile coil spring 557, the fluid operated cylinder 560 and the wires 562, 563 constitute as a whole a moving mechanism generally denoted at 564 which can move the side end engaging assemblies 550 and 550' toward and away from each other. A fluid operated cylinder 565 is mounted on the bracket 559 to extend radially and has a piston rod the leading end of which is connected with one end of a brake plate 567. The other end of the brake plate 567 is connected through a pivotal pin 569 with a bracket 568 secured to the side of the bearing bracket 525' so that when the fluid operated cylinder 565 is operated to cause the piston rod 566 to be retracted the brake plate 567 is swung around the pivotal pin 569 to pressingly contact with the small diameter portion 526b' of the roller 9, thereby braking the axial movement of the roller 9.

The operation of the applying drum 8, which receives the tread band 5 from the tread band building mechanism 4 and transfers it to the annular carrier mechanism 13, will now be described hereinlater.

In the preparatory stage, the drive rod 517 is projected from the position shown in solid lines to the position shown in phantom lines of FIG. 27 so that the movable sleeve 515 is moved through the connecting rod 519 from the position shown in solid lines to the position shown in phantom lines of FIG. 27. As a consequence, the cylindrical member 524 is collapsed through the links 520 and 520' which are moved to their position shown in phantom lines of FIG. 27, whereupon the circumferential length of the envelope connecting the rollers 9 is smaller than that of the tread band 5. At this time, the fluid operated cylinder 560 is operated to cause the piston rod 561 to be retracted so that the side end engaging assemblies 550 and 550' are moved to their remotest positions against the tensile coil spring 567 through the wires 562, 563, the swingable lever 534 and the connecting levers 535, 535'. At this time, the swingable plates 544 and 545 are engaged at their radially outer end with the overthrowing rods 553 and 554 and rotated around the pins 542 and 543 in an arrow Y against the compression coil springs 546 and 547 so that the radially outer ends of the swingable plates 544 and 545 do not extend over the radially outer face of the large diameter portion 526a of the roller 9. At this time, the fluid operated cylinder 565 is also operated to cause the piston rod 566 to be retracted so that the brake plate 567 is moved away from the small diameter portion 526b' of the roller 9 to release the braking action of the roller 9.

In the first stage, the applying drum 8 is revolved to assume the second position 11 from the first position 10. The tread band 5 built on the tread band building mechanism 4 is removed by a suitable removing rollers provided in the tread band building mechanism 4 to be received on the applying drum 8. At this time, the circumferential length of the tread bend 5 is longer than that of the envelope connecting the rollers 9 so that the tread band 5 is supported by the rollers 9 and drooped therefrom.

In the second stage, the drive rod 517 is then retracted to the position shown in solid lines of FIG. 27 so that the movable sleeve 515 is moved to assume the position shown in solid lines of FIG. 27. Through the links 520 and 520' the segments 514 are radially outwardly moved while being guided by the guides 513 and 513' to cause the cylindrical member 524 to assume its intermediate diameter position shown in solid lines of FIG. 27 where the envelope connecting the rollers 9 is substantially equal to the circumferential length of the tread band 5. At this time, the rollers 9 are brought into contact with the inner peripheral surface of the tread band 5 to hold the tread band 5 polygonally without being partially elongated since the rollers 9 are rotatably supported by the bearing brackets 525 and 525'. In this stage, the tread band 5 has not yet been centered in its width direction and is seen meandered from the front side thereof.

In the third stage, the fluid operated cylinder 560 is then operated to permit the swingable lever 534 to be rotated clockwisely around the pin 533 by the tensile strength of the tensile coil spring 557 so that the side end engaging assembly 550 is moved toward the bearing bracket 525' through the connecting lever 535 while being guided by the guide rods 530 and 530'. The movement of the side end engaging assembly 550 is transferred to the additional side end engaging assembly 550' through the swingable lever 534 and the connecting levers 535 and 535' so that the additional side end engaging assembly 550' is moved toward the bearing bracket 525 while being guided by the guide rods 530 and 530'. The movement of the side end engaging assembly 550 permits the swingable plates 544 and 545 to be moved away from the overthrowing rods 553 and 554. The swingable plates 544 and 545 are swung to be erected by the compression coil springs 546 and 547 until they are engaged with the stop members 548 and 549, respectively, whereupon the radially outer ends of the swingable plates 544 and 545 are projected upwardly from the radially outer face of the large diameter portion 526a of the roller 9. If the mid-circumferential plane of the tread band 5 is offset from the mid-circumferential plane of the segments 514, i.e., the center of the pin 533, the movements of the side end engaging assemblies 550 and 550' enable the swingable plates 544, 545 or the engaging plates 555, 556 to be engaged with the offset side face of the tread band 5. For example, if the mid-circumferential plane of the tread band 5 is offset rightwardly from the center of the pin 533, the movements of the side end engaging assemblies 550 and 550' enable the radially outer ends of the engaging plates 555 and 556 to be engaged with the right side face of the tread band 5 and to leftwardly move the tread band 5 toward the pin 533 until the mid-circumferential plane of the tread band 5 is brought into alignment with the mid-circumferential plane of the segments 514 in FIGS. 28 and 29. At this time, the rollers 9 are moved together with the tread band 5 against the compression coil spring 527 since the tread band 5 is frictionally contacted with the rollers 9 and can not be moved relatively to the rollers 9. In this way, the tread band 5 is centered to the segments 514 of the applying drum 8. On the other hand, if the mid-circumferential plane of the tread band 5 is offset leftwardly from the center of the pin 533, the tread band 5 is centered to the segments 514 of the applying drum 8 in the same manner as above. In this way, the tread band 5 is centered by the side end engaging assemblies 550 and 550' even if it is mounted on any positions of the rollers 9 and meandered.

In the fourth stage, the fluid operated cylinder 565 is then operated to cause the piston rod 566 to be retracted so that the brake plate 567 is swung around the pivotal pin 569 to brake and lock the small diameter portion 26b' of the roller 9. The rotation and axial movement of the roller 9 can not be effected. The fluid operated to cylinder 560 is then operated to cause the piston rod 561 to be retracted so that the side end engaging assemblies 550 and 550' are moved away from each other against the tensile spring 557 through the wires 562 and 563. At this time, the tread band 5 is maintained centered since the inner periphery of the tread band 5 is held in contact with the rollers 9.

In the fifth stage, the applying drum 8 supporting the tread band 5 is then revolved from the second position 11 to the first position 10 to be brought into coaxial relation with the annular carrier mechanism 13. The expanded annular carrier mechanism 13 is then forwardly moved to surround the applying drum 8. The arcuate segments 15 of the annular carrier mechanism 13 are then concurrently radially inwardly moved so as to contract the annular carrier mechanism 13. At this time, the arcuate faces 14 of the segments 15 collectively form an annular face 16 and the inner circumferential length of the annular face 16 is substantially equal to the outer circumferential length of the tread band 5. The tread band 5 is thus held between and supported by the annular face 16 and the rollers 9 of the applying drum 8. The applying drum 8 is then rotated to over a predetermined rotational angle, whereupon the rollers 9 of the applying drum 8 are rotated around their own axes and around the rotational axis of the applying drum 8. The tread band 5 is therefore applied on the inner periphery of the annular face 16 with its final building circumferential length and retained by the annular carrier mechanism 13. The applying drum 8 is then contracted until the rollers 9 of the applying drum 8 are spaced from the inner periphery of the tread band 5. The annular carrier mechanism 13 is then backwardly moved until the annular carrier mechanism 13 is positioned between the tire building drum 1 and the applying drum 8. The applying drum 8 is then revolved from the first position 10 to the third position 12 so as to receive the breaker band 7 from the breaker band building mechanism 6. As a result, the breaker band 7 is received around and supported by the applying drum 8 with the circumferential length of the breaker band 7 longer than the circumferential length of the envelope connecting the rollers 9 of the applying drum 8 so that the upper portion of the breaker band 7 is supported on the rollers 9 of the applying drum 8 and the lower portion of the breaker band 7 is drooped from the rollers 9. The applying drum 8 is then expanded to its intermediate expanded diameter state until the circumferential length of the envelope connecting the rollers 9 is substantially equal to the breaker band 7. At this time, the rollers 9 of the applying drum 8 are brought into contact with the inner periphery of the breaker band 7. As a result, the breaker band 7 is cylindrically retained by the applying drum 8. The centering of the breaker band 7 is then carried out in the similar manner as above. The applying drum 8 is then revolved from the third position 12 to the first position 10 to be brought into coaxial relation with the annular carrier mechanism 13. Accordingly, the breaker band 7 supported on the applying drum 8 is brought into coaxial relation with the tread band 5 supported on the annular carrier mechanism 13. The annular carrier mechanism 13 is then forwardly moved. The forward movement of the annular carrier mechanism 13 is effected until the annular carrier mechanism 13 surrounds the applying drum 8. At this time, the breaker band 7 is located within and in coaxial relation with the tread band 5 supported on the annular carrier mechanism 13. The drive rod 17 is further retracted to cause the segments 14 to be radially outwardly moved through the movable sleeve 515 and the links 520, 520', thereby making the cylindrical member 524 into the maximum expanded state. At this time, the breaker band 7 is brought into pressing contact with the tread band 5 which has been held in the annular carrier mechanism 13. The fluid operated cylinder 565 is then operated to cause the piston rod 566 to be projected so that the brake plate 567 is swung around the pivotal pin 569 and releases the small diameter portion 26b' of the roller 9, thereby enabling the roller 9 to be rotatable and axially movable. There is no widthwise disorder between the breaker band 7 and the tread band 5 since the breaker band 7 on the rollers 9 is adhered to the tread band 5 even if the break plate 567 releases the small diameter portion 26b' of the roller 9. The drive motor 506 is then rotated to cause the drum shaft 510 to be rotated through the sprocket wheel 508, the endless chain 509, the sprocket wheel 505 and the transmitting shaft 504 so that the rollers 9 are rotated around their own axes and around the rotational axis of the supplying drum 8 while to biasingly urge the breaker band 7 to the tread band 5 supported in the annular carrier mechanism 13, thereby completing the adhesion of the breaker band 7 and the tread band 5.

While there has been described one cycle of the operation of the applying drum, such cycles are repeated if the operations are repeated.

Although detailed description have been made exclusively on the foregoing embodiments of this invention, it should be understood, as indicated hereinbefore, that the preferred embodiments as described and shown herein do not mean in any way limitations of this invention, but on the contrary, variations and modifications with respect to the construction and operation may further be derived by those skilled in the art to which the present invention pertains, whereby the advantageous characteristics of this invention may be realized without departing from the spirit and scope of the invention as set forth hereunto in the appended claims.

What is claimed is:

1. A green tire building process, comprising: the steps of:

jointing both longitudinal ends of a belt-like tread rubber for producing an endless tread band which has a circumferential length substantially equal to a final circumferential length at a time when said endless tread band is to be assembled with a cylindrical green case having at least a carcass ply and a pair of beads embedded in both axial end portions of said carcass ply, and applying said endless tread band on an inner periphery of an annular face;

jointing both longitudinal ends of a belt-like breaker ply for producing an endless breaker band which has a circumferential length shorter than a final building circumferential length at a time when said endless breaker ply is to be applied on an inner periphery of said endless tread band, and disposing said endless breaker band within said endless tread band with its mid-circumferential plane being aligned with that of said endless tread band;

expanding said endless breaker band radially to its final building circumferential length and applying said endless breaker band on the inner periphery of said endless tread band for building a tread breaker assembly;

disposing said cylindrical green case within and in coaxial relation with said tread breaker assembly;

deforming said cylindrical green case toroidally to be applied on the inner periphery of said endless breaker band for integrally building said cylindrical green case and said tread breaker assembly.

2. A green tire building apparatus, comprising in combination:

a tire building drum collapsible and rotatable for toroidally deforming a cylindrical green case having at least a carcass ply and a pair of beads embedded in both axial end portions of said carcass ply;

a tread band building mechanism for jointing both longitudinal ends of a belt-like tread rubber to produce an endless tread band which has a circumferential length substantially equal to its final circumferential length measured when said endless tread band is to be assembled with said cylindrical green case;

a breaker band building mechanism for jointing both longitudinal ends of a belt-like breaker ply to produce an endless breaker band which has a circumferential length shorter than its final building circumferential length measured when said endless breaker ply is to be applied on an inner periphery of said endless tread band;

an applying drum collapsible and rotatable for receiving said endless tread band from said tread band building mechanism and supporting said endless tread band with said final building circumferential length, and for bringing said endless breaker band into alignment with said endless tread band in their mid-circumferential planes and radially expanding said breaker band its final building circumferential length; and an annular carrier mechanism expansible and capable of coaxially surrounding said building drum and said applying drum to permit said endless tread band with said final building circumferential length to be applied thereon and retained thereby, then to permit said endless breaker band to be radially outwardly expanded to said final building circumferential length so that said endless breaker band is applied on the inner periphery of said endless tread band to build a tread breaker assembly, and finally to permit said cylindrical green case to be toroidally deformed and applied on the inner periphery of said tread breaker assembly for production of a green tire.

3. A green tire building apparatus as set forth in claim 2, in which said tread band building mechanism comprises a horizontal central frame supporting thereon a central portion of a belt-like tread rubber; a pair of swingable frames supporting thereon both longitudinal end portions of said belt-like tread rubber and each having one end swingable around each of both longitudinal ends of said central frame from a horizontal position where a continuous horizontal plane is formed by said central frame and said swingable frames to horizontally support said belt-like tread rubber to a vertical position where said belt-like tread rubber can be partially turned up at each of both longitudinal end portions; a swingable frame swinging means for swinging each of said swingable frames from said horizontal position to said vertical position; an end severing assembly supported on said central frame to be movable toward and away from said both longitudinal end portions of said belt-like tread rubber for partially severing said both longitudinal end portions to form a pair of new faces to be butt jointed; and end severing assembly moving means for moving said end severing assembly toward and away from said both longitudinal end portions of said belt-like tread rubber; a pair of first tables relatively movable toward and away from each other in a horizontal plane along the longitudinal direction of said central frame and each having a supporting face on which said longitudinal end portion of said belt-like tread rubber is loaded; a first table moving means for relatively moving said first tables toward and away from each other; a transferring means mounted on said first table to transfer said longitudinal end portions, turned up and loaded on said first tables by said swingable frames and said swingable frame swinging means, toward and away from each other; a centering means mounted on said first tables to center said longitudinal end portions of said belt-like tread rubber transferred by said transferring means; a pair of second tables disposed in opposing relation with and movable toward and away from said first tables for pressingly holding said longitudinal end portions of said belt-like tread rubber when said second tables are moved to their positions nearest to said first tables, said second table being relatively movable toward and away from each other in a horizontal plane along the longitudinal direction of said central frame and each having an engaging lower face with which each of said longitudinal end portions of said belt-like tread rubber is engageable when said second tables are moved to their positions nearest to said first tables; and a second table moving means for moving said second tables toward and away from said first tables.

4. A green tire building apparatus as set forth in claim 2, in which said breaker band building mechanism comprises a fixed frame having a pair of positioning groove members spaced in the longitudinal direction of said fixed frame and supporting a central portion of said belt-like breaker ply which has both longitudinal straight ends severed at a same angle with respect to the longitudinal direction of said belt-like breaker ply; a pair of movable frames horizontally movably supported on said fixed frame to support both longitudinal end portions of said belt-like breaker ply; a pair of positioning plates respectively supported on said movable frames and each having positioning projection to be engageable with each of said positioning groove members; a pair of end engaging members respectively secured to said positioning plates and each having at least two points to be engageable with each of said longitudinal straight ends, said two points being connected by a straight line intersected at a predetermined angle with a standard line drawn on said positioning plate; a positioning plate moving means for moving said positioning plates toward said longitudinal straight ends of said belt-like breaker ply to permit said end engaging members to be engaged with said longitudinal straight ends of said belt-like breaker ply; a pair of fixing means for relatively fixing said movable frames and said positioning plates when said end engaging members are engaged with said longitudinal straight ends of said belt-like breaker ply; and a movable frame moving means for moving said movable frames together with said positioning plates to permit said positioning projections to be respectively engaged with said positioning groove members when said fixing means are operated to cause said movable frames and said positioning plates to be relatively fixed.

5. A green tire building apparatus as set forth in claim 4, in which said breaker band building mechanism further comprises a pair of end retaining members each extending in parallel relation with said straight line of said end engaging member when said positioning projection is engaged with said positioning groove member to attract and retain said longitudinal end portion of said belt-like breaker ply, each of said end retaining members having a side edge to be aligned with said straight line of said longitudinal end portion of said belt-like breaker ply when said end retaining members retains said longitudinal end portion of said belt-like breaker ply; a pair of horizontal travelling members horizontally movable toward and away from each other along the longitudinal direction of said belt-like breaker ply and respectively supporting said end retaining members to be revolvable in a vertical plane; a horizontal travelling member moving means for moving said horizontal travelling members toward and away from each other along the longitudinal direction of said belt-like breaker ply; an end retaining member revolving means for revolving said end retaining members in a vertical plane so as to turn up said longitudinal end portions of said belt-like breaker ply and to position said longitudinal end portions with said straight ends being in parallel, opposing and spaced relation with each other in cooperation with said horizontal travelling member moving means; a lower jointing table disposed above said movable frames and between said end retaining members to permit said revolved end retaining members to be rested thereon and having a central projection which is to fill a space defined between said revolved end retaining members to form a flat jointed surface together with said end retaining members; an upper jointing table disposed above said lower jointing table to be movable toward and away from said lower jointing table; an upper jointing table lifting means for moving said upper jointing table toward and away from said lower jointing table; and an end jointing means for jointing said straight ends of said belt-like breaker ply supported on said end retaining members in opposing and spaced relation with each other in cooperation with said upper jointing table lifting means when said upper jointing table is moved toward said lower jointing table by said upper jointing table lifting means.

6. A green tire building apparatus as set forth in claim 2, in which said applying drum comprises a cylindrical member rotatable and collapsible; a plurality of rollers disposed coaxially surrounding said cylindrical member and in equally spaced relation with each other in the circumferential direction of said cylindrical member to be movable along the rotational axis of said cylindrical member and rotatable around their own axes so that said rollers can be contacted with an annular material such as said endless tread band and said endless breaker ply to retain said annular material in substantially cylindrical shape; a plurality of guide rods each extending along each of said rollers; and a pair of side end engaging assemblies slidably received on each of said guide rods to be movable toward and away from each other at an equal distance so that said side end engaging assemblies can be engaged with both side ends of said annular material cylindrically retained.

* * * * *